United States Patent
Honey et al.

(10) Patent No.: US 12,364,176 B2
(45) Date of Patent: Jul. 22, 2025

(54) AGRICULTURAL APPARATUSES AND RELATED METHODS

(71) Applicant: HONEY BEE MANUFACTURING LTD., Frontier (CA)

(72) Inventors: Glenn Raymond Honey, Bracken (CA); Lee Glenn Harper, Shaunavon (CA); Tom Antony Stubbs, Frontier (CA)

(73) Assignee: HONEY BEE MANUFACTURING LTD., Frontier (CA)

(*) Notice: Subject to any disclaimer, the term of this patent is extended or adjusted under 35 U.S.C. 154(b) by 950 days.

(21) Appl. No.: 17/349,204

(22) Filed: Jun. 16, 2021

(65) Prior Publication Data

US 2022/0400595 A1   Dec. 22, 2022

(51) Int. Cl.
*A01B 49/06*   (2006.01)
*A01C 5/06*   (2006.01)

(52) U.S. Cl.
CPC .............. *A01B 49/06* (2013.01); *A01C 5/062* (2013.01)

(58) Field of Classification Search
CPC ....... A01B 49/04–065; A01C 5/06–068; F16B 5/02
See application file for complete search history.

(56) References Cited

U.S. PATENT DOCUMENTS

| | | |
|---|---|---|
| 1,634,650 A | 7/1927 | Coon |
| 1,900,440 A | 3/1933 | Ferguson |
| 2,349,257 A | 5/1944 | Evans et al. |
| 2,440,550 A | 4/1948 | Martin |
| 2,493,811 A | 1/1950 | Graham |
| 2,507,783 A | 5/1950 | Graham |
| 2,562,486 A | 7/1951 | Denning |
| 2,584,614 A | 2/1952 | Rasmussen et al. |
| 2,595,352 A | 5/1952 | Graham |
| 2,663,239 A | 12/1953 | Rapp et al. |
| 2,699,715 A | 1/1955 | Shelton |

(Continued)

FOREIGN PATENT DOCUMENTS

| | | |
|---|---|---|
| AT | 517211 A4 | 12/2016 |
| CA | 2007011 A1 | 7/1991 |

(Continued)

OTHER PUBLICATIONS

Gearmore Inc., Offset Discs Pull Type Assembly, Operation, & Parts Manual for Models Series 700, Jul. 2012, 23 pages.

*Primary Examiner* — Tara Mayo

(57) ABSTRACT

An agricultural implement has (i) an elongated open channel member; and (ii) a connecting assembly comprising a first vertical connector plate positioned against a first vertical side of the open member and a second vertical connector plate positioned against a second vertical side of the open member. When the open member twists about a longitudinal axis, its upper and lower flanges will move within upper and lower channels about upper and lower raised surface areas. A clamping assembly includes: a first clamping member extending horizontally between the first vertical plate and the second vertical plate positioned over and proximate an upper surface of the upper flange; a second clamping member extending over and proximate a lower surface of the lower flange; and a third clamping member extending (i) over and proximate a lower surface of the lower flange or (ii) over and proximate an upper surface of the upper flange.

42 Claims, 52 Drawing Sheets

(56) References Cited

U.S. PATENT DOCUMENTS

| | | | |
|---|---|---|---|
| 2,701,511 | A | 2/1955 | Graham |
| 2,719,474 | A | 10/1955 | Lindeman |
| 2,759,313 | A | 8/1956 | Campbell |
| 2,857,833 | A | 10/1958 | Rolf |
| 3,460,632 | A | 8/1969 | Richey |
| 5,660,237 | A | 8/1997 | Boyko et al. |
| 5,957,218 | A | 9/1999 | Noonan et al. |
| 6,085,846 | A | 7/2000 | Buchl et al. |
| 6,223,832 | B1 | 5/2001 | Hook et al. |
| 8,235,130 | B2 | 8/2012 | Henry et al. |
| 8,453,754 | B2 | 6/2013 | Beaujot |
| 8,914,198 | B2 | 12/2014 | Prickel et al. |
| 8,997,886 | B2 | 4/2015 | Stark |
| 9,585,298 | B2 | 3/2017 | Henry et al. |
| 2008/0276846 | A1 | 11/2008 | Friggstad |
| 2011/0112721 | A1 | 5/2011 | Wang et al. |
| 2011/0284253 | A1 | 11/2011 | Stevenson |
| 2015/0129261 | A1 | 5/2015 | Sudbrink et al. |
| 2018/0368307 | A1 | 12/2018 | Honey et al. |
| 2020/0113115 | A1 | 4/2020 | Honey et al. |
| 2020/0113116 | A1 | 4/2020 | Honey et al. |

FOREIGN PATENT DOCUMENTS

| | | | |
|---|---|---|---|
| CA | 2753800 | A1 | 9/2012 |
| CA | 2881762 | A1 | 8/2016 |
| CA | 2971616 | A1 | 12/2018 |
| DE | 10011102 | B4 | 11/2005 |
| EP | 0776597 | B1 | 4/2002 |
| GB | 1042967 | A | 9/1966 |

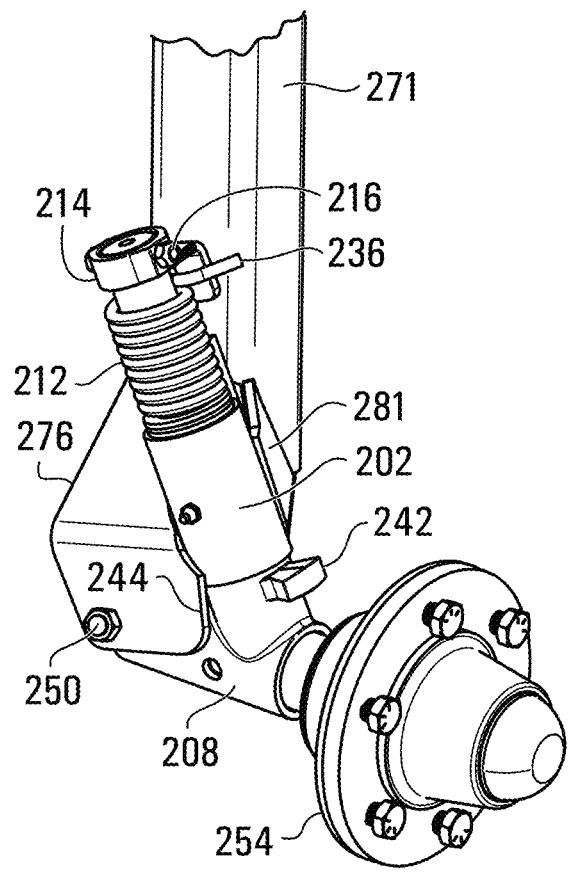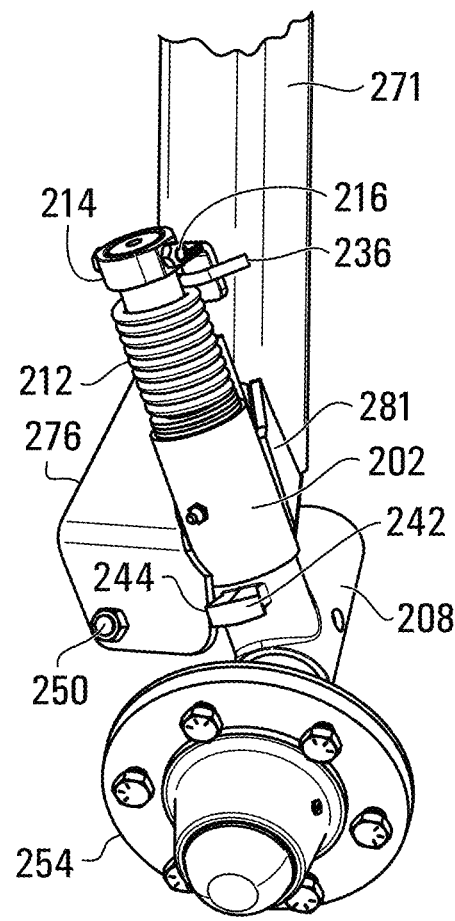
FIG. 11D  FIG. 11E

AGRICULTURAL APPARATUSES AND RELATED METHODS

TECHNICAL FIELD

This invention relates to agricultural implements, including methods, systems, and apparatuses for facilitating tilling and seeding.

BACKGROUND

Farmers use a variety of agricultural implements in order to prepare and treat the ground, for example placing seeds within the soil material. An agricultural implement may be driven/pushed/pulled over a field to be prepared for seeding and/or seeded and may include a tillage apparatus. Some tillage apparatuses may incorporate seeding apparatuses in order to be able to both till the soil material and plant the seeds at the same time. Tillage apparatuses typically have a plurality of engagement members mounted on a frame, with the ground engagement members being configured and positioned for preparing the soil material for seeding. The ground engagement members may engage with the ground to dig, stir, or overturn the soil material to a desired depth. The performance of an agricultural implement in tilling the ground is related at least in part to the precision at which engagement members are positioned and held at a particular depth in the soil material and/or other material forming the ground during the tilling process. This can be particularly challenging when the tilling process must be carried out over an area of ground that has an uneven surface and/or has sloped surface areas.

Tilling the ground accurately and relatively consistently to a desired tillage depth when preparing the ground for seeding is important for several reasons. For example, it is typically important to till the ground to a relatively precise depth to provide a proper bed depth for placement of plant/crop seeds. Additionally, when placing seeds within the soil material it is important that the seeds be placed accurately within the soil material at a desired depth. Placing seeds either at either a too shallow depth or too deep within the soil material can impact upon the seeds ability to transform into a desired healthy crop plant.

Tilling and seeding the ground accurately and in consistently transversely spaced, longitudinally extending rows can also be important to ensure that plants do not become overcrowded and compete with each other for resources during growth. For example, it is important that the plurality of ground engagers on the agricultural implement are sufficiently and accurately spaced and do not shift transversely relative to each other during operation, which may result in unevenly transverse spaced rows. Furthermore, it is desirable for the agricultural implement to remain substantially in alignment with the apparatus that is driving/pushing/pulling the tillage/seeder apparatus without laterally shifting into a skewed or skidding orientation. It can be particularly challenging to achieve this on contoured or uneven ground that can cause the agricultural implement to shift, for example due to unbalanced forces operating upon some of the plurality of ground engagers. Such shifting may result in inconsistent row spacing and variations in the depth of tilling or seeding. Additionally, shifting may leave some areas of the ground untilled and/or unseeded, rendering it unproductive and more prone to weeds, threatening crop yields.

Providing agricultural implements that can consistently and precisely till and/or seed ground surfaces that may be uneven and/or includes slopes, whilst maintaining a precise tilling depth, and seeding depth, and row spacing has been challenging.

Accordingly, improved agricultural implements are desirable.

SUMMARY

In an aspect of the disclosure, there is provided an agricultural implement comprising an elongated open channel member comprising an elongated generally horizontal upper flange, an elongated generally horizontal lower flange, and an elongated generally vertical web interconnecting the upper flange and the lower flange. The upper flange plate having an upper indentation at an edge region of the upper flange and a lower indentation at an edge region of the lower flange; a connecting assembly comprising a first vertical connector plate positioned against a first vertical side of the open channel member, the first connector plate comprising an upper channel configured to receive an edge region of the upper flange and a lower channel configured to receive an edge region of the lower flange, the upper channel comprising therein an upper raised surface area configured to be received within the upper indentation on the upper flange of the open channel member and the lower channel comprising a lower raised surface area configured to be received within the lower indentation of the lower flange; a second vertical connector plate, horizontally spaced from the first connector plate and positioned against a second vertical side of the open channel member, the second vertical side being opposite to the first vertical side; at least one clamping member operable to clamp the open channel member between the first and second vertical connector plates with the edge region of the upper flange received within the upper channel of the first vertical connector plate and the edge region of the lower flange received within the lower channel of the first vertical connector plate, and with the upper raised surface area received within the upper indentation on the upper flange of the open channel member and the lower raised surface area received within the lower indentation of the lower flange; wherein when subjected to external forces during operation of the agricultural implement, the open channel member is operable to twist about a longitudinal axis such that the upper and lower flanges will move about the upper and lower raised surface areas.

In another aspect of the disclosure, there is provided an agricultural implement comprising an elongated open channel member comprising an elongated generally horizontal upper flange, an elongated generally horizontal lower flange, and an elongated generally vertical web interconnecting the upper flange and the lower flange; a connecting assembly comprising a first vertical connector plate positioned against a first vertical side of the open channel member, the first connector plate comprising an elongated upper channel configured to receive an edge region of the upper flange and an elongated lower channel configured to receive an edge region of the lower flange; a second vertical connector plate, horizontally spaced from the first connector plate and positioned against a second vertical side of the open channel member, the second vertical side being opposite to the first vertical side; a clamping assembly operable to clamp the open channel member between the first and second vertical connector plates with the edge region on the upper flange of the open channel member received within the upper channel and the edge region on the lower flange of the open channel member received within the lower channel; wherein the clamping assembly comprises a first clamping member extending horizontally between the first vertical plate and the second vertical plate positioned over and proximate an upper surface of the upper flange; a second clamping member extending horizontally between the first vertical plate and the second vertical plate positioned over and proximate a lower surface of the lower flange; a third clamping member extending horizontally between the first vertical plate and the second vertical plate positioned either over and proximate a lower surface of the lower flange or over and proximate an upper surface of the upper flange.

In another aspect of the disclosure, there is provided an agricultural implement comprising an open channel member comprising a generally horizontal upper flange plate, a generally horizontal lower flange plate, and a generally vertical web plate interconnecting the upper flange plate and the lower flange plate; a mounting assembly comprising a front mounting plate; a rear mounting plate; a first upper bolt connection; a second lower bolt connection; wherein at least one of the first bolt connection and the second bolt connection comprises a single bolt and the first bolt connection or second bolt connection that does not comprise a single bolt comprises two bolts.

In another aspect of the disclosure, there is provided an agricultural implement comprising a support frame operable for supporting a plurality of ground engagers; at least one forward central wheeled support unit connected to the support frame, the at least one forward central wheeled support unit comprising at least one first middle wheel operable to freely rotate 360 degrees about a first steering axis; at least one forward outward wheeled support unit connected to the support frame and generally transversely aligned with and transversely spaced from the central wheeled support unit, the at least one forward outward wheeled support unit comprising a restricted rotation caster wheel operable to rotate about a second steering axis only in an outward angular direction from a straightforward direction; at least one rearward frame support unit connected to the support frame and longitudinally spaced rearward of the at least one forward central wheeled support unit and the at least one forward outward wheeled support unit.

In another aspect of the disclosure, there is provided an agricultural implement comprising a support frame operable for supporting a plurality of ground engagers; a first forward outward wheeled support unit connected to the support frame, the first forward outward wheeled support unit comprising a restricted rotation caster wheel operable to rotate about a first steering axis only in a first outward angular direction from a straightforward direction; a second forward outward wheeled support unit connected to the support frame in a transversely spaced location from the first forward outward wheeled support unit, the second forward outward wheeled support unit comprising a restricted rotation caster wheel operable to rotate about a second steering axis only in a second outward angular direction from the straightforward direction, the second outward angular direction being in an opposite angular direction from the straightforward direction to the first outward angular direction.

BRIEF DESCRIPTION OF THE DRAWINGS

In drawings which illustrate embodiments of the invention,

FIGS. 11D are 11E are enlarged views of the king pin assembly of FIG. 11C during rotation of the front wheeled support;

DETAILED DESCRIPTION

Figure 1:
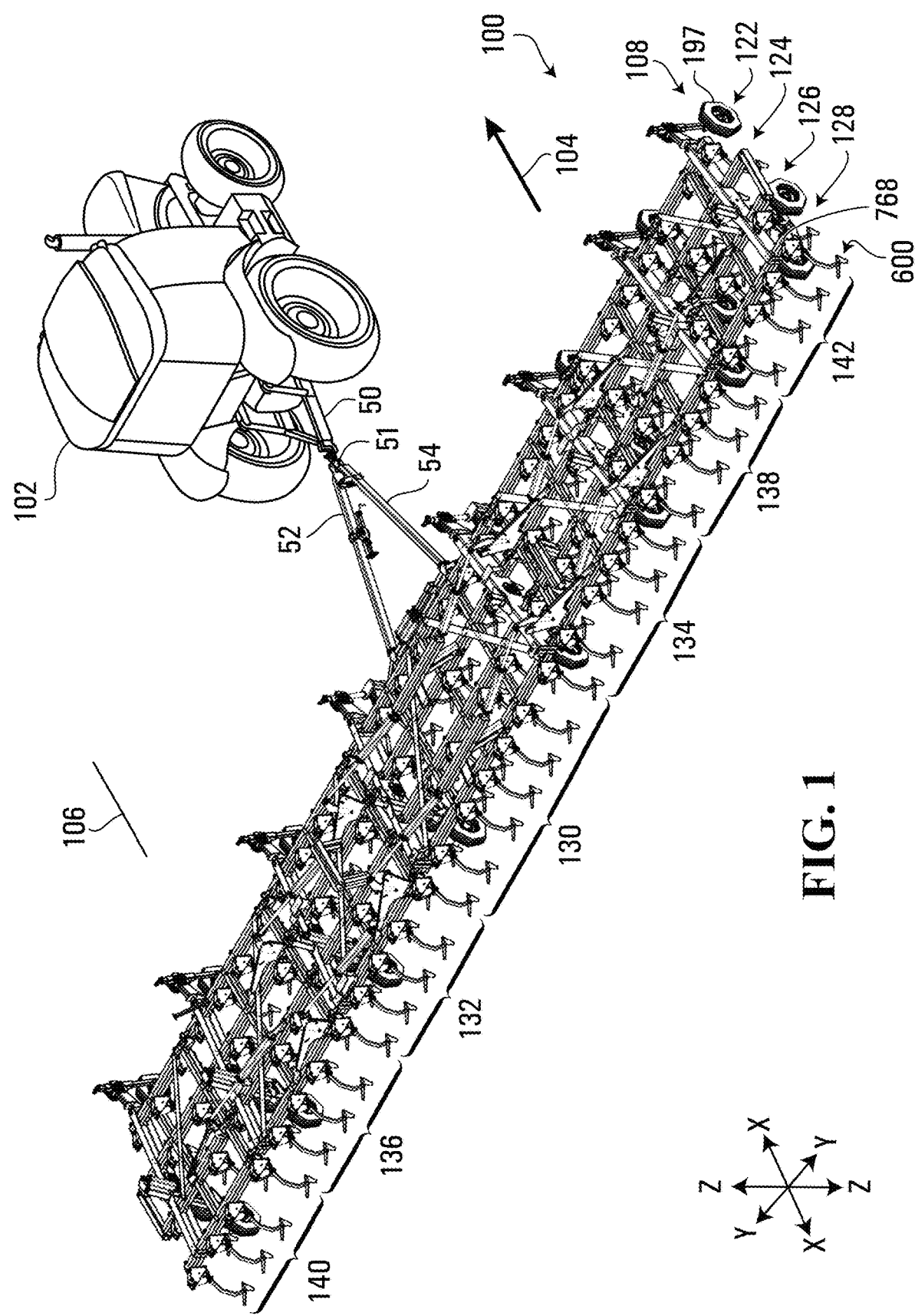
FIG. 1 is a perspective view of a farm implement and tow vehicle according to an example embodiment of the present disclosure.

Referring to FIG. 1, an agricultural implement 100 in accordance with one example embodiment of the present disclosure is shown. Agricultural implement 100 may be a tillage apparatus which may be pulled behind a propulsion unit 102 in a direction of travel denoted by arrow 104 across a ground surface 106. Agricultural implement 100 may further include an apparatus for seeding, such as an air seeder cart (not shown) for storing and distributing seed and/or fertilizer. In operation, as agricultural implement 100 moves across ground surface 106, a plurality of ground engagers may engage with and/or condition the surface 106 as it is moved in the direction of travel. One of the ground engagers is denoted at 600 in FIG. 1 for exemplary purposes. In embodiments, an air seeder cart (not shown) may be moved with agricultural implement 100 and be operable and configured to supply and distribute seeds and/or fertilizer through a network of tubing (not shown) to the prepared surface 106 after treatment by the ground engagers. In some embodiments, seeds may be delivered through tubing to the ground engagers themselves, and the ground engagers may be configured to deliver seeds to a correct depth/position within the soil material as the agricultural implement moves across the ground surface 106. In other embodiments, seeds may be delivered through tubing to separate seeding devices that are positioned adjacent to the ground engagers and these separate seeding devices may be configured to deliver seeds to a correct depth/position within the soil material as the agricultural implement moves across the ground surface 106. In various embodiments agricultural implement 100 may include ground engagers such as disks, chisel plows, seed drills, harrow tines, openers, packers as well as other ground engaging tools or devices or any combination thereof.

Propulsion unit 102 may be a known type of tractor, which may be configured and adapted to pull agricultural implement 100 via a rearwardly positioned tow hitch 50 on propulsion unit 102. Tow hitch 50 can be connected to a receiver 51 of agricultural implement 100, shown in greater detail in FIG. 1A at the forward distal end region of towing members 52 and 54 of agricultural implement 100. Towing members 52, 54 may be closed or open channeled beam members that may be made from a suitably hard and strong material such as a steel such as by way of example a suitable structural steel. In some applications, A36 mild steel, which is considered a structural steel with a yield strength of about 60K psi, may be employed. Stronger structural steels with higher yield strengths (e.g. 80-100K psi) may be employed in other embodiments, depending upon expected operational and design loads.

In various embodiments, propulsion unit 102 may be another vehicle capable of moving agricultural implement 100 and may include a propulsion unit operable to move agricultural implement 100 from one operational location to another operational location, such as a truck. In some embodiments, propulsion unit 102 may be integrated with agricultural implement 100.

Frame Description

Figure 2:
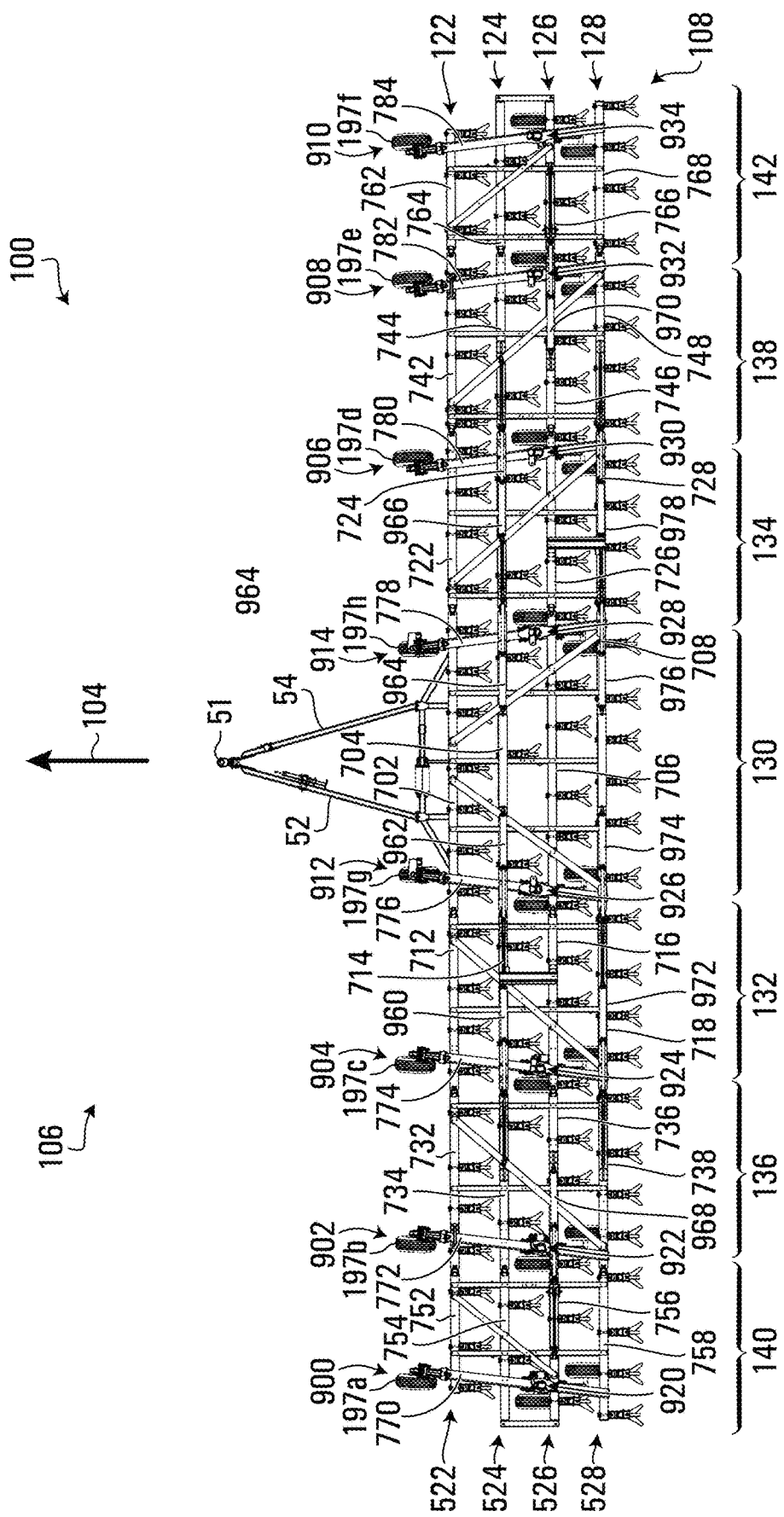
FIG. 2 is a top plan view of the farm implement of FIG. 1.
Figure 2A:
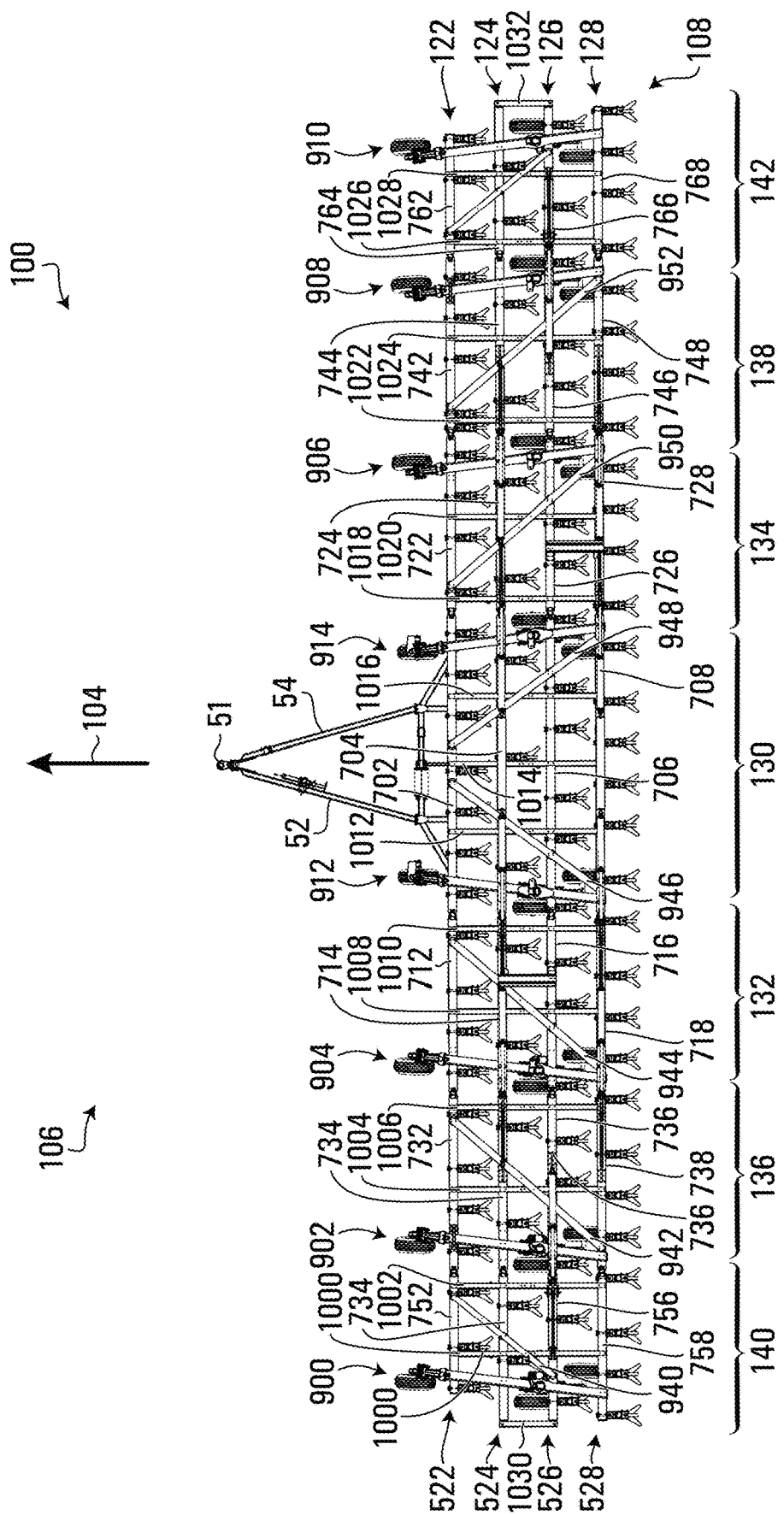
FIG. 2A is a top plan view of the farm implement of FIG. 2, with additional components indicated.

Referring to FIGS. 1, 2 and 2A, agricultural implement 100 may include a frame 108 (also known as a support frame) that includes a plurality of components. Frame 108 may be adapted to be supported for movement on the ground surface 106 by a plurality of frame support units such as a plurality of front (or forward) wheeled support units 900, 902, 904, 906, 908, 910, 912, 914 and a plurality of rear wheeled support units 920, 922, 924, 926, 928, 930, 932, 934 each having one, two or more wheels 197 (that typically include round rubber compound tires mounted on round strong metallic rims) mounted on a wheel hub/axle for free rotation about a generally transversely oriented wheel axis of rotation. This will allow the agricultural implement to be relatively easily moved across a ground surface 106 (FIG. 1) during operation. Both front wheeled support units 900, 902, 904, 906, 908, 910, 912, 914 and rear wheeled support units 920, 922, 924, 926, 928, 930, 932, 934 may be variable height wheeled support unit. For example, one or both sets of rear and front wheel support units may be associated with and interconnected to various hydraulic cylinders controlled by a hydraulic fluid control system to permit the height of the frame 108 relative wheels 197 and relative to the ground surface to be adjusted.

Figure 1A:
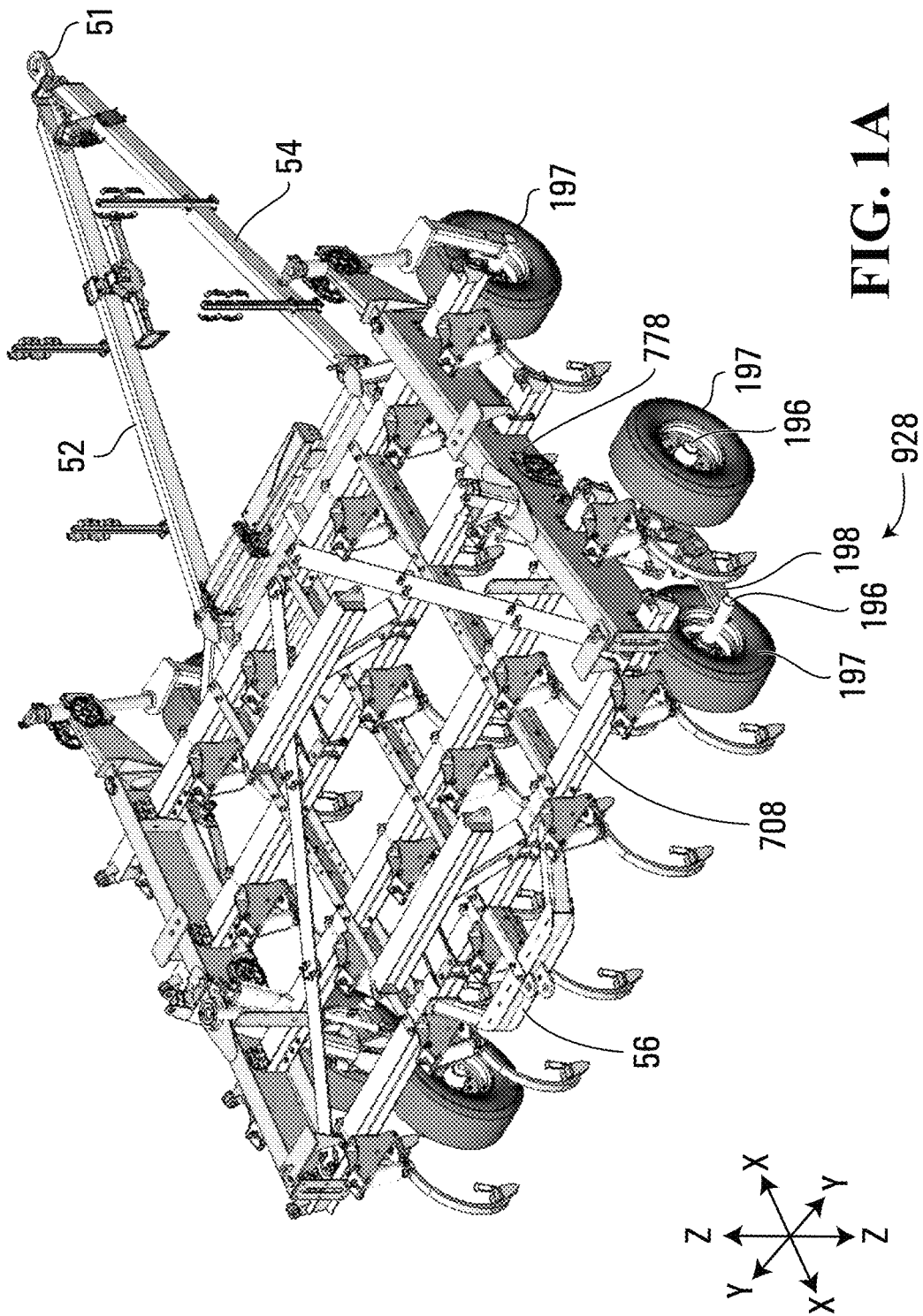
FIG. 1A is a perspective view of a portion of the farm implement of FIG. 1, including a rearwardly positioned towing hitch.

It should be noted that given the level of weight carried by rear wheeled support units 920, 922, 924, 926, 928, 930, 932, 924, and to provide enhanced lateral stability, such wheeled support units may be double wheel units having two wheels 197 mounted transversely spaced and which may be aligned with each other on a common transverse wheel axis. As shown in FIG. 1A, each of the two wheels 197 may be mounted on a transversely oriented wheel axle 196 that are interconnected with a pivot bar 198 which may be mounted so that the wheel axles can pivot in between the two wheels about a transversely oriented pivot axis.

Agricultural implement 100 may be configured such that none of the wheels 197 of rear wheeled units will follow/track on the same path of movement as any other of the wheels 197 of the rear wheel units (i.e. there is not overlap in the Y-axis of the path of any wheel 197 in the rear wheeled units). Also, in some embodiments, none of the wheels 197 of front wheeled support units 900, 902, 904, 906, 908, 910, 912, 914 are positioned at the same transverse location on the Y-axis as any of the wheels 197 of the rear wheeled support units 920, 922, 924, 926, 928, 930, 932, 934 (i.e. all or most of the front wheeled unit wheels are positioned at different locations on a Y-axis of FIG. 1 than the Y-axis locations of any of the wheels 197 of the rear wheeled units). Thus, none of the wheels 197 of rear wheeled units will follow/track on the same path of movement as any of the wheels 197 of the front wheeled units 900, 902, 904, 906, 908, 910, 912, 914. This may minimize/reduce repetitive compaction of the ground on surface 106 caused by multiple wheels passing over the same area of surface 106. A representative example is shown in FIG. 2C for front wheeled unit 906 and rear wheeled unit 928. As illustrated, wheel 197*d* for front wheeled unit 906 is not in alignment with the two wheels 197 of rear wheeled unit 928.

Referring to FIGS. 1 and 2, frame 108 includes rows 122, 124, 126, and 128 of transversely oriented (in direction Y in FIG. 1) and longitudinally spaced structural transverse members interconnected to a plurality of generally longitudinally oriented (generally in the direction X in FIG. 1) and transversely spaced structural longitudinal members 770, 772, 774, 776, 778, 780, 782 and 784. Longitudinal members 770, 772, 774, 776, 778, 780, 782 and 784 may be orientated at a small angle (for example in the range of 5 to 10 degrees) in relation to the longitudinal axis (X-axis in FIG. 1), such that the front ends of the longitudinal members are closer to the center of frame 108 than their rear ends. In a specific embodiment, longitudinal members 770, 772, 774, 776, 778, 780, 782 and 784 are orientated 7 degrees from the longitudinal axis (X-axis in FIG. 1). This may be beneficial in preventing each of the frame sections 130, 132, 134, 136, 138, 140, 142 of frame 108 from trapezoiding (i.e. collapsing) when subjected to loads, particularly during operation. Further, the angled orientation of longitudinal members 770, 772, 774, 776, 778, 780, 782 and 784 assist in transversely spacing wheels 197 of front wheeled support units 900, 902, 904, 906, 908, 910, 912, 914 and wheels of rear wheeled support units 920, 922, 924, 926, 928, 930, 932, 934 from one another, as described above. Additionally, this angling of longitudinal members 770, 772, 774, 776, 778, 780, 782 and 784 may allow optimal spacing of the ground engagers 600 on frame 108, such that multiple wheels 197 do not pass over the same area of ground surface 106, whilst providing the ability to position ground engagers 600 in different rows that will enable full coverage of the surface area beneath the frame 108. This angling of longitudinal members 770, 772, 774, 776, 778, 780, 782 and 784 may also assist in providing sufficient space for the range of motion of the wheels 197 of the front and rear wheeled supports.

Frame 108 may comprise a plurality of frame sections such as a central frame section 130, left and right inner frame sections 132 and 134, left-center and right-center frame sections 136 and 138 and left and right outer frame sections 140 and 142. The transverse members in rows 122, 124, 126, and 128 and the longitudinal members 770-784 may be made from one or more suitable materials such as a structural steel like A36 mild steel.

Each of the structural transverse and longitudinal frame members described above may be an open channel member that has a substantial amount of flexibility (particularly as compared to a closed channel member of comparable wall thickness dimensions and made from a comparable material) when, in operation, it is subjected to a twisting force about a longitudinal axis of the member. Each of the structural transverse and longitudinal members may include a web portion and may have at least one flange defining at least one open recess/channel along a length of the open member. The open transverse and longitudinal members may be "wide flange" members which have flanges that have a greater thickness than the thickness of the connecting central web. For example, the flanges may have a thickness of about ¼ inch which the central web may have a thickness of about 3/16 inch.

With reference to FIG. 2, frame 108 may include open transverse members 702, 712, 722, 732, 742, 752 and 762 in front row 122, open transverse members 704, 714, 724, 734, 744, 754 and 764 in middle row 124, open transverse members 706, 716, 726, 736, 746, 756 and 766 in middle row 126, and open transverse members 708, 718, 728, 738, 748, 758 and 768 in rear row 128. The above-described open transverse members may generally be H-section beams (or H-section beam members) including a generally vertically oriented, longitudinally extending central web portion interconnected or integrally formed with longitudinally extending, upper right and left side flanges, and lower left and right flanges. Such a member may be configured to be substantially equally flexible when subjected to twisting forces/torques in both rotational directions about an axis in the Y direction along its length.

Frame 108 of agricultural implement 100 may also include longitudinally oriented main row supporting open longitudinal members 770, 772, 774, 776, 778, 780, 782 and 784 which fixedly connect with transverse members in rows 122, 124, 126, and 128 of transverse members. For example, the longitudinal member 770 is fixedly connected to the open members 752-758, longitudinal member 772 is fixedly connected to transverse members 732-738, longitudinal members 776 and 778 are fixedly connected to transverse members 702-708, longitudinal member 780 is fixedly connected to transverse members 722-728, and longitudinal member 784 is fixedly connected to transverse members 762-768. In the embodiment shown, the open members 770-784 have generally C-shaped cross sections and may have their channels directed inwardly towards the center of frame 108.

Frame 108 may include pivotal connectors between each of the transversely adjacent frame sections 130/132; 132/136; 136/140; 130/134; 134/138; 138/142; that permit the adjacent frame sections to be pivoted relative to each other about axes oriented in a longitudinal direction X (FIG. 1). For example, pivotal connectors may be positioned in each row between the central frame section 130 and the left and right inner frame sections 132 and 134, between the left and right inner frame sections 132 and 134 and the left-center and right-center outer frame sections 136 and 138 and between the left-center and right-center outer frame sections 136 and 138 and the left and right outer frame sections 140 and 142. Each of the pivotal connectors may facilitate a pivotal connection between adjacent transverse open members such that the adjacent open members are operable to pivot to orientations generally parallel to a contour of the surface 106 when the agricultural implement 100 is moved across the surface 106.

Figure 3:
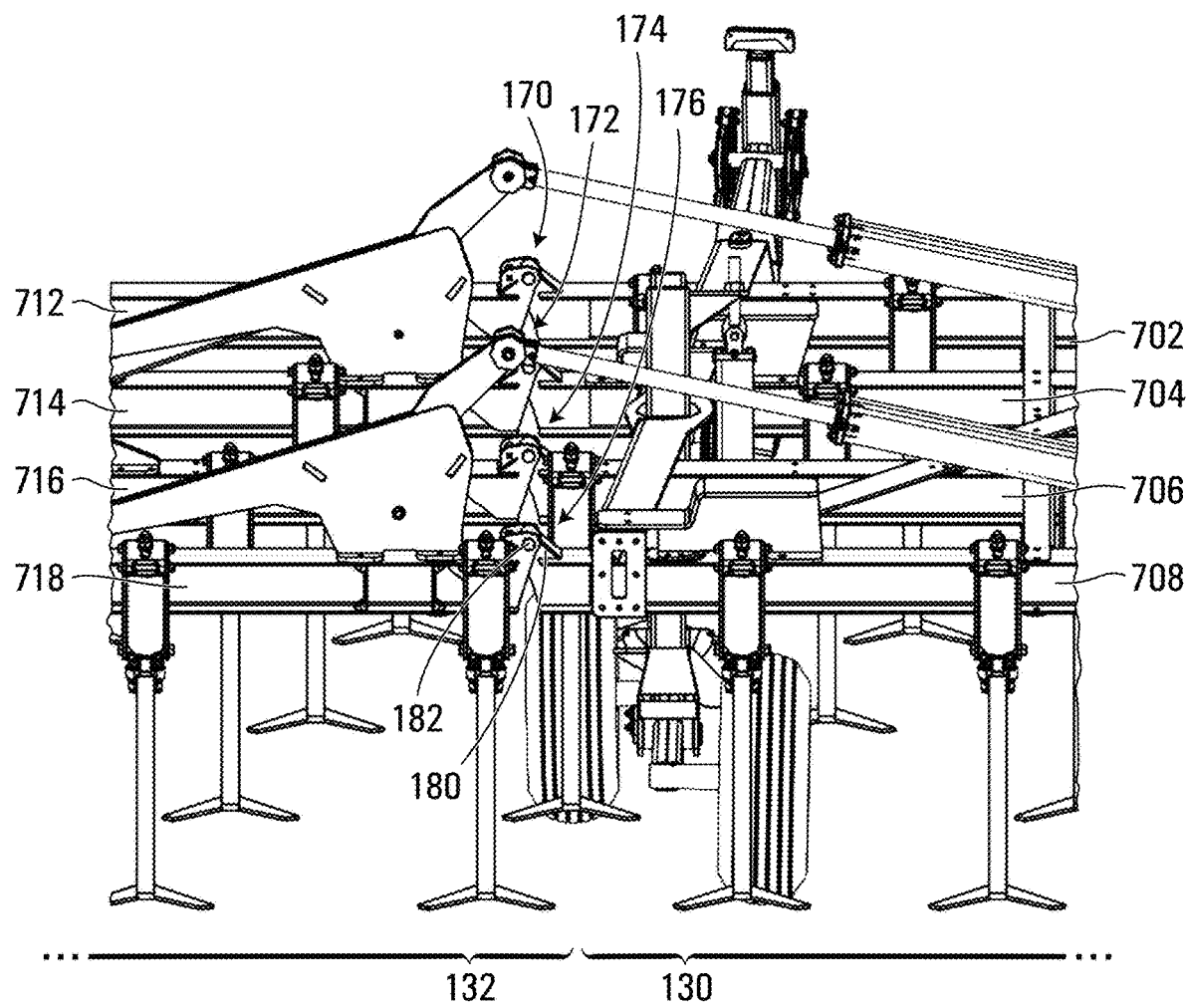
FIG. 3 is an enlarged rear perspective view of another portion of the farm implement shown in FIG. 1.

Referring now to FIG. 3, a rear perspective view of a representative portion of the central frame section 130 and a portion of the left inner frame section 132 of frame 108 is shown. Central frame section 130 of frame 108 includes transverse members 702, 704, 706, and 708. The left inner frame section 132 includes transverse members 712, 714, 716, and 718 which are pivotally connected to transverse members 702, 704, 706, and 708 via pivotal connectors 170, 172, 174, and 176 respectively. By way of example, the pivotal connector 176 includes first and second connector portions 180 and 182 which are welded to the open members 708 and 718 respectively, and pivotally inter-connected to facilitate a pivotal connection between the open members. Each of the pivotal connectors 170, 172, and 174 may each include generally similar features to that of the pivotal connector 176. This allows rotational torsion of the members to be transferred across the pivot connection.

Referring to FIG. 2A, frame 108 may also include longitudinally oriented, supplementary row supporting longitudinal members 1000, 1002, 1004, 1006, 1008, 1010, 1012, 1014, 1016, 1018, 1020, 1022, 1024, 1026 and 1028 which also fixedly connect the transverse rows 122, 124, 126 and 128 of transverse members. For example, longitudinal members 1000 and 1002 are connected to the transverse members 752, 754, 756, 758, longitudinal members 1008 and 1010 are fixedly connected to the transverse members 712, 714, 716, 718, longitudinal members 1012, 1014 and 1016 are fixedly connected to the transverse members 702, 704, 706, 708 and longitudinal members 1022, 1024 are fixedly connected to the transverse members 742, 744, 746, 748. Longitudinal members 1000-1028 may be formed from upper and lower generally L-shaped sections, with their vertical sections affixed together to form a generally C-shaped cross section.

Supplementary row supporting longitudinal members 1000, 1002, 1004, 1006, 1008, 1010, 1012, 1014, 1016, 1018, 1020, 1022, 1024, 1026 and 1028 may have vertical heights which are approximately the same as the vertical heights of the transverse members in transverse rows 122, 124, 126 and 128. However, the vertical heights (and widths) of longitudinal members 770-784 may be greater in size than the corresponding heights/widths of supporting longitudinal members 1000, 1002, 1004, 1006, 1008, 1010, 1012, 1014, 1016, 1018, 1020, 1022, 1024, 1026 and 1028 and of the transverse members in transverse rows 122, 124, 126 and 128. This may facilitate the rear wheeled support units 920, 922, 924, 926, 928, 930, 932, 934 being mounted to the open members through aligned openings in the upper and lower horizontal flanges of these members and the connection of front wheeled supports 900, 902, 904, 906, 908, 910, 912 and 914 to longitudinal members 770-784.

Figure 2B:
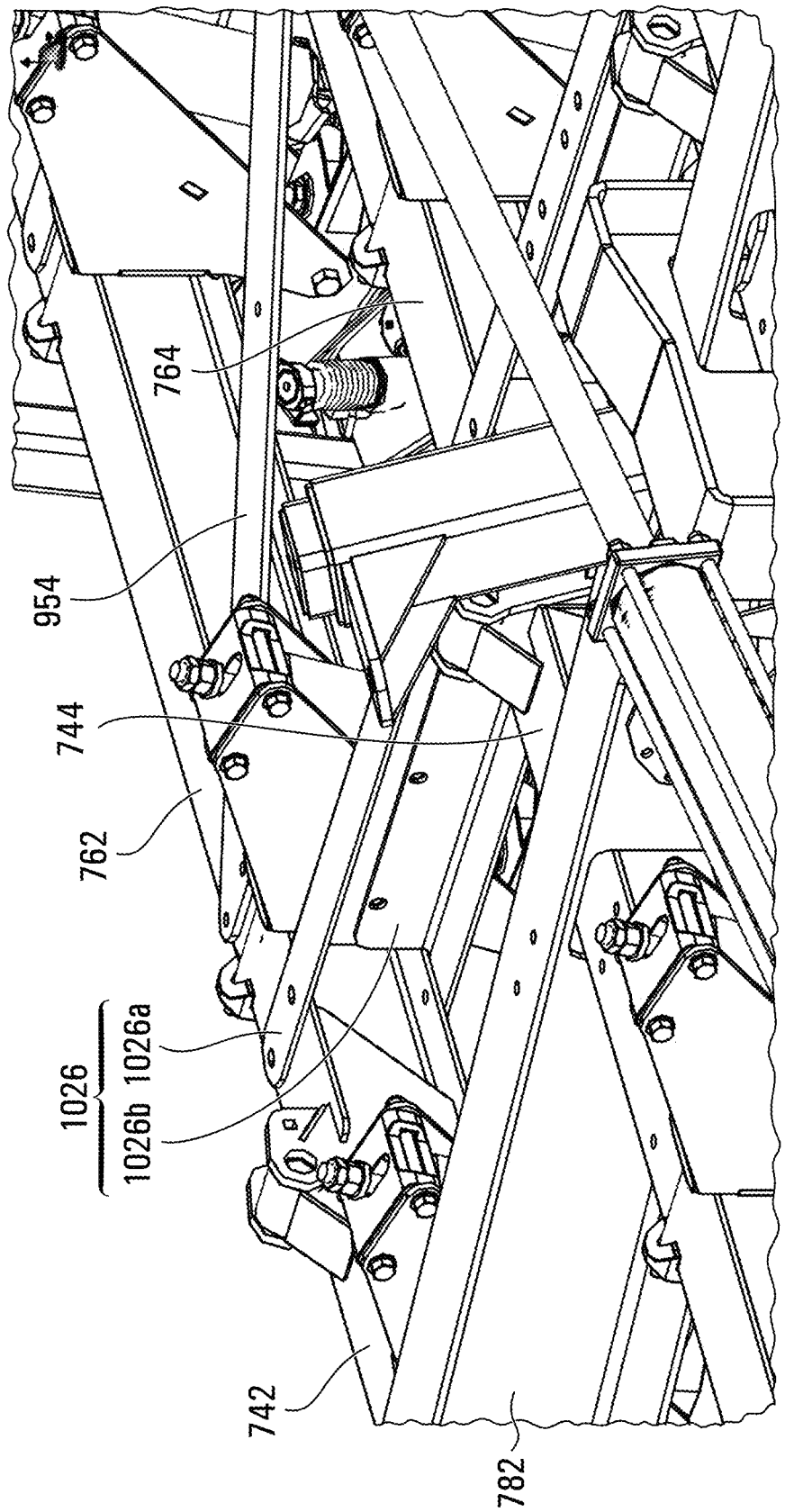
FIG. 2B is an enlarged side perspective view of a portion of the farm implement shown in FIG. 1.
Figure 2C:
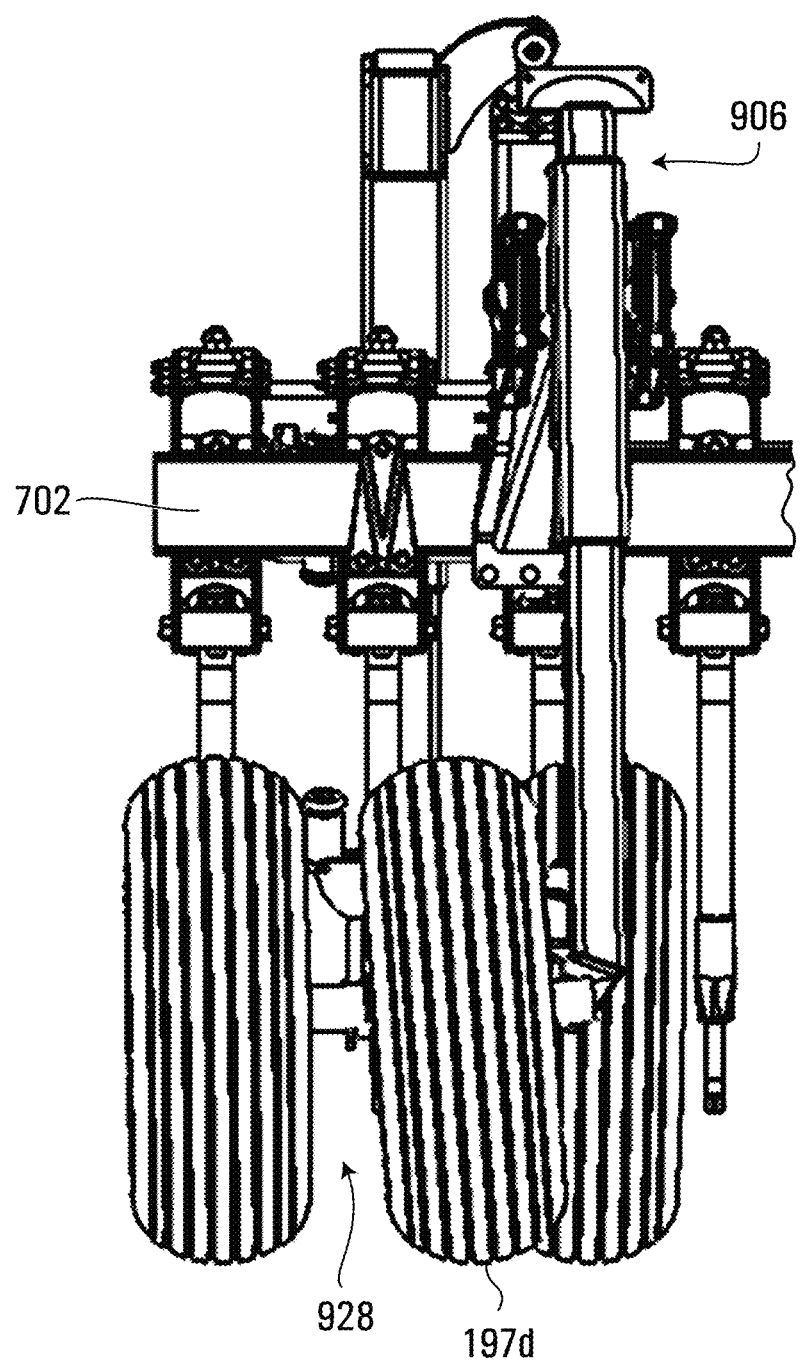
FIG. 2C is an enlarged front view of a portion of the farm implement shown in FIG. 1.

FIG. 2B illustrates row supporting longitudinal member 1026, which is fixedly connected to transverse members 762, 764, 766 and 768 in greater detail. Member 1026 includes an upper section 1026*a* and a lower section 1026*b*. Upper and lower sections 1026*a*, 1026*b* may have generally L-shaped cross sections, with lower section 1026*b* installed in an inverted configuration. When installed, both vertical edges of 1026*a* and 1026*b* overlap to form the generally C-shaped cross section of member 1026.

In a similar manner, row supporting longitudinal members 1000, 1002, 1004, 1006, 1008, 1010, 1012, 1014, 1016, 1018, 1020, 1022, 1024 and 1028 may be constructed from upper and lower sections and affixed to transverse members of frame 108. Supporting longitudinal members 1000, 1002, 1004, 1006, 1008, 1010, 1012, 1014, 1016, 1018, 1020, 1022, 1024 and 1028 may function to distribute loads from each of the rows of ground engagers across multiple transverse members, assisting in maintaining and managing the flexibility and twisting of frame 108 within desired limits.

Referring again to FIG. 2A, frame 108 may also include open member diagonal load distribution members 940, 942, 944, 946, 948, 950, 952 and 954. The open member load distribution member 940 is fixedly connected to transverse members 752, 754 and 756, the open member load distribution member 942 is fixedly connected to transverse members 732, 734, 736 and 738, the open member load distribution member 942 is fixedly connected to the open members 712, 714, 716 and 718, the open member load distribution members 946 and 948 are fixedly connected to the open members 702, 704, 706 and 708, the open member load distribution member 950 is fixedly connected to the open members 722, 724, 726 and 728, the open member load distribution member 952 is fixedly connected to the open members 742, 744, 746 and 748, and the open member load distribution member 954 is fixedly connected to the open members 762, 764 and 766 In various embodiments, each of the open member load distribution members 940, 942, 944, 946, 948, 950, 952 and 954 may extend at an angle to the open members to which they are connected.

Each of the diagonal open member load distribution members 940, 942, 944, 946, 948, 950, 952 and 954 extends at an angle of between about 30 and 70 degrees relative to the open member to which they are connected. In the embodiment shown, the angle may be about 45 degrees. The load distribution members extending at angles to the open members in the rows 122, 124, 126, and 128 may facilitate lateral rigidity in the frame 108, reducing trapezoidal forces on the main frame assembly.

In the embodiment shown in FIG. 2A, open member load distribution members 940, 942, 944, 946, 948, 950, 952 and 954 may be formed from flat rectangular sections affixed to the top surfaces of structural open members in rows 122, 124, 126, 128 and row supporting members 1000, 1002, 1004, 1006, 1008, 1010, 1012, 1014, 1016, 1018, 1020, 1022, 1024, 1026 and 1028. For example, open member load distribution member 942 is affixed to the top surface of open members 732, 734, 736, 738 and row supporting member 1004.

Open member load distribution members 940, 942, 944, 946, 948, 950, 952 and 954 assist in distributing forces acting on the top flanges of each of the rows 122, 124, 126, and 128 of open members. The use of the open member load distribution members 940, 942, 944, 946, 948, 950, 952 and 954 prevents each of the frame sections 130, 132, 134, 136, 138, 140, 142 from trapezoiding (i.e. collapsing) under heavy loading, while at the same time allowing the frame sections to flex while the farm implement is operating over uneven ground surface 106.

The connections between the various longitudinal members, transverse members, and load distributions members may be made by various known techniques including welding, nut and bolt or rivet connections. In an embodiment, the connections between members are made by two-piece fasteners such as HuckBolts manufactured by Howmet Aerospace.

Examples of a frame construction including connections between the various longitudinal members, transverse members, and load distribution members suitable for frame 108 is also disclosed in United States patent publication no. US 2018/0368307 published on Dec. 27, 2018, the entire contents of which is hereby incorporated herein by reference.

The frame 108 of agricultural implement 100 may also include shorter end members 1030 and 1032 (FIG. 2A). Member 1030 is fixedly connected to the outer ends of open members 754 and 756 and member 1032 is fixedly connected to the outer ends of open members 764 and 766. The members 1030 and 1032 may have C-shaped cross sections.

Referring to FIGS. 2 and 3, in various embodiments the agricultural implement 100 may include actuators 960, 962, 964, 966, 968, 970, 972, 974, 976 and 978 which are configured to stow and deploy portions of the agricultural implement 100 to reduce the width of the agricultural implement during transport, for example. Actuators may be hydraulic cylinders with actuating piston arms controlled by a hydraulic fluid supply system. When actuators 960, 962, 964, 966, 968, 970, 972, 974, 976 and 978 are in a fully retracted configuration, implement 100 may be held in a transport mode (or stowed configuration) in which frame sections 132, 134, 136, 138, 140, 142 may be folded up in a manner such that they are all supported by central frame section 130 and in which the overall transverse width of implement 100 is significantly reduced. In the transport mode, central frame section 130 may be the only frame section that is in contact with the ground surface 106, and may be capable of being moved on the ground surface supported by its front wheeled support units 912, 914 and rear wheeled support units 926, 928. As front wheeled support units 912, 914 are caster wheels that are fully 360 degrees rotatable about their generally vertical steering axis (as described further hereinafter), central frame section 130 may be relatively easily moved in a path that has tight turns. In the transport mode, frame sections 132, 134, 136, 138, 140, 142 may be supported only by central frame section 130 and move with central frame section 130. During tillage operations, the actuators may be fully extended (or deployed configuration, as shown in FIG. 1) and the frame sections may be able to freely rotate/pivot, about a longitudinal pivot axis relative to each other through the pivotal connectors, such as pivotal connectors 170, 172, 174, and 176) described above, as apparatus 100 is pulled across the ground surface 106. Thus, the frame sections may be operationally disengaged from the hydraulic cylinder pivot actuation mechanism to allow adjacent frame sections to freely pivot/float (or mechanically float) relative to each other as the apparatus 100 moves across an uneven ground surface.

Figure 3A:
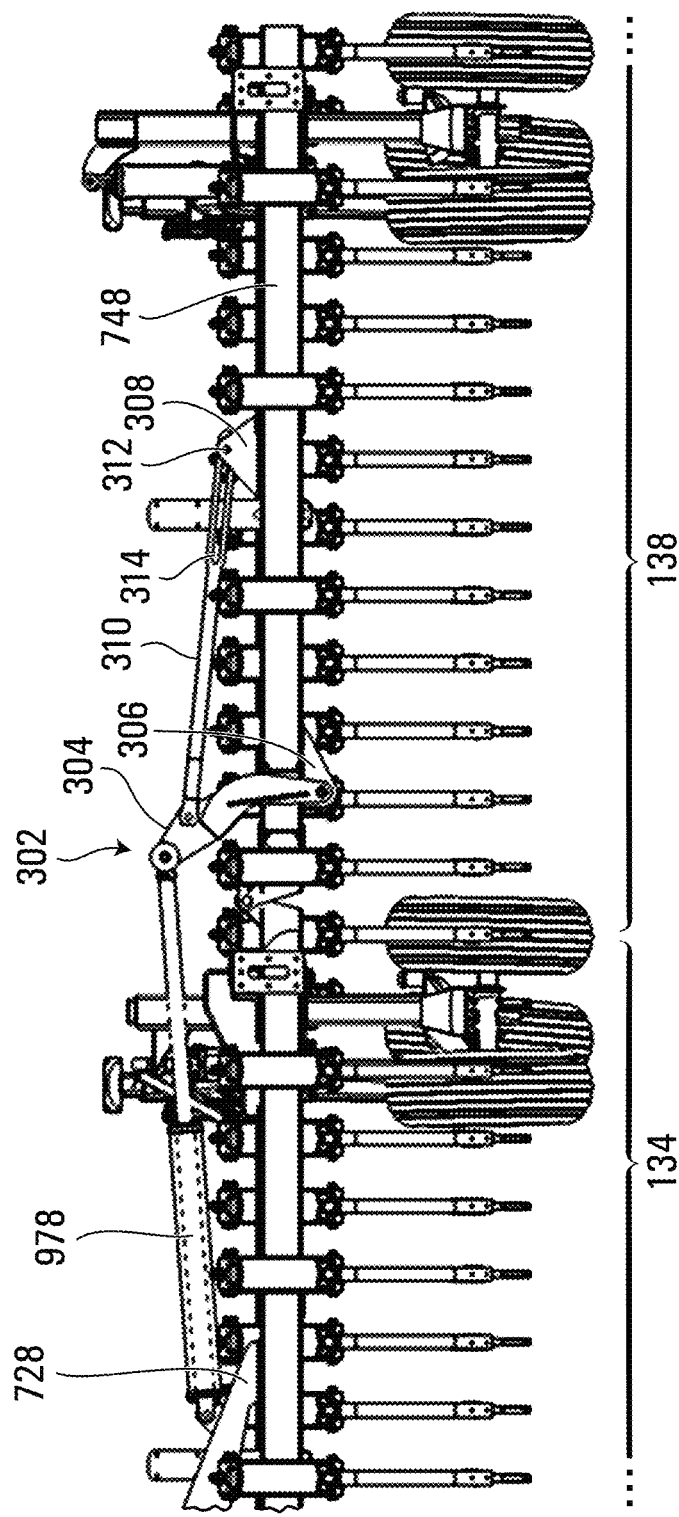
FIG. 3A is an enlarged rear view of another portion of the farm implement shown in FIG. 1.
Figure 3B:
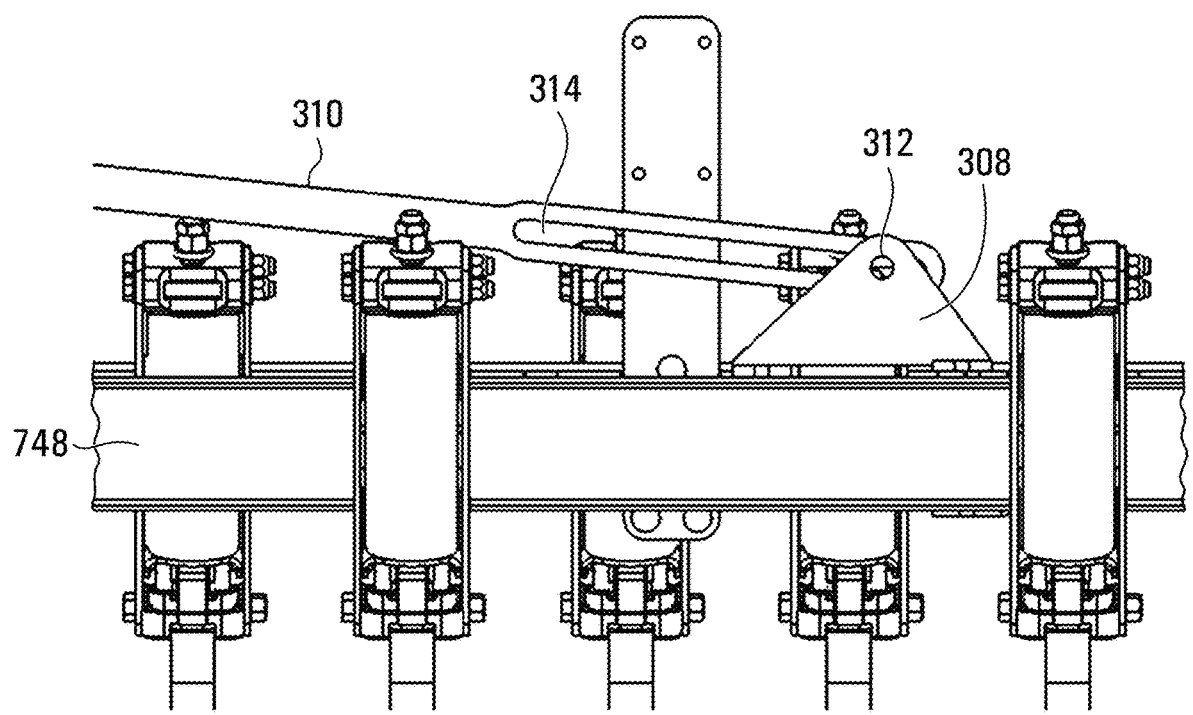
FIG. 3B is an enlarged view of a region of FIG. 3A.

The mechanical float of adjacent frame sections may be realized through a series of bell crank and scotch yoke mechanisms as known to those skilled in the art. A representative bell crank mechanism 302 is depicted in FIGS. 3A and 3B which is operable between adjacent frame sections 134 and 138. Actuator 978 may have its actuating body portion (e.g. hydraulic cylinder portion) pivotally connected at an inward end to open member 728 of frame section 134 and may have an actuating member (e.g. hydraulic piston rod) that is pivotally connected at an outward end to an arm of bell crank 304. Bell crank 304 may have a lower arm portion that is pivotally connected at a lower end to open member 748 of frame section 138 through lower bracket 306. Bell crank 304 is also pivotally connected to frame section 138 at upper bracket 308 through a wing link 310 having pivotal pin in slot connection 312 with bracket 308. Movement of pivotal pin connection 312 in the slotted end 314 on the outward end of wing link 310 may allow a degree of free pivotal movement of frame section 138 relative to frame section 134. For example, frame section 138 may be able to freely pivot in a vertical direction (Z direction in FIG. 1) relative to frame section 134 up to about 10 degrees in a downward/clockwise angular direction and up to about 40 degrees in an upwards/counter-clockwise direction without requiring extension or contraction of the actuating member (e.g. piston rod) of actuator 978. The degree of pivotal movement may be adjusted and fine-tuned through selecting different locations for each of the pivotal connections described on bell crank 304 and frame 108.

Each of the actuators 960, 962, 964, 966, 968, 970, 972, 974, 976 and 978 may have a corresponding bell crank mechanism as described above. As such, during movement of agricultural implement 100 over uneven terrain, through operation of each bell crank mechanism, each adjacent frame sections of frame 108 may be able to mechanically float (i.e. move in a vertical direction relative to one another) to a limited extent through their respective bell crank mechanisms without extension or contraction of respective actuators 960, 962, 964, 966, 968, 970, 972, 974, 976 and 978.

In the embodiment shown, actuator 968 is coupled to the open members 736 and 756 and configured to retract to pivot the outer left section 140 of the frame 108 about the pivotal connectors between the outer left section 140 and the left-center section 136.

The actuator 960 is coupled to the open members 714 and 734 and the actuator 972 is coupled to the open members 718 and 738. In operation, the actuators 960 and 972 may be retracted from the configuration shown in FIG. 2 to rotate the left-center section 136 upwards relative to the left-inner section 132 of the frame 108.

The actuator 962 is coupled to the open members 714 and 704 and the actuator 974 is coupled to the open members 718 and 708 (FIG. 3). In operation, the actuators 962 and 974 may be retracted from the configuration shown in FIG. 2 to rotate the left-inner section 132 upwards relative to the central section 130 of the frame 108. The actuators 964, 966, 970, 976 and 978 may be generally similar to the actuators 960, 962, 968, 972 and 974 and are operable to rotate the right outer section 142, right-center section 138 and right inner section 134 of frame 108 inwards in a similar manner.

In various embodiments, the actuators 960, 962, 964, 966, 968, 970, 976 and 978 may be interconnected to a hydraulic fluid supply system controlled with electronic activated valves. Actuators 964, 966, 970, 976 and 978 may be retracted generally simultaneously with the actuators 960, 962, 968, 972 and 974, to rotate the right outer section 142, right-center section 138 and right inner section 134 inwards as the left outer section 140, left-center section 136 and left inner section 132 are rotated inwards. In various embodiments, the actuators 960-966 may be actuators which are configured to lift and hold substantial weight, such as, for example hydraulic actuators.

Figure 1B:
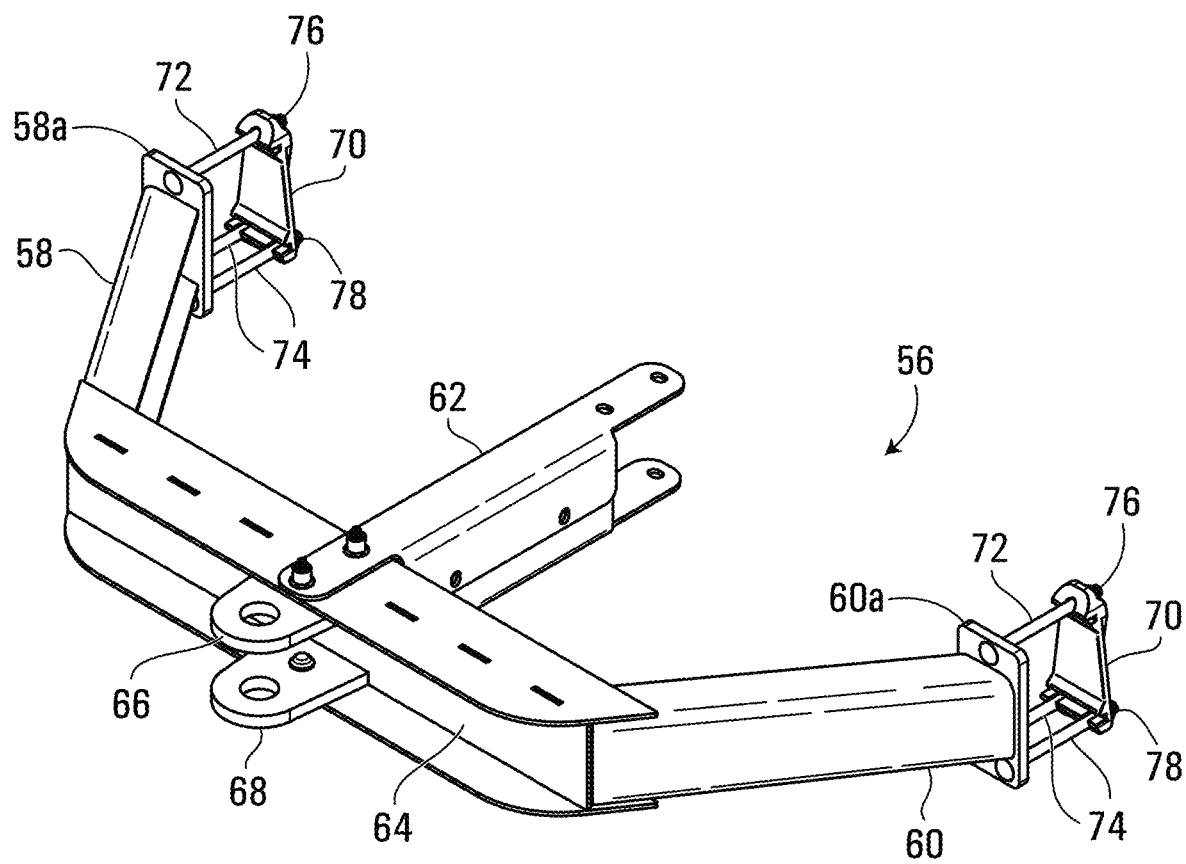
FIG. 1B is an enlarged perspective view of the rear towing hitch of FIG. 1A.
Figure 1B:
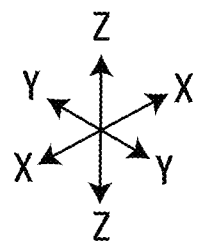

With reference to FIG. 1A, fixedly attached to open transverse member 708 in row 128 of transverse open members may be a rear towing hitch 56, which is shown in greater detail in FIG. 1B. Rear hitch towing 56 may be affixed to transverse member 708 through diagonally oriented towing members 58, 60 and a longitudinal member 62.

Diagonally oriented (i.e. at an angle to transverse direction Y and longitudinal direction X) members 58 and 60 are coupled to transverse member 708 through transversely and vertically orientated mounting plates 58a and 60a, which couple to the rear flanges of open member 708. Front supports 70 couple to the front flanges of open member 708 and are interconnected to vertically orientated mounting plates 58a and 60a by metal bolts 72/74, which are secured by metal nuts 76/78. Through this arrangement, transverse member 708 is sandwiched between mounting plates 58a/60a and front supports 70 to securely locate and retain rear hitch 56 on transverse member 708.

At their rear ends, members 58, 60 and 62 are affixed to a transversely orientated member 64. Members 58, 60, 62 and 64 may be closed or open channeled beam members. Extending from the rear of member 64 are upper and lower hitch plates 66 and 68 respectively, which are configured to attach and tow additional farming implements or tools to farm implement 100 such as a seed cart, a roller and/or a compactor.

Ground Engager Mount

With reference again to FIG. 2, frame 108 may support a plurality of rows of ground engagers. For example, rows of ground engagers 522, 524, 526, 528 may be coupled to each of the rows of transverse members 122, 124, 126, 128 respectively. Each of the ground engagers may be for example, a chisel plow device. In some embodiments, ground engagers may be configured as a combination of ground openers for opening a slot with the ground surface 106 as well as providing a passageway for delivering seeds to a placed at suitable depth within the soil material (as described hereinafter in relation of FIGS. 4J-4M). In some embodiments the opener may be followed with a packing tool for light tamping of soil material over the seed. In other embodiments, the ground engagers may be plow tools such as chisel plows, disk plows or harrows.

Each of the ground engagers may be coupled to at least one flange of one of the transverse members in the rows 122, 124, 126, and 128. One of the ground engagers is denoted at 600 in FIG. 1 for exemplary purposes, coupled to a transverse member 768 included in the row of open transverse members 128. In other embodiments, ground engagers may be mounted to longitudinal frame members. In other embodiments, finishing tools, such as harrow bars, packer systems or crumble bars may be mounted at the rear end of the longitudinal members.

Figure 4A:
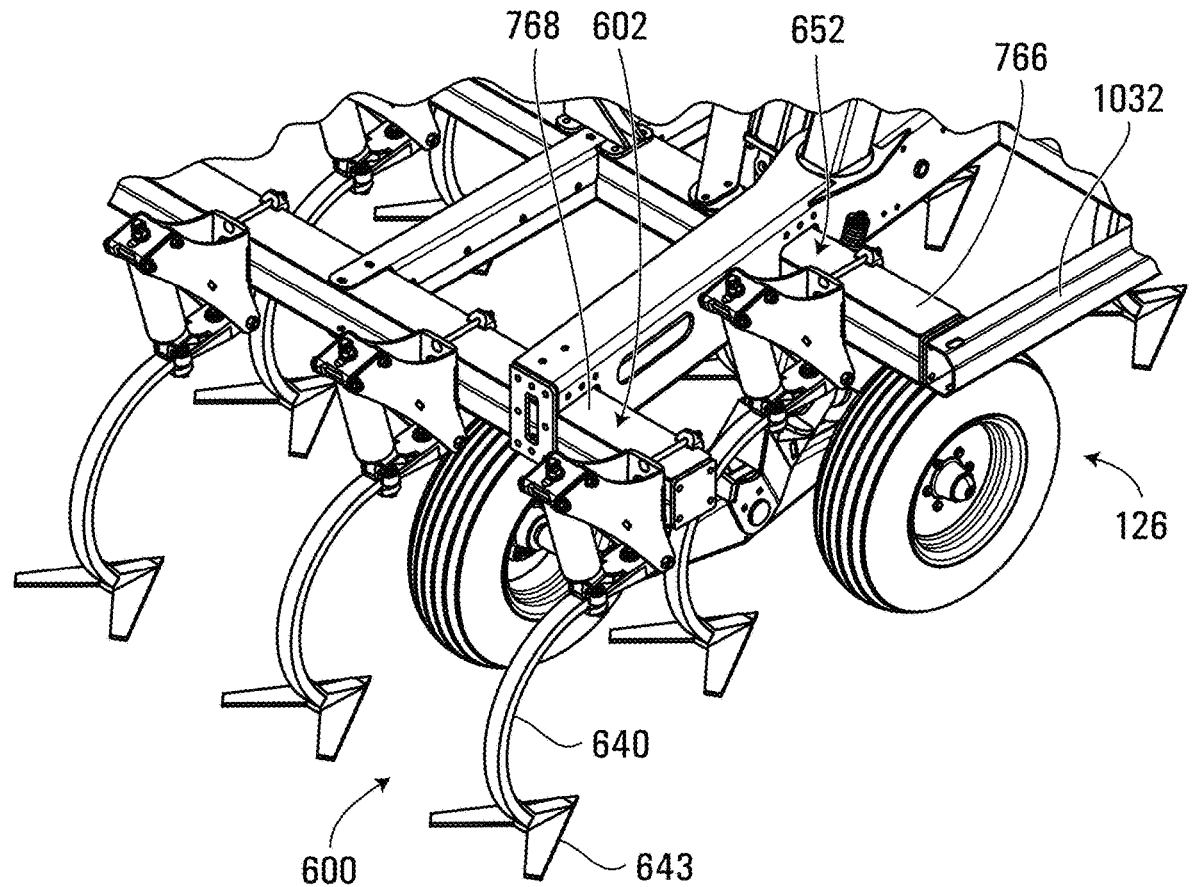
FIG. 4A is an enlarged upper side perspective view of another portion of the farm implement shown in FIG. 1.
Figure 4B:
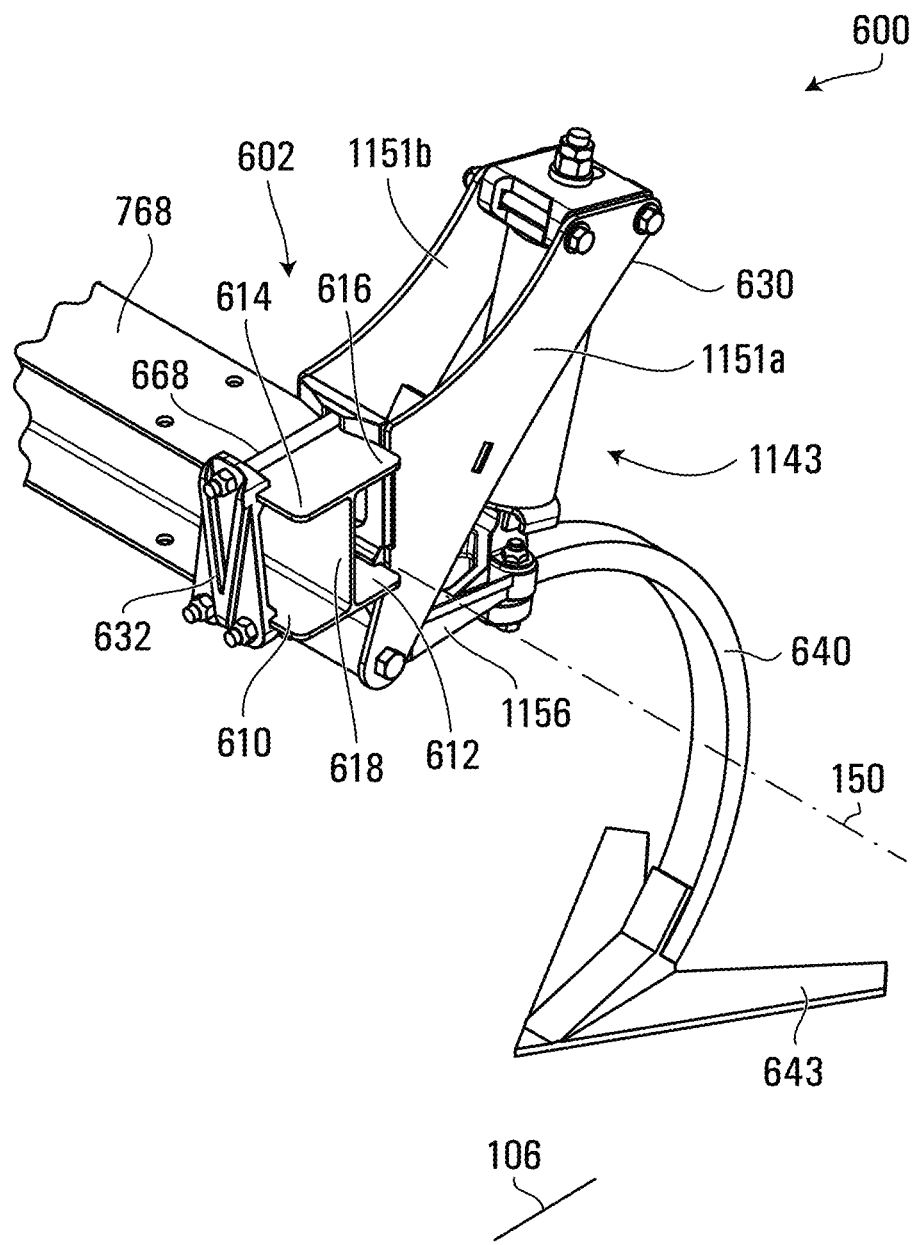
FIGS. 4B and 4C are upper front and rear perspective views of an example ground engager mount and an example open member suitable for use with the farm implement shown in FIG. 1.
Figure 5:
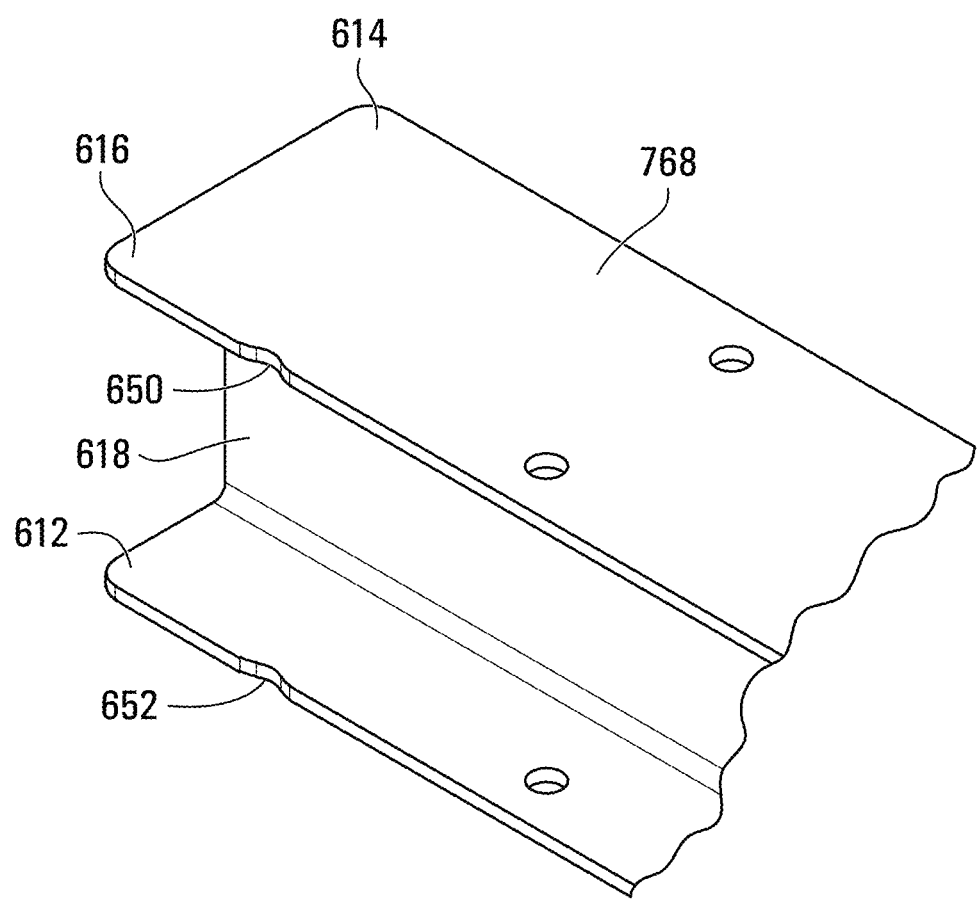
FIG. 5 is a rear perspective view of a portion of an open member of the farm implement shown in FIG. 1.

A section of a representative open transverse member 768 is shown in isolation in FIG. 5 and includes flanges 610 (shown in FIG. 4B), 612, 614, and 616 and a web 618. Periodically spaced at desired transverse locations along the outward facing vertical edges of flanges 612 and 616 may be pairs of vertically aligned indentations/notches in flanges 612 and 616. For example, indentations 650 and 652 which may be provided which are vertically aligned and have surfaces that may be curved such as being generally semi-circular/semi-cylindrical in shape in relation to a vertical and transverse plane. As will be described in greater detail below, each pair of indentations may function to assist with locating a ground engager 600 (not shown in FIG. 5) in a predetermined transverse position along the length of transverse member 768 and securing a ground engager to transverse member 768 in a proper vertical orientation at that transverse location. This is helpful when for example, it is important to make sure there is a desired and accurate transverse spacing between adjacent ground engagers mounted to a member such as member 768. However, in some embodiments of implement 100, one or more ground engagers may be secured at any point along the length of member 768.

Figure 4C:
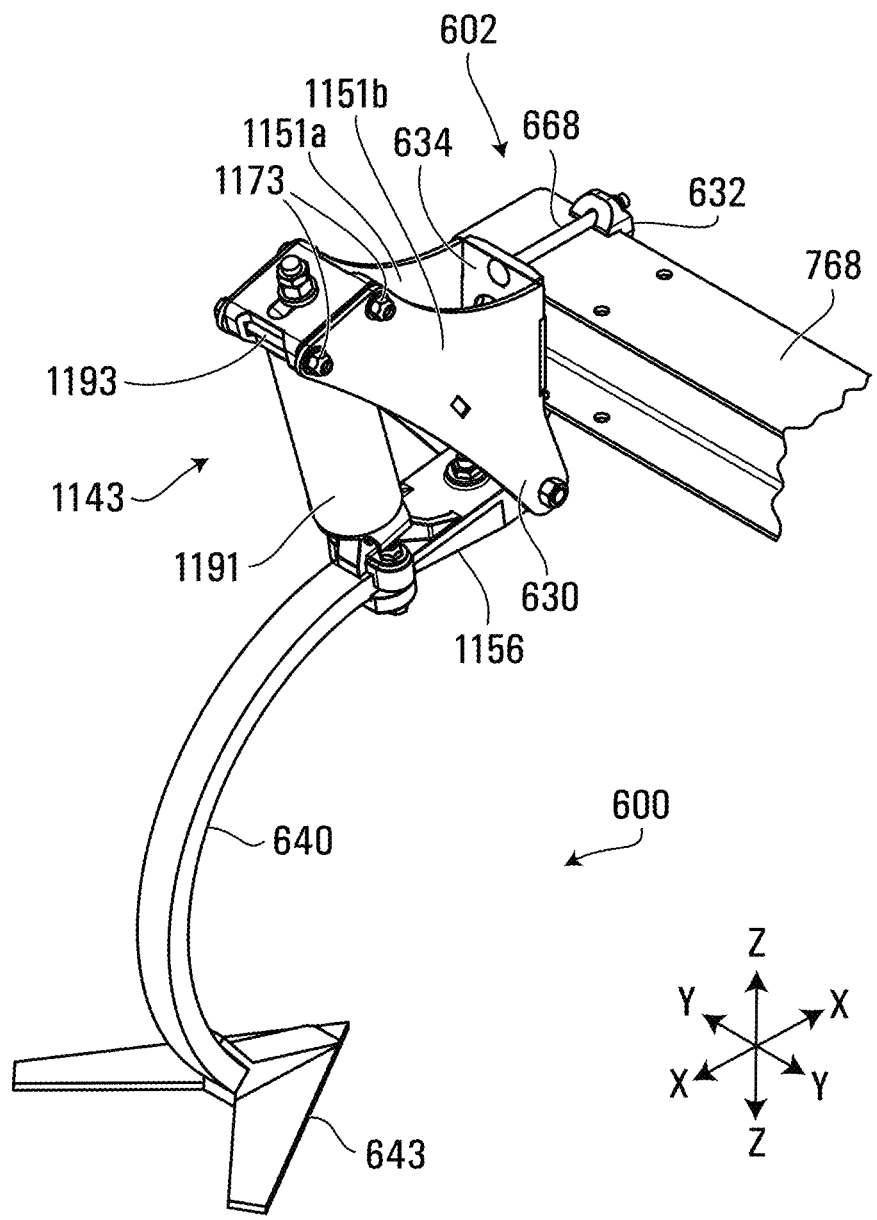
Figure 4D:
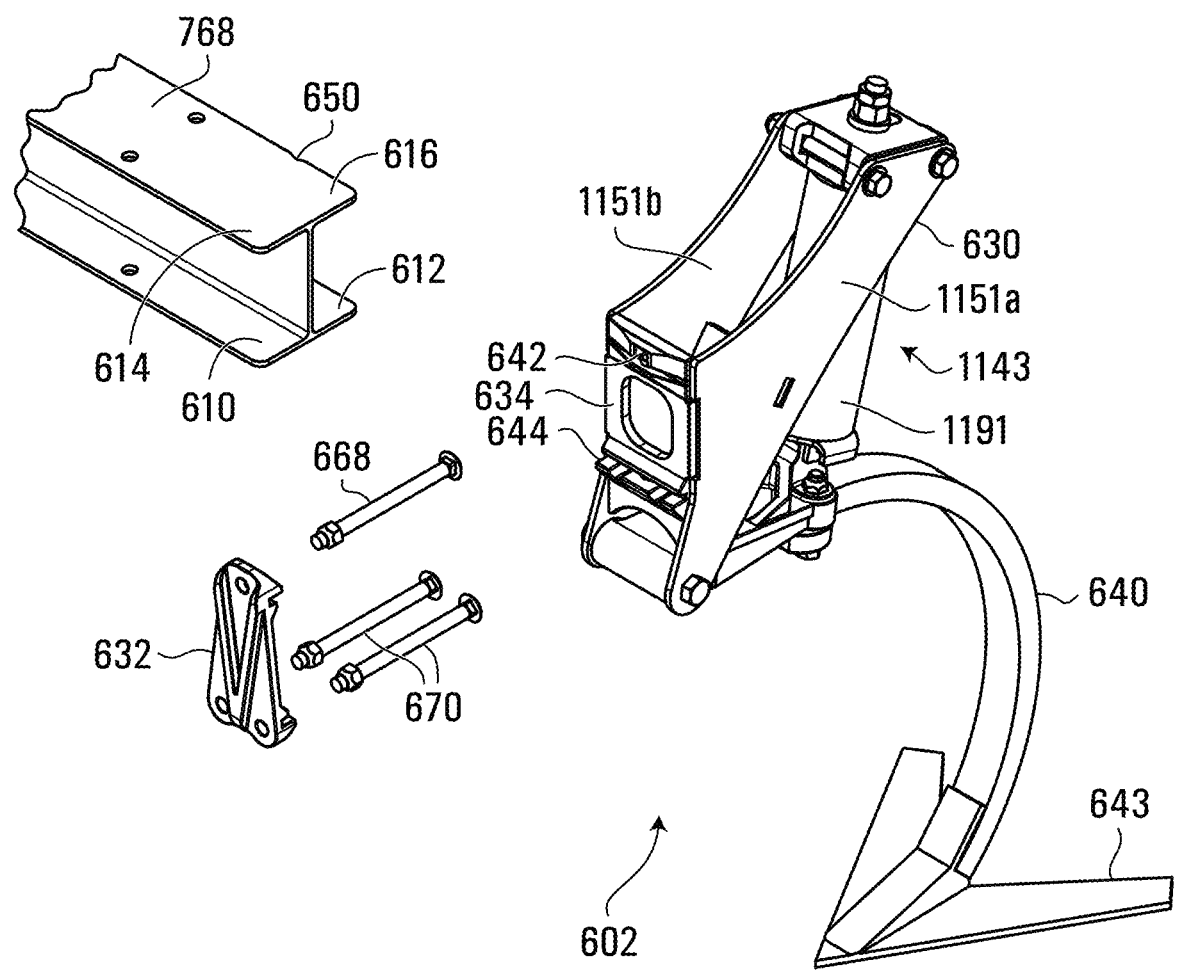
FIGS. 4D and 4E are partially exploded front and rear perspective views of the portion of the ground engager mount and open member shown in FIGS. 4B and 4C.
Figure 4E:
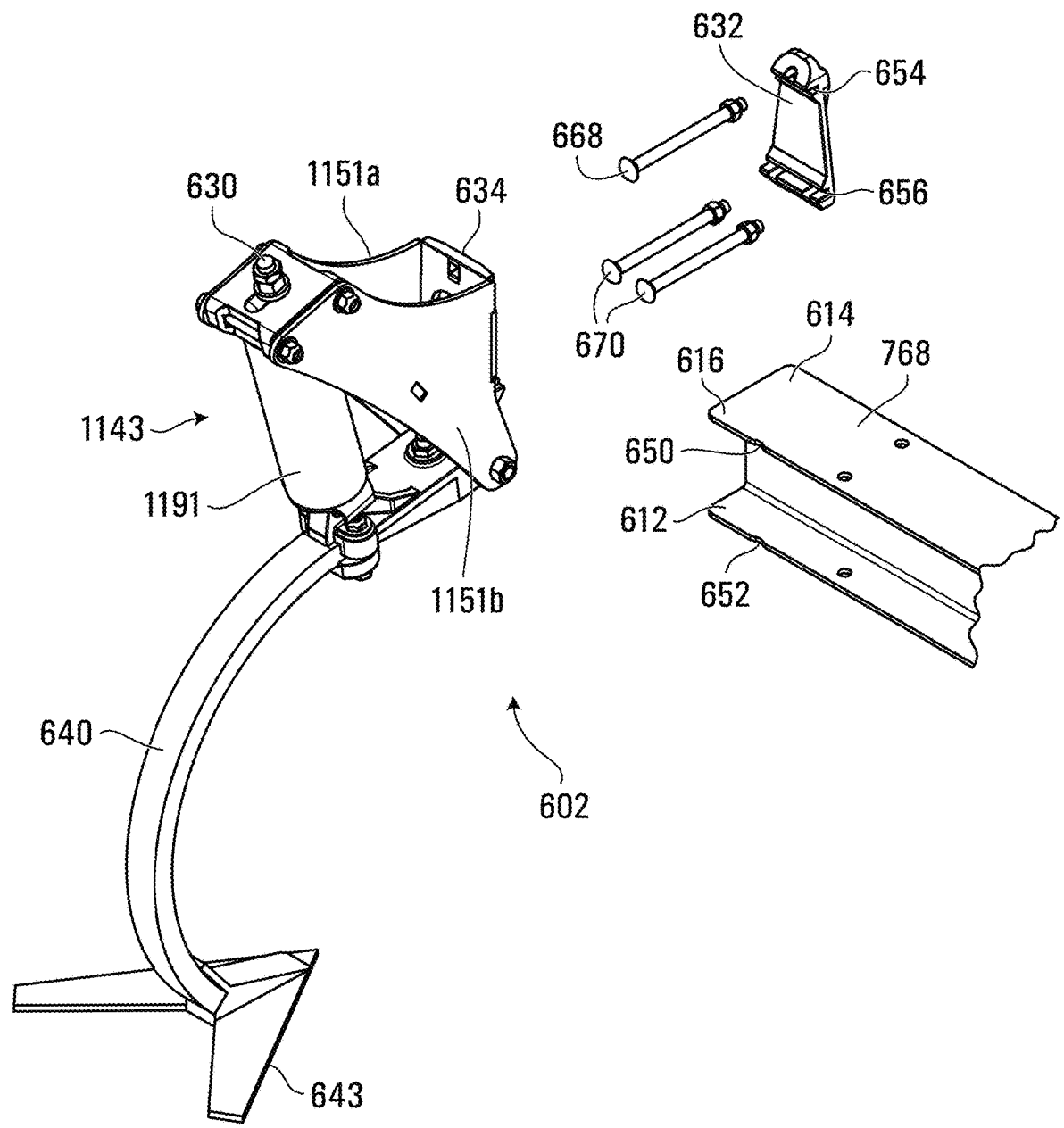
Figure 4F:
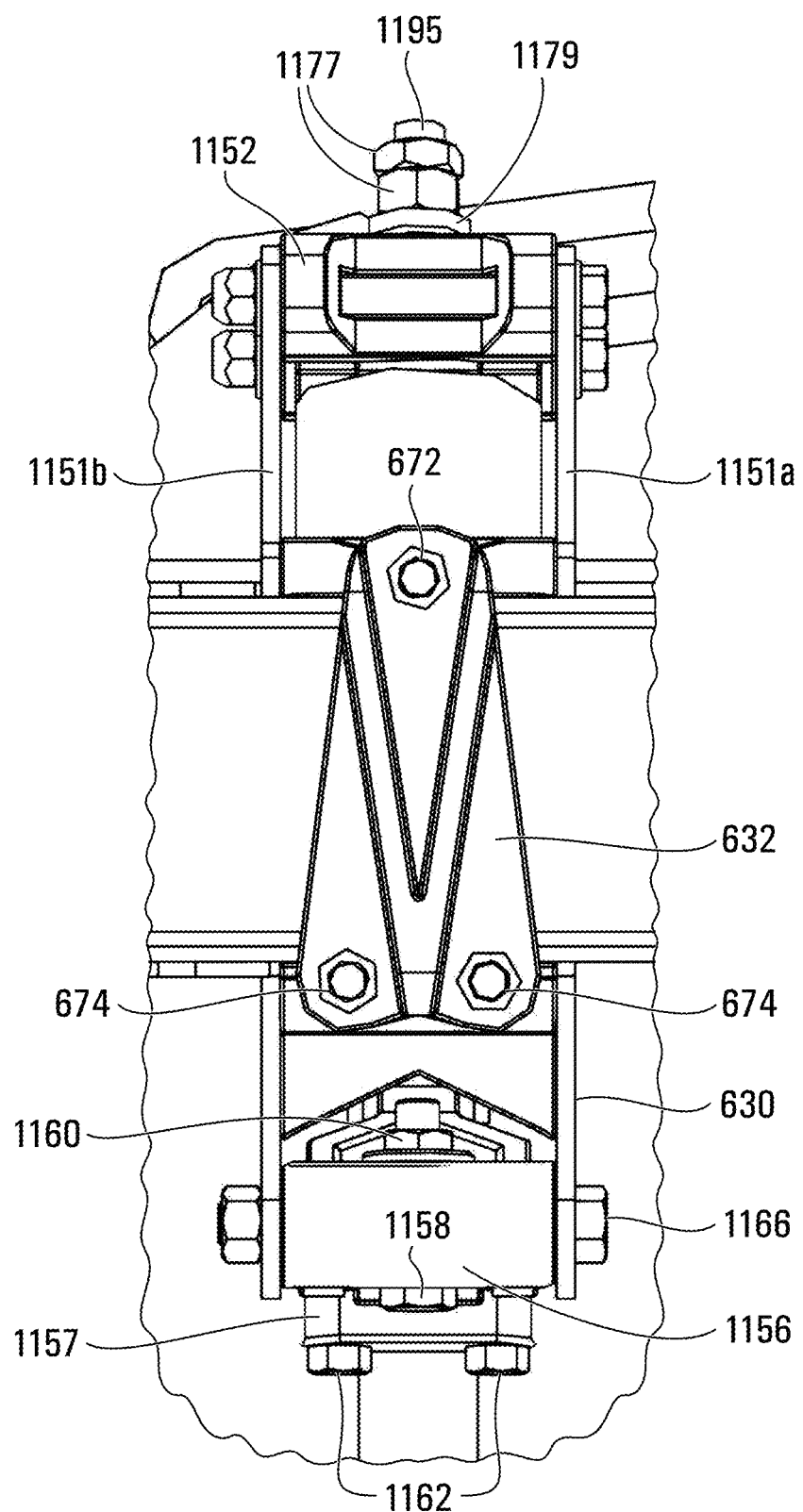
FIG. 4F is a front view of a portion of the farm implement shown in FIG. 1.

Referring now to FIGS. 4A to 4I, representative ground engager 600 from the rows of ground engagers 522, 524, 526, 528 (FIG. 2) is illustrated in further detail. Ground engager 600 may be in a chisel plow configuration and may include a ground engager mounting assembly (also referred to as ground engager mount or connecting assembly) 602, which operates to secure ground engager 600 to a transverse member such as transverse member 768, as will be described in further detail below. Ground engager mounting assembly 602 may include a rear support unit 630 (also referred to as a rear mounting plate or first vertical connector plate) coupled to flanges 612 and 616 and a front support bracket plate (also referred to as a front support, front mounting plate or second vertical connector plate) 632 coupled to the front lower and upper flanges 610, 614 respectively (FIG. 4B) such that rear support unit 630 and front support 632 sandwich transverse member 768 therebetween. Front support 632 may be interconnected to rear support unit 630 by a clamping assembly which may include least one clamping member such as metal nuts/bolts 668 and 670 (FIG. 4D). Nuts/bolts 668, 670 may be standard specification grade 8 fasteners. Through this arrangement, transverse member 768 is sandwiched between rear support unit 630 and front support 632 to securely locate and retain ground engager 600 on transverse member 768.

Figure 6A:
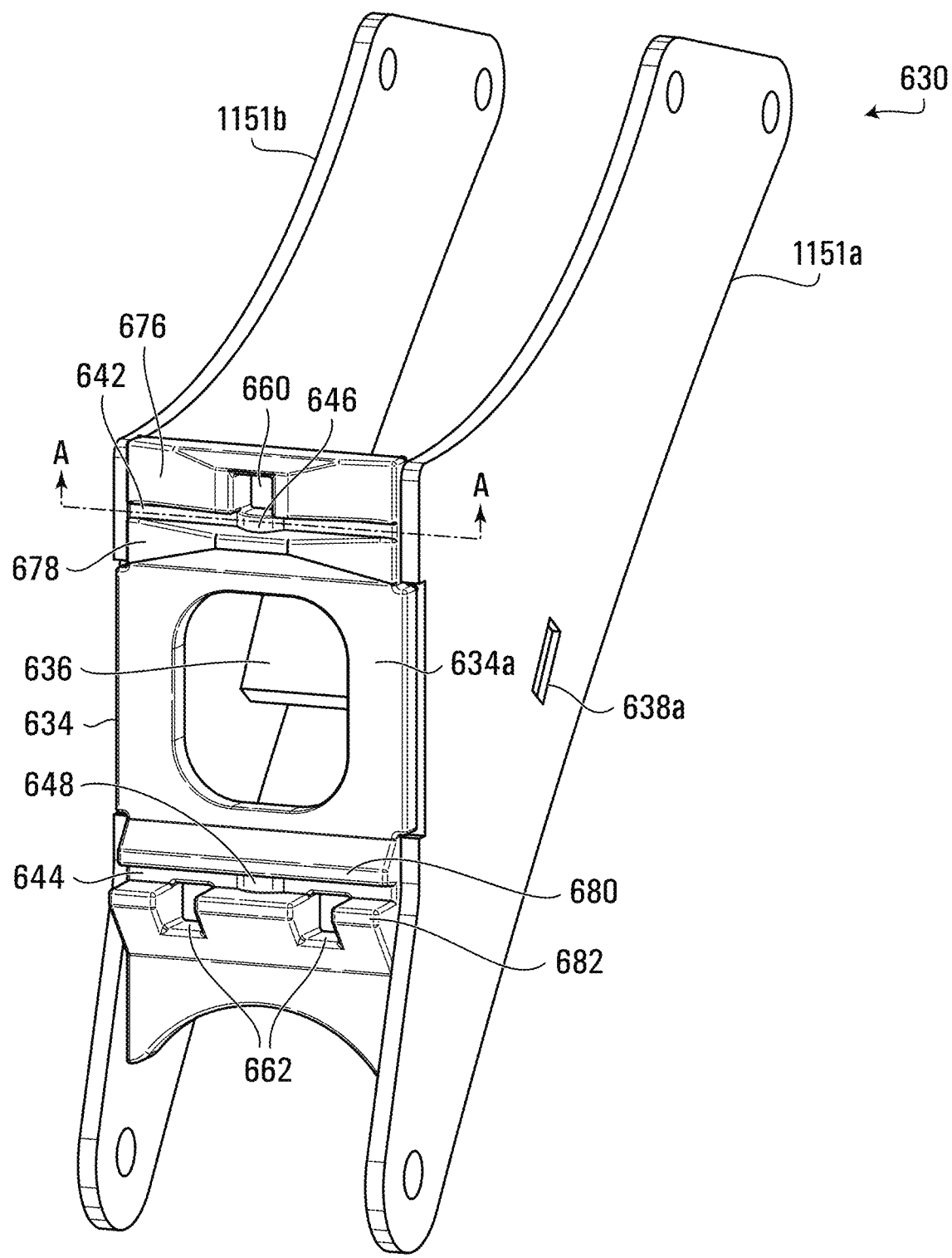
FIG. 6A is a front perspective view of a rear support of the ground engager mount of FIGS. 4B and 4C.
Figure 6B:
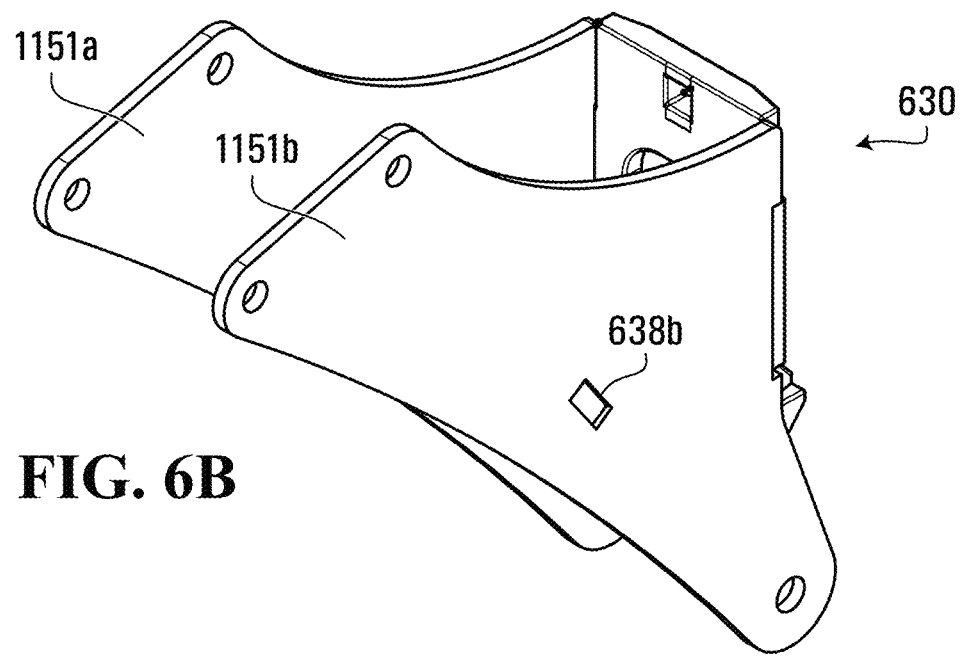
FIG. 6B is a rear perspective view of a rear support of FIG. 6A.
Figure 6C:
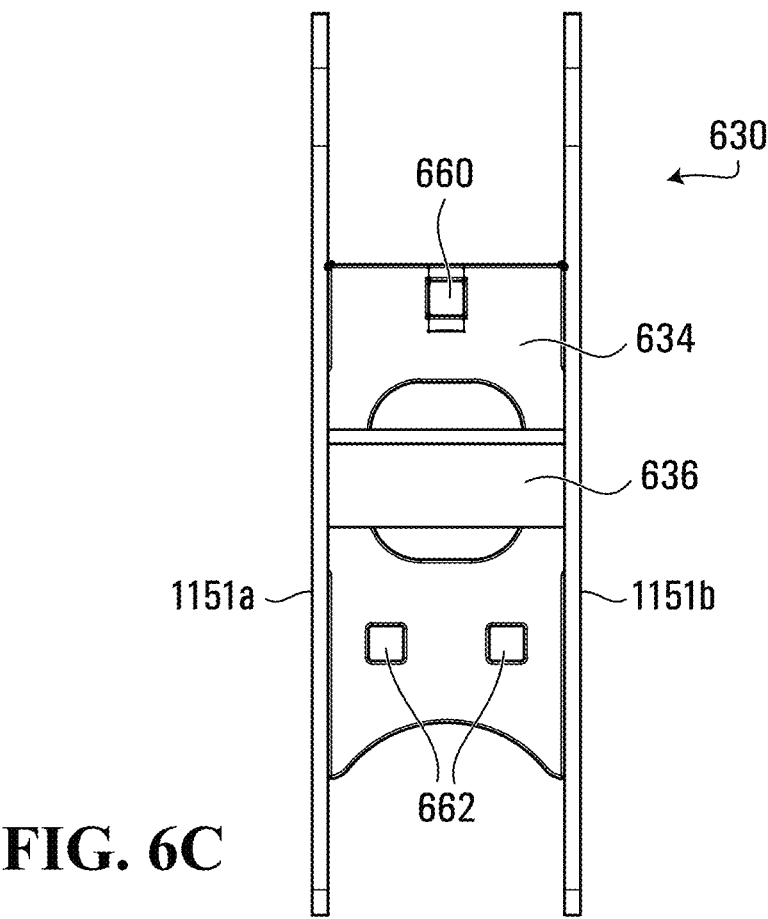
FIG. 6C is a rear view of the rear support of FIG. 6A.

Turning to FIGS. 6A-D, rear support unit 630 may include a pair of vertically and longitudinally extending support struts 1151a, 1151b the front edges of which are fixedly interconnected (such as by welding) by a transversely and vertically extending rear support plate 634. Rear support unit 630 may also include a rectangular transversely and vertically extending angled plate 636 having tabs that are received in appropriately and correspondingly configured slots 638a, 638b of support struts 1151a, 1151b in order to provide additional strength and rigidity to rear support unit 630 (FIG. 6C). The rigidity and strength of support struts 1151a, 1151b (and therefore rear support unit 630 as a whole) may be enhanced by additional features such as ribbing, gussets or flanges on the surfaces of support struts 1151a, 1151b.

Figure 6D:
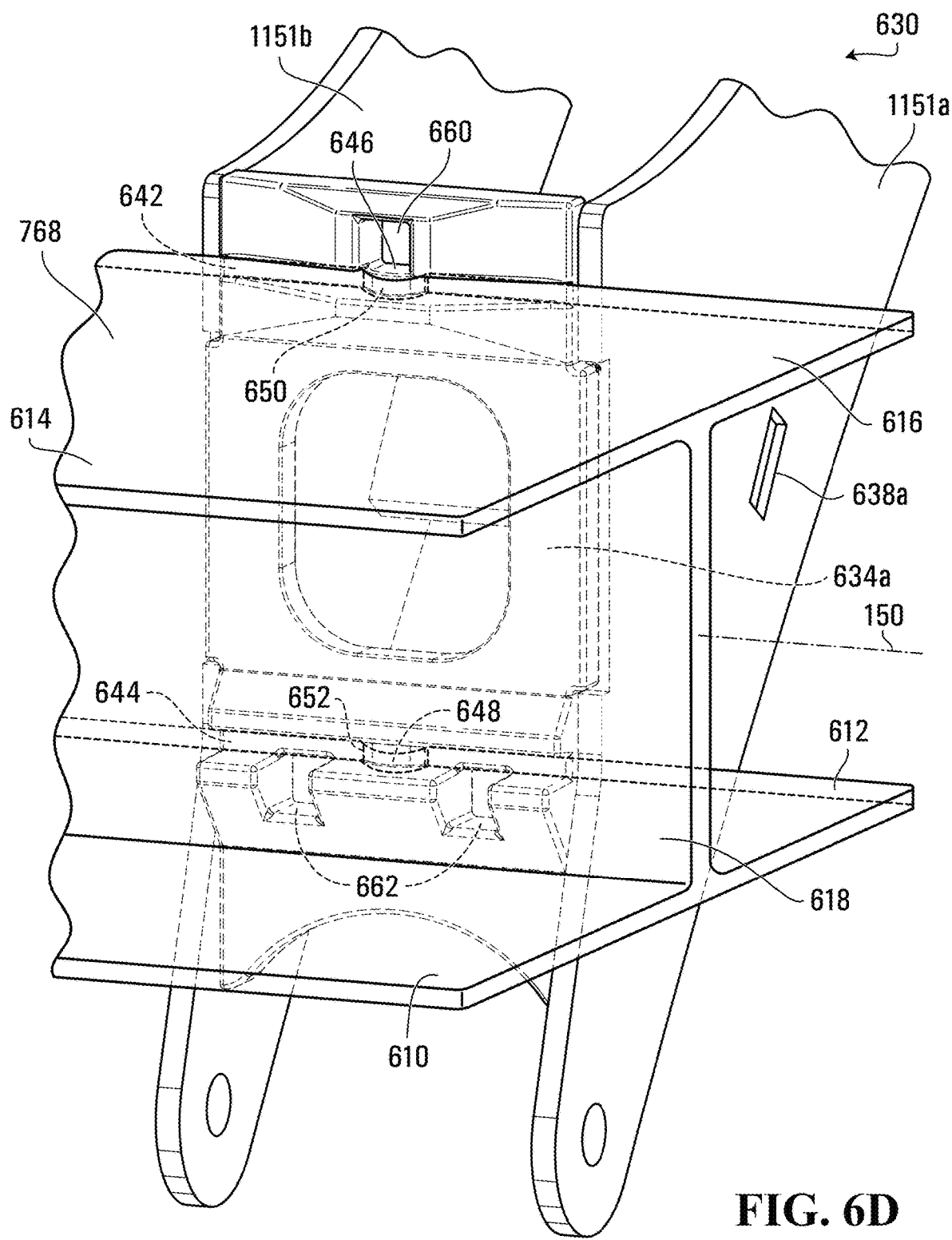
FIG. 6D is a front perspective view the front support of FIG. 6A, showing engagement with an open member.

With particular reference to FIGS. 6A and 6D, rear support plate 634 is configured to engage and retain one side of a transverse member 768. The front face 634a of rear support plate 634 (which generally extends vertically and transversely) may include a pair of vertically spaced, generally parallel recessed channels 642 and 644, having a vertical height (Z-axis direction) and depth (in the X-axis direction) configured to engage an edge portion of upper side flange 616 and a lower side flange 612 respectively of transverse member 768. Upper and lower channels 642, 644 may extend transversely across front face 634a. Upper channel 642 and lower channel 644 may generally extend across the entire width of plate 634. Upper channel 642 may be defined by a pair of upper and lower vertically spaced-apart flanges 676 and 678 respectively, which may be roughly truncated triangle shaped in a horizontal cross-sectional profile. Lower channel 644 may be defined by a pair of upper and lower vertically spaced-apart flanges 680 and 682 respectively, which may also be roughly truncated triangular shaped in a horizontal cross-sectional profile. Flanges 676, 678, 680 and 682 may additionally function to strengthen rear support plate 634.

Front support plate 634 may be integrally formed as a single piece/formed using a single piece of material such investment cast steel by a suitable method such as casting. Other main parts of rear support unit 630 (eg. elements 1151a, 1151b) and the components of front support 632 can be made from a suitably strong material such as a case iron or cast steel.

At a medial transverse position (such as at an approximate mid-point) along the transverse length of channel 642 may be a raised and rounded knob/protrusion/raised surface area 646, projecting horizontally forwards within channel 642. Similarly, at an approximate mid-point along the length of channel 644, may be a raised and rounded knob/protrusion/ raised surface area 648, projecting horizontally forward within channel 644. Protrusions 646 and 648, may be transversely aligned with each other about a common vertical axis (about a common vertical and longitudinal plane) and may have a roughly semi-circular horizontal cross-sectional profile (i.e. have outward facing surfaces that are semi-cylindrical or hemispherical in relation to a vertical and transverse plane) and are sized to be matingly received by and at least partially within respective semi-cylindrical indentations 650 and 652 in flanges 616 and 612 of transverse member 768 as illustrated in FIG. 6D. By way of example only, for a flange 616, 612 having a depth of about ¼ inch, and corresponding channels 642, 644 being slightly larger than ¼ inch, semi-cylindrical indentations 650, 652 may have a diameter in a horizontal plane in the range of ¼ to ⅝ inch. Protrusions 646, 648 also may have corresponding diameter in a horizontal plane in the range of ¼ to ⅝ inch.

When mounting a rear support unit 630 to transverse member 768, moving the support unit 630 relative to transverse member 768 in relative transverse movement to each other, it will be evident to an operator, when upper flange 616 is received within channel 642 and lower flange 612 is received within channel 644, when protrusions 646, 648 are aligned with indentations 650, 652, such that the rear support unit 630 is properly transversely positioned on transverse member 768 and the rear support unit 630 is vertically aligned and oriented generally orthogonally relative to transverse member 768. Thus, this arrangement can assist in positioning and orienting rear support unit 630 in the correct location and orientation on transverse member 768 during installation, which may reduce the time taken for an operator to assemble ground engager mount assembly 602.

Figure 6E:
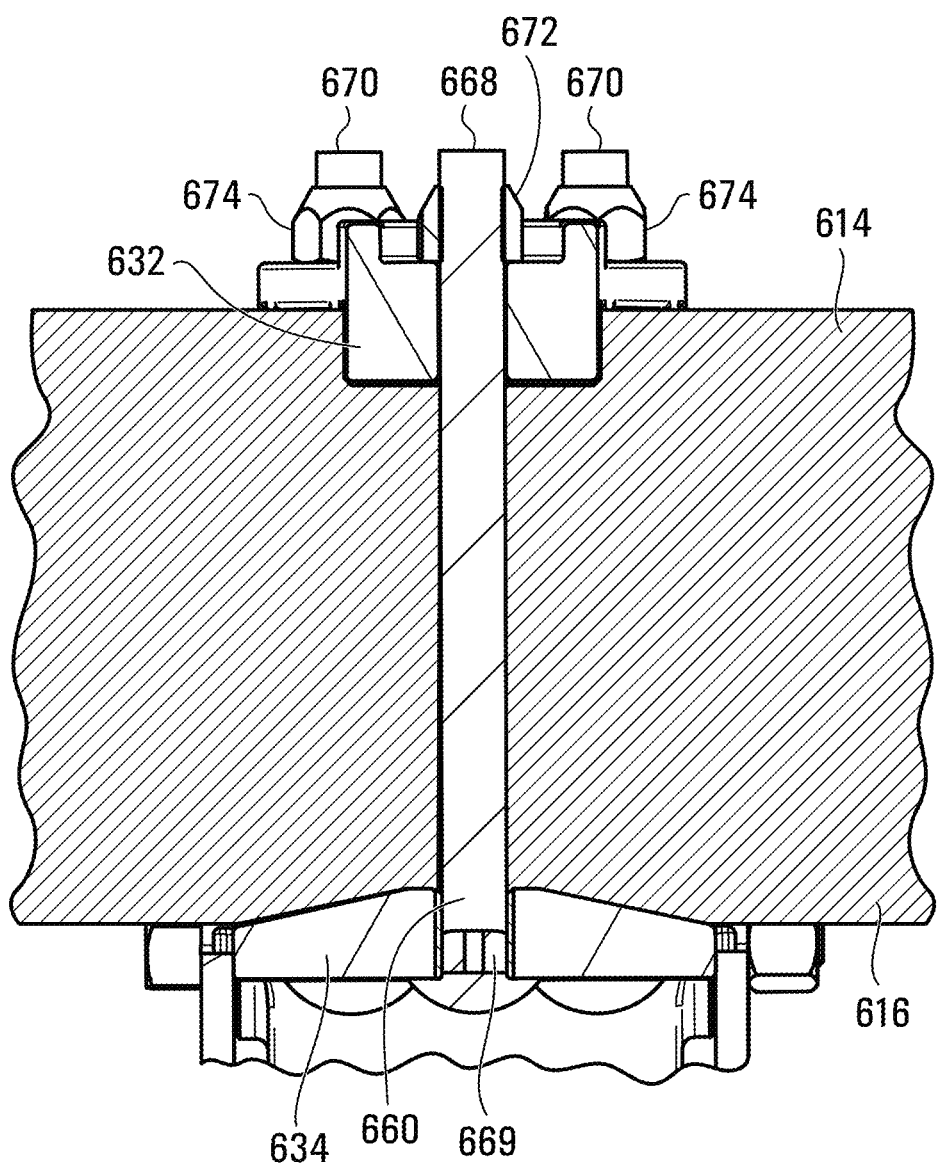
FIG. 6E is a top cross-sectional view of the engager mount and open member of FIGS. 4A and 4B.
Figure 7A:
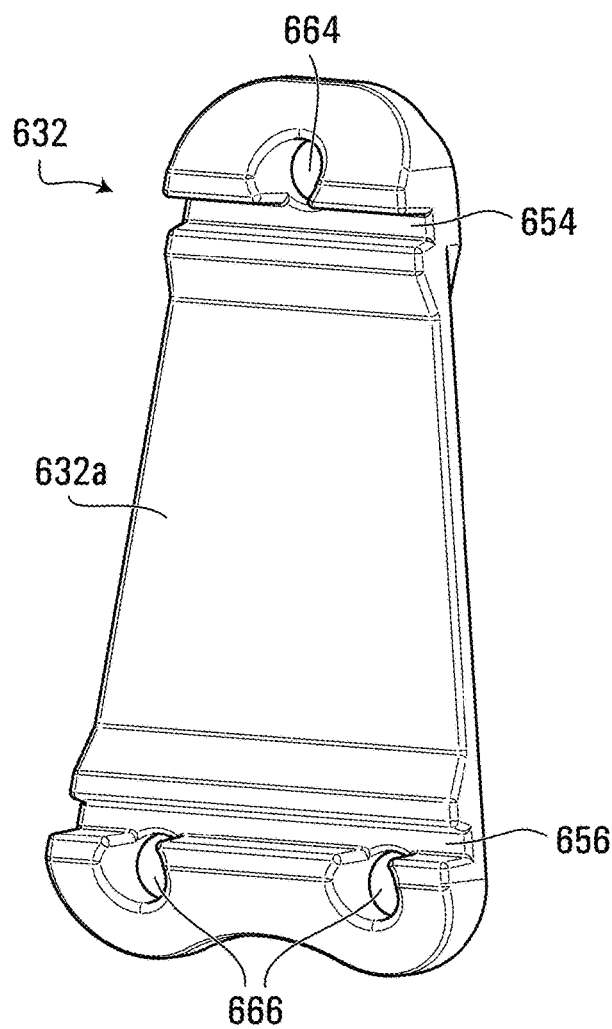
FIGS. 7A and 7B are rear and front perspective views of a front support of the ground engager mount of FIGS. 4B and 4C.
Figure 7B:
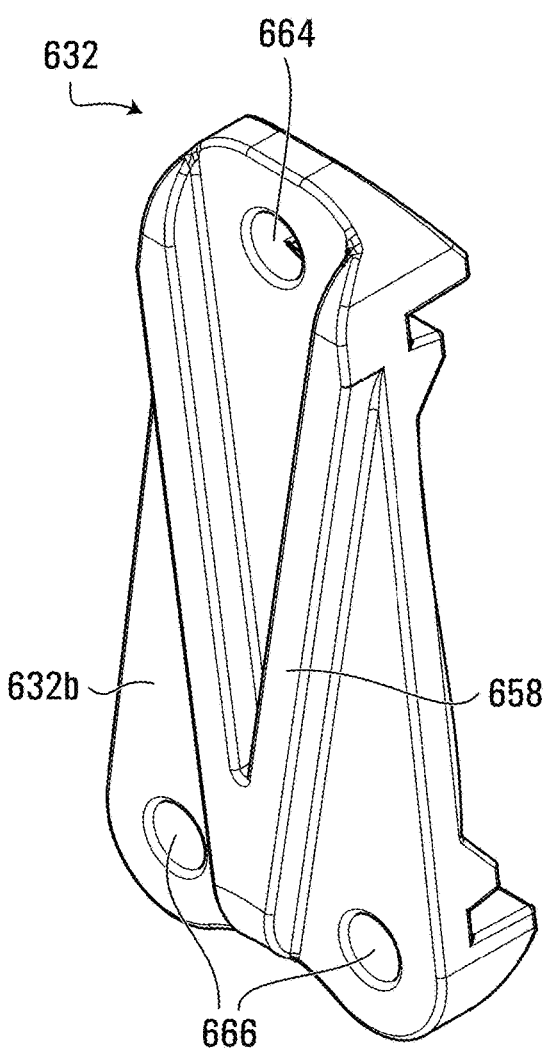
Figure 7C:
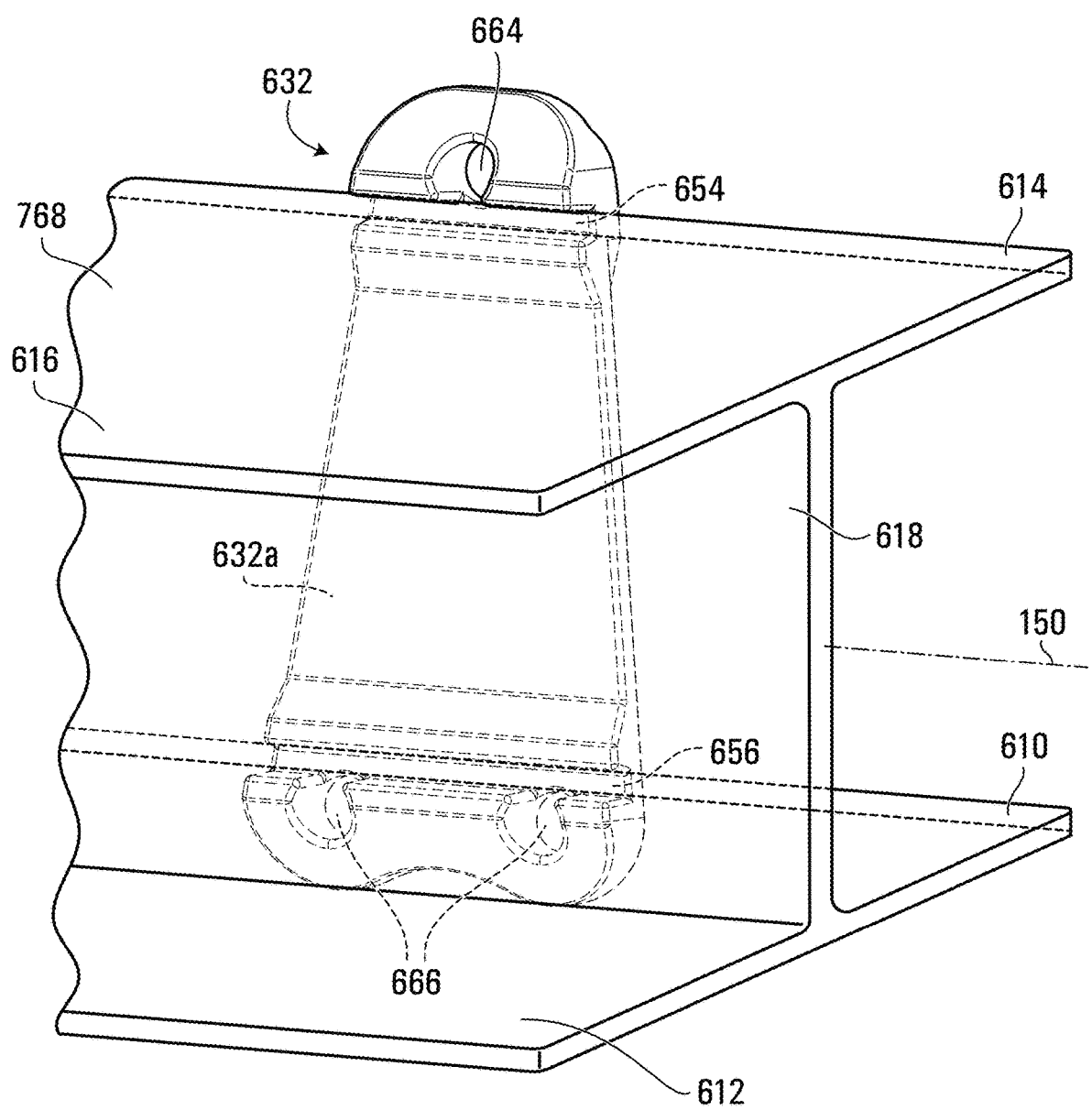
FIG. 7C is a rear perspective view the rear support of FIG. 7A, showing engagement with an open member.
Figure 8:
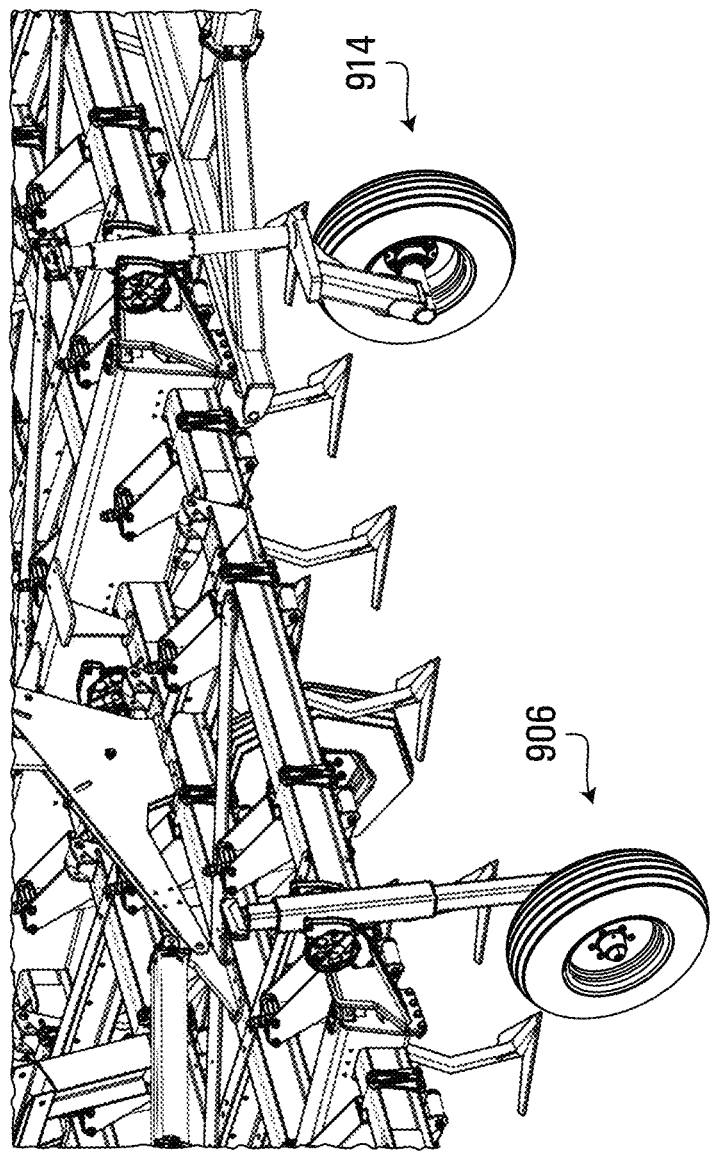
FIG. 8 is an enlarged front perspective view of another portion of the farm implement shown in FIG. 1.

At the upper end of rear support plate 634 may be an upper opening 660 extending therethrough, which may be square in cross section. Opening 660 may be open to channel 642 at the bottom end. Additionally, the lower end of rear support plate 634 may include a pair of spaced apart lower openings 662 at the lower end of plate 634, which may also be square in cross section. Openings 662 may be open to channel 644. Upper opening 660 may be positioned to approximately align with the horizontal/transverse midpoint between openings 662 such that openings 660 and 662 have a generally triangular relationship. With reference to FIGS. 4D, and 6C-E, bolts 668, 670 may be received through openings 660 and 662. Referring now to FIGS. 7A to 7C, front support 632 is illustrated in detail. The rear face 632a may include a pair of horizontally aligned generally parallel recessed channels, specifically upper channel 654 and lower channel 656. Channels 654, 656 are operable to engage and accommodate the respective upper and lower side flanges 614, 610 of transverse member 768. The front face 632b (FIG. 7B) of front support 632 may include a generally V-shaped, raised and integrally formed, gusset 658 which may provide additional strength and dimensional rigidity to front support 632, particularly in the vertical direction. The stability gusset 658 provides to front support 632 may prevent bowing of front support 632 in its longitudinal (i.e. vertical) direction particularly as bolts 668, 670 are installed and tightened.

In a similar manner to rear support unit 630, front support 632 may have an upper opening 664 at the upper end and a pair of spaced apart lower openings 666 at the lower end (FIG. 7A). Upper opening 664 may be positioned in approximate alignment with the transverse mid-point between openings 666.

Openings 660, 662 in rear support unit 630 and openings 664, 666 in front support 632 may be positioned such that when positioned and received through such openings, bolts 668, 670 will be in close proximity to, and may have their bolt shafts in contact with, the outward facing surface of respective upper and lower flanges of the open member, preventing undesirable flexing of front support 632 in the x-direction (FIG. 4C).

With particular reference to FIGS. 6D and 7C, when ground engager mount assembly 602 is installed at a particular transverse location along the length of transverse member 768, upper channel 654 and lower channel 656 on rear face 632a of front support 632 engage the respective flanges 614 and 610 of member 768. At the same time, upper channel 642 and lower channel 644 of rear support plate 634 engage the respective flanges 616 and 612 of transverse member 768. Protrusions 646, 648, within channels 642 and 644 are received by indentations 650 and 652 and engage with each other at mating contact surfaces, which results in the precise location of each ground engager mount assembly 602.

Figure 6F:
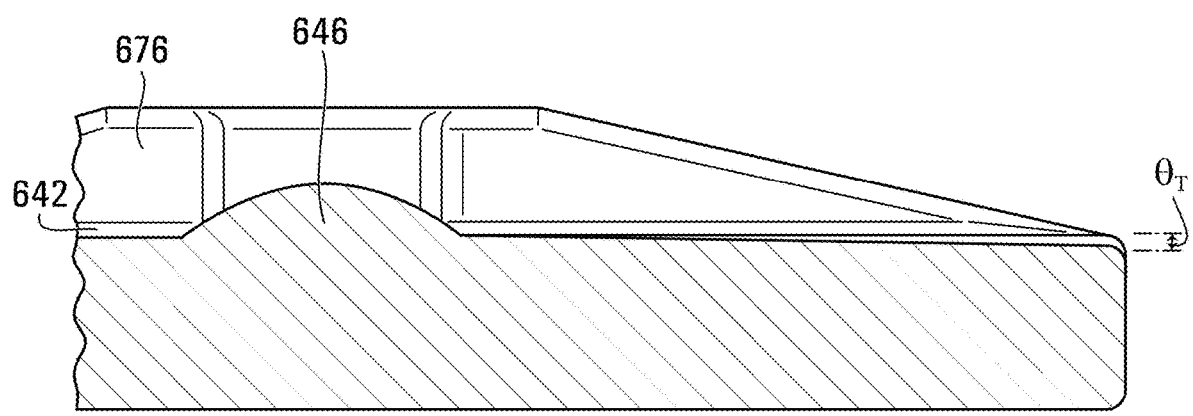
FIG. 6F is a bottom partial cross-sectional view of the rear support of FIG. 6A at a horizontal plane defined by line A-A in FIG. 6A.

FIG. 6F is a bottom (upwards looking) cross-sectional view of channel 642, viewed along the line A-A in FIG. 6A, illustrating that either side of protrusion 646, channel 642 may be tapered away (in a rearwards direction) at a taper angle $\theta_T$ preferably at or about 1.0 degrees, towards the outside edge of channel 642. This allows for some clearance for flange 616 within channel 642 to accommodate the range of movement of protrusion 646 within indentation 650. Similarly, lower channel 644 may have the angled profile described above to accommodate movement of flange 612 within channel 644.

In an embodiment, upper and lower channels 642, 644 may not have protrusions, but may still be tapered away (in a rearwards direction) from either side of the horizontal midpoint of each channel in a similar manner to as described above. In this embodiment, the taper angle $\theta_T$ may be greater and preferably be in the range of 0.5 to 15 degrees. In this configuration, the greater taper on channels 642, 644 may create single contact pivot points or limited contact surface areas which may be at or proximate the mid-point of each channel to substantially perform the same function of the single contact pivot points created by protrusions 650, 652, as will be explained in greater detail below.

Similarly, upper channel 654 and lower channel 656 of front support 632 may be tapered from either side of the horizontal midpoint of each channel in a similar manner to as described above for channels 642 and 644. Further, when front support 632 and rear support plate 634 are manufactured as cast parts the tapered profile of channels 642, 644, 654 and 656 may ease the release of the cast parts from their respective molds.

When installed on transverse member 768, upper openings 660 and 664 of rear support plate 634 and front support 632 are axially aligned to receive upper bolt 668 therethrough. Similarly, the lower openings 662 and 666 are axially aligned to receive lower bolts 670 therethrough. Rear support plate 634 and front support 632 may be drawn together towards transverse member 768 when nuts 672, 674 are tightened on respective bolts 668, 670.

With reference to FIG. 6E, in an embodiment bolts 668, 670 are carriage bolts and the square cross-section of openings 660 and 662 accommodate the square neck portions of the carriage bolts therewithin. For example, as shown in FIG. 6E, the square neck portion 669 of bolt 668 is received within square opening 660. Square neck portion 669 ensures that bolt 668 will not rotate when installed, reducing the likelihood that bolt 668 will become loosened during operation. Further, during installation an operator is not required to hold bolt 668 to prevent rotation when installing nut 672, making assembly easier. As opening 660 may be positioned proximal and be open to channel 642 and openings 662 may be positioned proximal and be open to channel 644, the shafts of bolts 668, 670 can be located in close proximity or be actually in contact with the outward facing surfaces of respective upper flanges 614, 616 and lower flanges 610, 612 of the open member 768. Since the transverse dimensions of the upper and lower flanges are substantially constant during operation of the implement 100 as it is moved operationally across the terrain such as during tilling or seeding of the ground material, if the bolts are positioned close or in contact with the outward facing surfaces of the upper and lower flanges of transverse member 768, then neither plate 634 and rear support unit 630 as a whole, nor front support 632 will be subject to significant bending forces as a result of the plates being forced inwards onto the upper and lower flanges by the bolt/nut compression forces acting on the front support 632 and rear support unit 630. This may reduce or substantially prevent flexing of plate 634 and rear support unit 630 as a whole, as well reducing or substantially preventing flexing of front support 632.

If bolts 668, 670 are positioned a significant distance, vertically spaced from the outward facing surfaces of upper and lower flanges of the open member 768, this may allow support plate 634/rear support unit 630, as well as front support 632, to flex to a greater extent in the x-direction, for example during installation of nuts 672, 674. Extensive flexing/bending may be undesirable at least in some applications, as it may cause detrimental tension and compressive forces being applied to bolts 668, 670. This may result in nuts 672, 674 becoming loosened, and possibly even disengaged over time or break bolts 668, 670. Therefore, it is preferable that the shafts of bolts 668, 670 not be spaced more than 1/16 inch away from the outward facing surfaces of the upper and lower flanges.

During operation of farm implement 100, ground engagers 600 may, in response to engaging the surface 106, transmit forces causing flexing of one or more of the open members of frame 108 at least rotationally to facilitate the ground engagers following specific contours of the surface 106. This flexibility may be provided at least in part by the open member construction of the open members and the way in which they are interconnected. For example, with reference to FIG. 4B, when the ground engager 600 encounters a change in contour of surface 106, such as, for example, a change in slope, a mound, or a hill, the ground engager 600 may torque and flexibly rotate transverse member 768 about its longitudinal axis 150 (in the Y axis direction of FIG. 1). Lower side flanges 610, 612, upper side flanges 614, 616 and web 618 of transverse member 768 may exhibit a degree of torsional flexing, depending on the direction and magnitude of the forces transferred through ground engager 600.

Repeated flexing and twisting of the open members of frame 108 as farm implement 100 travels over uneven ground described above may result in alternating tension and compressive forces being applied to ground engager mount 602. In a mounting that employs a four-point connection such as two transversely spaced connections above the upper flange and two transversely spaced connections below the lower flange, such forces may cause a ground engager mount to shift position along a support member like transverse member 768 and may loosen the bolts and nuts such as through over stretching of the bolt shank causing plastic longitudinal deformation of the bolt shank. Any repeated stretching of bolts 668, 670 is undesirable as this will result in nuts 672, 674 becoming loosened, disengaged, yielded, or even broken over time.

However, with particular reference to FIGS. 4A-F and FIG. 6D, a three bolt/nut combination in a generally triangular configuration (i.e. triangular in generally transverse and vertical directions) can significantly enhance the ability of the connection between the ground engager mount and the supporting structural member to remain tight on the transverse member. By maintaining a relatively high frictional force between the front and rear supports and the structural support member, this assists in keeping the front and rear supports, and thus the ground engager supported thereby, substantially fixed in position on the structural support member. For example, there may be provided, the combination of the engagement of a single longitudinally oriented upper bolt 668 connection through rear support unit 630 and front support 632 passing above the upper flange 614/616 of transverse member 768 and the engagement of a pair of transversely spaced, longitudinally oriented lower bolts 670 through rear support unit 630 and front support 632 beneath the lower flange 610/612 of transverse member 768 with the upper bolt 668 located transversely between the two lower bolts 670. This provides a three-point, generally triangular, mounting connection that clamps the upper flanges 614/616 and lower flanges 610/612 of the transverse member 648 between the rear support unit 630 and the front support 632. This three-point connection is operable to aid in retaining ground engager mount 602 in its transverse position while maintaining tight compressive clamping forces acting on the open member 768. When in operation of the farm implement 100, the upper flanges 614/616 and lower flanges 610/612 of transverse member 768 flex, the contact between bolts 668, 670, rear support unit 630 and the front support 632, and the upper and lower flanges of transverse member 768 can be maintained, ensuring ground engager mount 602 is securely retained in position. Both rear support unit 630 and the front support 632 may be able to rotate to some extent with the flexing of the transverse member 768 while maintaining tight contact with the upper and lower flanges respectively (similar to the manner in which a three-legged stool can always find a steady support—in a single plane). This may substantially reduce or eliminate stretching forces (e.g. generally in the x-direction in FIG. 4C) applied to bolts 668, 670 during flexing of the open member.

Furthermore, the presence of protrusions 646, 648 on rear support unit 630 may further assist with retaining ground engager mount 602 tightly in position on the open member. First, the protrusions are accommodated within respective indentations 650, 652 as described above. This may also reduce the likelihood of any lateral movement of ground engager mount 602 along the open member during operation. This is especially important during seeding operations due to the importance of creating evenly spaced seed distribution will result in efficient land use and avoid overcrowding of crops.

Also, protrusions 646, 648 matingly engaging at contact surfaces with corresponding indentations 650 and 652 create single contact pivot points (single focused/narrow pivot contact surface areas) for the upper flanges 614/616 and lower flanges 610/612 to allow one and possibly both of the upper flanges 616/614 and lower flanges 610/612 to pivot laterally about the protrusions 646, 648, within the respective upper channel 642 and lower channel 644 of rear support unit 630. This can reduce the stretching forces transmitted to bolts 668, 670 that may otherwise result in loosening of nuts 672, 674 as the open member flexes during operation. A single pivot point (single narrow contact location surface area) for side flange 616 (and thus also for opposite flange 614) is created about protrusion 646 within indentation 650. Similarly, another vertically aligned pivot point (single narrow contact location surface area) for flange 612 (and thus also for opposite flange 610) is created about protrusion 648 within indentation 652. The vertical alignment of the upper and lower pivot points described above may ensure that the ground engager installed on the ground engager mount 602 is vertically and left/right transversely aligned on frame 108 in a level configuration for operation. Also, the size/configuration of the protrusions 646, 648 and their corresponding indentations 650, 652 may be selected to ensure that the ground engager is also installed on frame 108 in a manner that provides for suitable fore/aft positioning of the ground engager relative to vertical axis in a longitudinal direction. Through this arrangement, when agricultural implement passes over uneven ground surfaces, this can cause transverse open member 768 (and other transverse members) to twist about their longitudinal axes, causing upper flanges 612/610 and lower flanges 614/616 to flex or twist during operation of farm implement 100. The flange(s) may relatively easily pivot/move laterally at the upper and lower pivot points within the channels 644, 642 respectively about the protrusions. However, the three-point nut/bolt connection referenced above can accommodate some degree of flexing/twisting of the upper and lower flanges of the transverse member 768, as the upper nut/bolt combination and the lower two nut bolt combination, may also move/change their orientation to some extent along with the lower spaced rear support plate 634a and front support 632, without having to overstretch any of the bolts or distort the shape of the rear support plate 634a and front support 632. Thus, the upper and lower flanges of the open member are able to twist to some extent without applying significant additional stretching forces to bolts 668, 670 which may loosen nuts 672, 674.

Open section structural members tend to be relatively flexible in torsion and undergo relatively more deflection when subjected to torsion, compared to closed section members. As described above, open transverse members of frame 108 may generally be H-section beam members having upper and lower flanges of generally uniform width and thickness. As such, during flexing or twisting when subjected to torsion, the open members may have a shear center and centroid in generally the same position (on a neutral axis) at the vertical center of the vertical web. This may be beneficial in reducing or substantially eliminating differences in deflection of both the upper and lower flanges about the neutral axis when twisting. As described above, when the upper and lower flanges flex or twist, they will deflect and are able to pivot/move within the channels about the upper and lower pivot contact points provided by protrusions 646, 648 and their corresponding indentations 650, 652. The substantially uniform magnitude of deflection of the upper and lower flanges during twisting may contribute to keeping ground engager mounts in the same transverse position on the open member. The common degree of defection of the upper and lower flanges may reduce the likelihood that ground engager mount will shift transversely during repeated twisting of the open member.

It should be noted that the overall design layout and set-up of the construction of frame 108 will largely contribute to and be responsible for the degree of flexing of both transverse and longitudinal members, as front and rear wheeled support units follow uneven/undulating terrain. The ground engagers do not typically significantly influence the torsion in a unique way per their transverse position on a transverse member. Torsional effects of the ground engagers including loads imparted by their contact with the ground surface, may be mitigated in the design by the other beam to beam support elements. The combination of these support elements and the trip mechanisms as described above, tend to result in the torsional loads being mechanically "averaged" across the width of the frame.

This combination of features may thus reduce forces transferred to ground engager mount assembly 602 due to flexing of transverse member 768 and assist in the maintenance of the engagement with transverse member 768.

Securing ground engager mount 602 assembly using a three-point generally triangular configured connection mechanism, as opposed to a four-point connection, may enhance the prospects that the open member is not excessively constrained which may restrict the degree of flexibility of the open member and/or avoids imparting loads onto the components of ground engager mount assembly 602 that may distort the shape of the components thereof, resulting in a reduction in the integrity of the connection.

It should also be noted that by providing the pivot points within the upper and lower channels 642, 644 in combination with the flexibility of the three-point connection mechanism, as described above, may also accommodate some level of variations in the dimensions of the open members or upper and lower flanges due to manufacturing tolerances. To assist in providing proper vertical alignment of the front and rear supports of the ground engager, when mounted on the support member, the upper and lower indentations in the upper and lower flanges, may be machined in the open member such that they are each a constant distance (in the X direction across the flange) from the web of the support member. Thus, the web provides a datum. The degree to which the nuts are tightened on the bolts may accommodate any minor variation in the width of the upper and lower flanges of the support member arising from manufacturing variations within acceptable tolerances. Variations in the vertical height of the support member, for example due to variation in the height of the web or the thickness of the upper and lower flanges may be accommodated by tolerances with the width of channels 642, 644, 654 and 656.

While the illustrated embodiment shows the single bolt positioned above the upper side flanges of the transverse member 768 and two bolts below the lower side flanges, in other embodiments an opposite configuration could be provided instead.

Front supports 70 described above for rear towing hitch 56 (FIGS. 1A and 1B) may be configured in a similar manner to front supports 632. Front supports 70 and bolts 72/74 may cooperate to form a three bolt/nut combination and connection to upper and lower flanges of open member 708 in a generally triangular configuration similar to as described above for ground engager mount 602. In this manner, open transverse member 708 can be sandwiched between respective pairs of transversely spaced, vertically and transversely extending, rectangular mounting plates 58a/60a, and transversely spaced, vertically and transversely extending, triangular shaped front supports 70, each being clamped to transverse member 708 with a three-point fixed nut/bolt connection. Upper bolts 72 can be positioned to extend across, and have their shafts in contact with, the upward facing surface of the upper flanges of transverse member 708. Lower bolts 74 can be positioned to extend across, and have their shafts in contact with, the downward facing surface of the lower flanges of transverse member 708. This assembly can significantly enhance the ability of the connection between the rear towing hitch 56 and open member 708 to remain tight and substantially fixed and minimize/reduce repeated stretching of bolts 72, 74 that may result in nuts 76, 78 becoming loosened, disengaged, or even broken over time.

In an embodiment one or both of front supports 70 and mounting plates 58a/60a may be configured with upper and lower single pivot point/contact surface area connections. For example, one or more protrusions located within horizontally extending channels of front supports 70. Such protrusions may be like protrusions 646, 648 and be configured to engage indentations on the upper and lower flanges of the open transverse member 708 that are like indentations 650, 652. Similar to the arrangement described above, these protrusions will create single contact pivot points/contact surface area for the upper and lower flanges to allow one and possibly both of the upper and lower flanges to pivot laterally within the respective upper channels that the protrusions are located within. Thus, the upper and lower flanges of the open transverse member 708 are able to twist to some extent without applying significant additional stretching forces to bolts 72, 74 which may loosen nuts 76, 78.

In other embodiments, a different configuration of bolts 72/74 may be provided to connect rear hitch 56 to open member 708. For example, a single bolt 72 may be positioned at the lower surface of open member 708 and bolts 74 may be positioned on the upper surface of open member 708. Depending upon how the loads are applied to and carried on the hitch 56, having the twin bolts 74 at the upper surface of transverse member 708 may provide greater load carrying capacity.

Returning to the mounting arrangements for rear support unit 630 and the front support 632. FIGS. 4A, 4D-F and 6D illustrate a desirable three bolt/nut combination arranged such that the spacing between the bolts/nuts form an isosceles triangle with a relatively narrow spacing between the two bottom bolts at the base of the triangle. The ratio of the base of the triangle to the sides may be such that the sides are no shorter than about 2.5 times the length of the base and are preferably about 3 times the length of the base. In some embodiments, the sides may be greater than 3 times the length of the base of the triangle.

However, other geometric shapes are possible. For example, the three bolt/nut combination could be arranged in other triangular configurations, such as right angle, scalene, equilateral, acute or obtuse.

As described above, whilst the illustrated embodiment shows a single protrusion 646 in channel 642 and a single protrusion 648 in channel 644, both protrusions being vertically aligned, other configurations may be provided. Further, the total number of protrusions in either or both of channels 642 and 644 may be varied such that a channel could have more than one protrusion within it, while still providing a reasonable degree of flexibility in this connection.

In another embodiment, the combination of protrusions and indentations described above for rear support unit 630 and open member 768 could alternatively or additionally be present on front support 632. For example, upper channel 654 and lower channel 656 of front support 656 may each include a protrusion, similar to protrusions 646, 648 configured to be accommodated within indentations in the upper and lower flanges of open member 768. These features may function substantially as described above to further reduce forces transferred to ground engager mount assembly 602 due to flexing of transverse member 768 and assist in the maintenance of the engagement with transverse member 768. However, generally, the narrow triangular configuration of front support 632 is such that it is not relatively wide and thus flexing of the upper and lower flanges of member 768 within the upper channel 654 and lower channel 656 is not unduly restrained. If the overall configuration of the front support 632 were varied to be a generally wider triangular shape, then providing protrusions in the channels may provide some benefit in allowing flexing of the flanges within the channels of the front support 632.

Figure 4G:
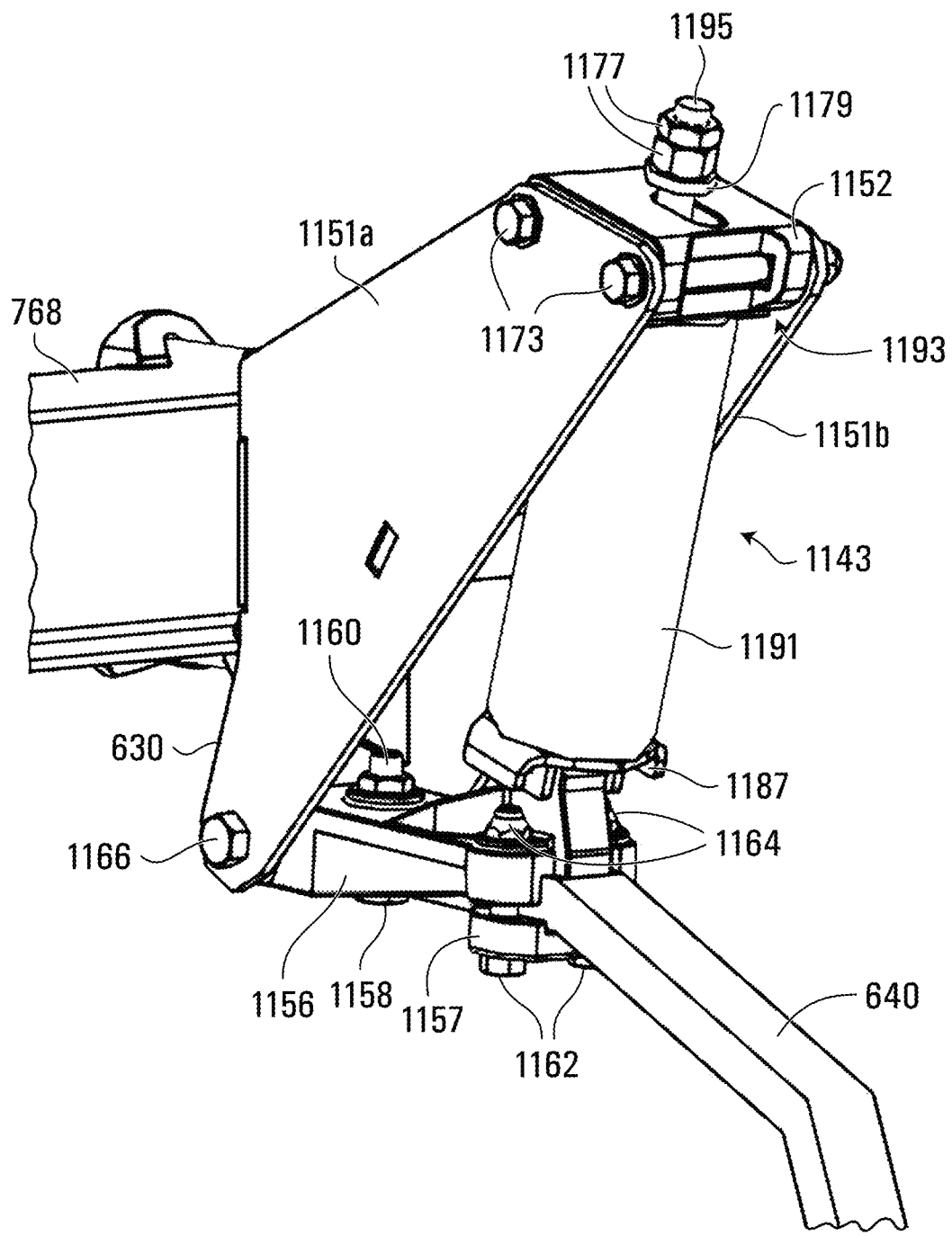
FIG. 4G is a rear perspective view of the portion of the farm implement shown in FIG. 4F.
Figure 4H:
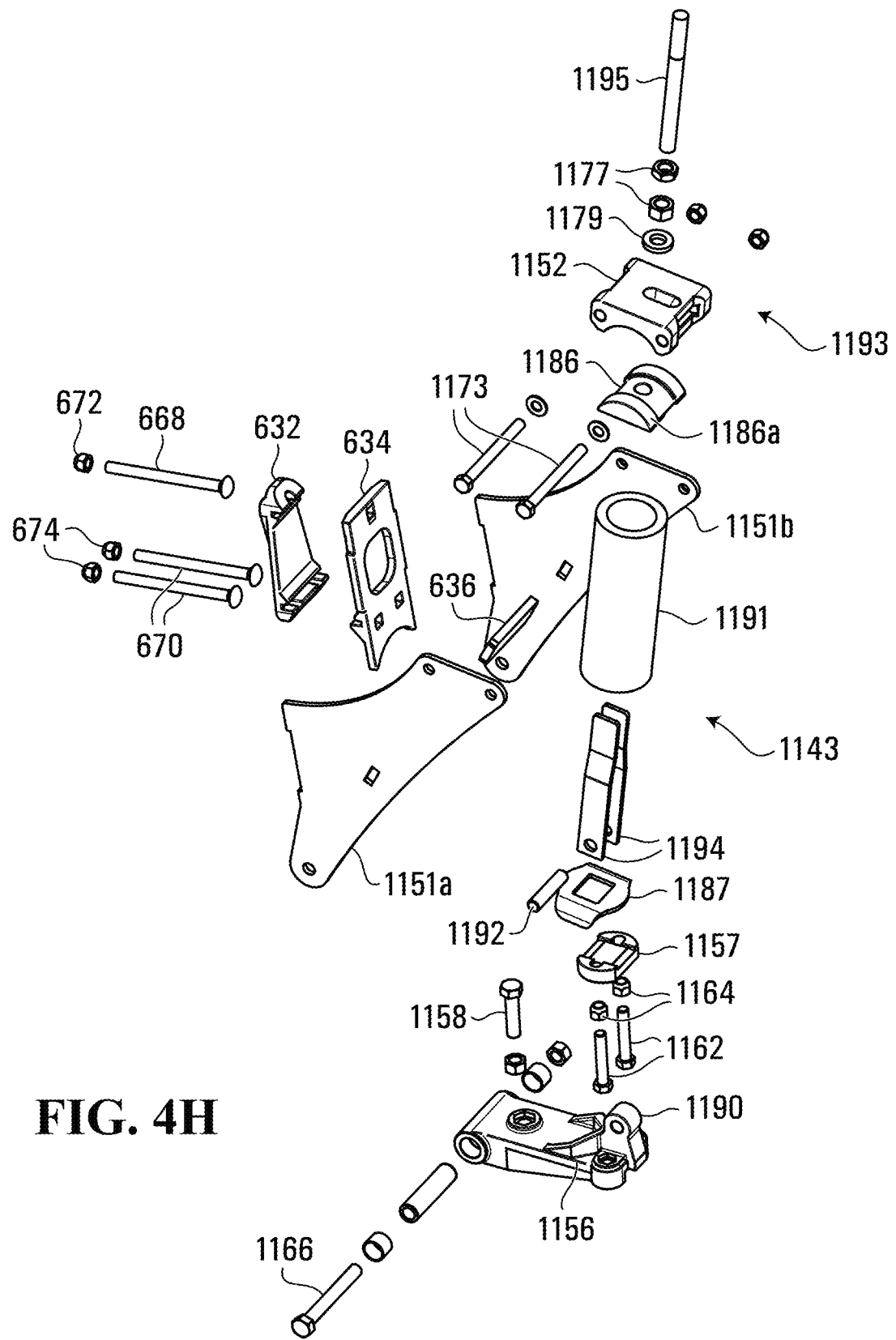
FIG. 4H is a partially exploded rear perspective view of the portion of the farm implement shown in FIG. 4G.

With particular reference to FIGS. 4G and 4H, each ground engager 600 may also include a shank member 640 which is fixedly connected to the connecting assembly by a mounting unit. The mounting unit includes pivotable support plate 1156 which is in turn connected to rear support unit 630 via a pivotable linkage 1166. In one embodiment shank member 640 includes a chisel shovel or plow 643 disposed at the lower end for engaging the ground surface 106 (FIG. 1). Pivotable support plate 1156 may have a longitudinal channel extending the length of its lower surface for receiving the upper end of shank member 640 therewithin. Shank member 640 may have an opening at the upper end in alignment with an opening extending vertically through the upper wall of the longitudinal channel operable to affix shank member 640 to support plate 1156 with a bolt 1158 and nut 1160.

At the rear end of support plate 1156, a mounting block 1157 operates to sandwich a section of the upper end of shank member 640. Mounting block 1157 may have a channel in the upper surface for receiving a section of shank member 640 therewithin. Mounting block 1157, shank member 640 and support plate 1156 are secured by a pair of bolts 1162 and nuts 1164.

Chisel shovel 643 of shank member 640 is operable to penetrate into and engage with the ground material (e.g. soil) beneath the ground surface 106 and are moved through and till the soil, preferably at a desired and consistent depth within the ground material. Such engagement and/or conditioning may be used to prepare the ground material for planting and growing crops such as by preparing a seed bed as well as uprooting weeds and any cover crops to minimize competition for nutrients with the preferred crop.

Figure 4I:
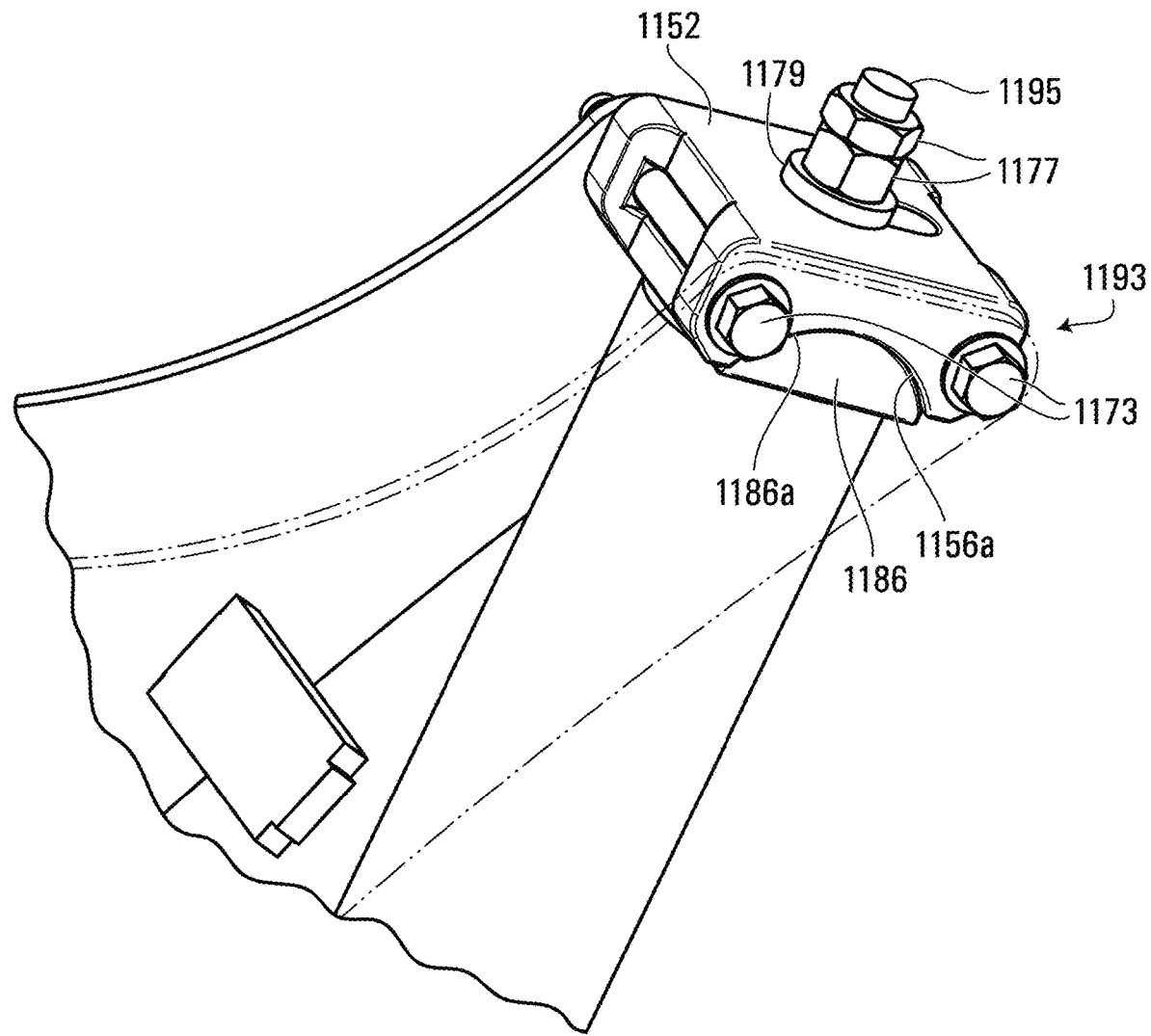
FIG. 4I is a is a perspective view of some components of a spring trip mechanism forming part of the apparatus of FIG. 1.
Figure 4J:
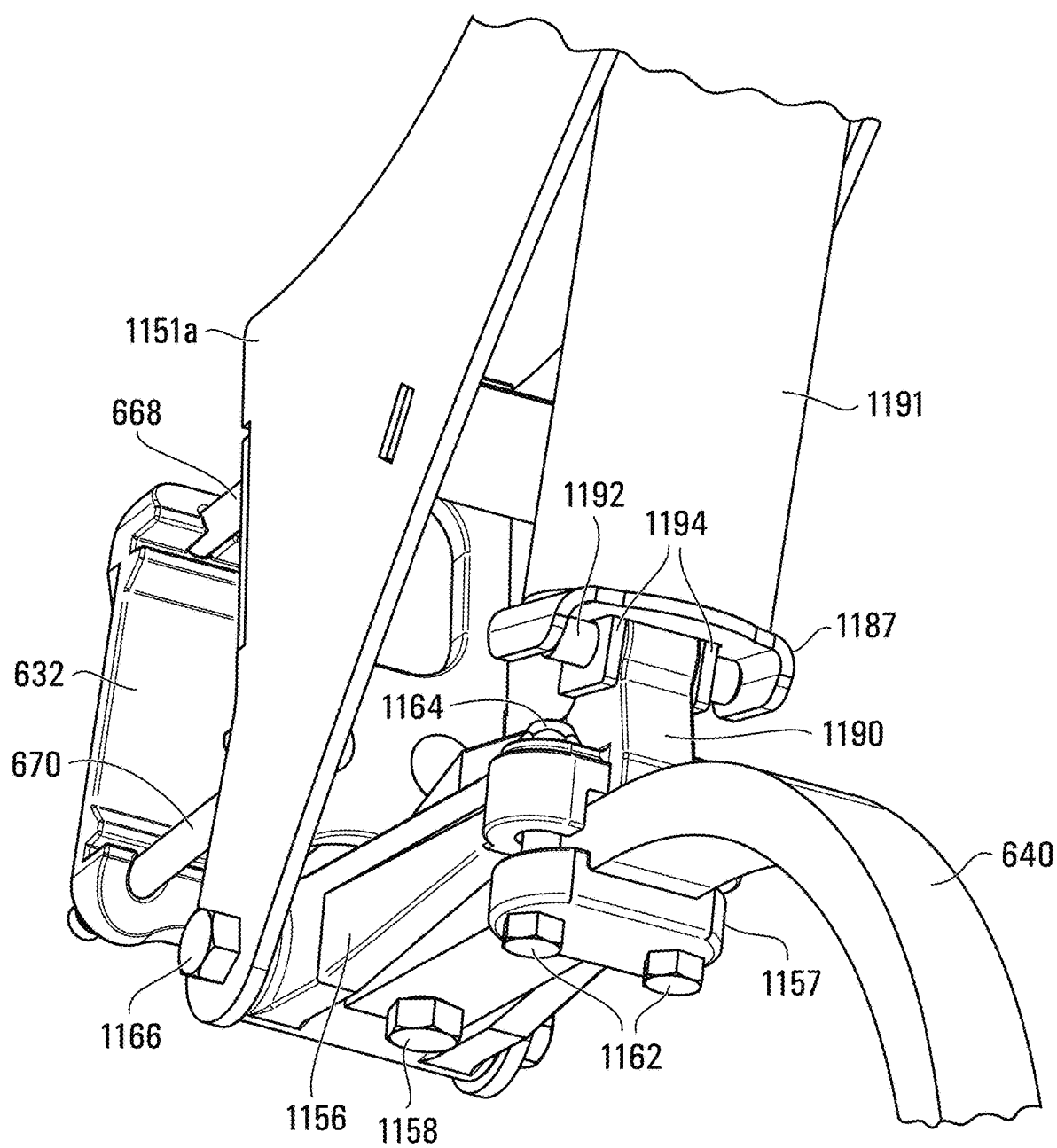
FIG. 4J is rear perspective view of the portion of the farm implement in FIG. 4G.
Figure 4K:
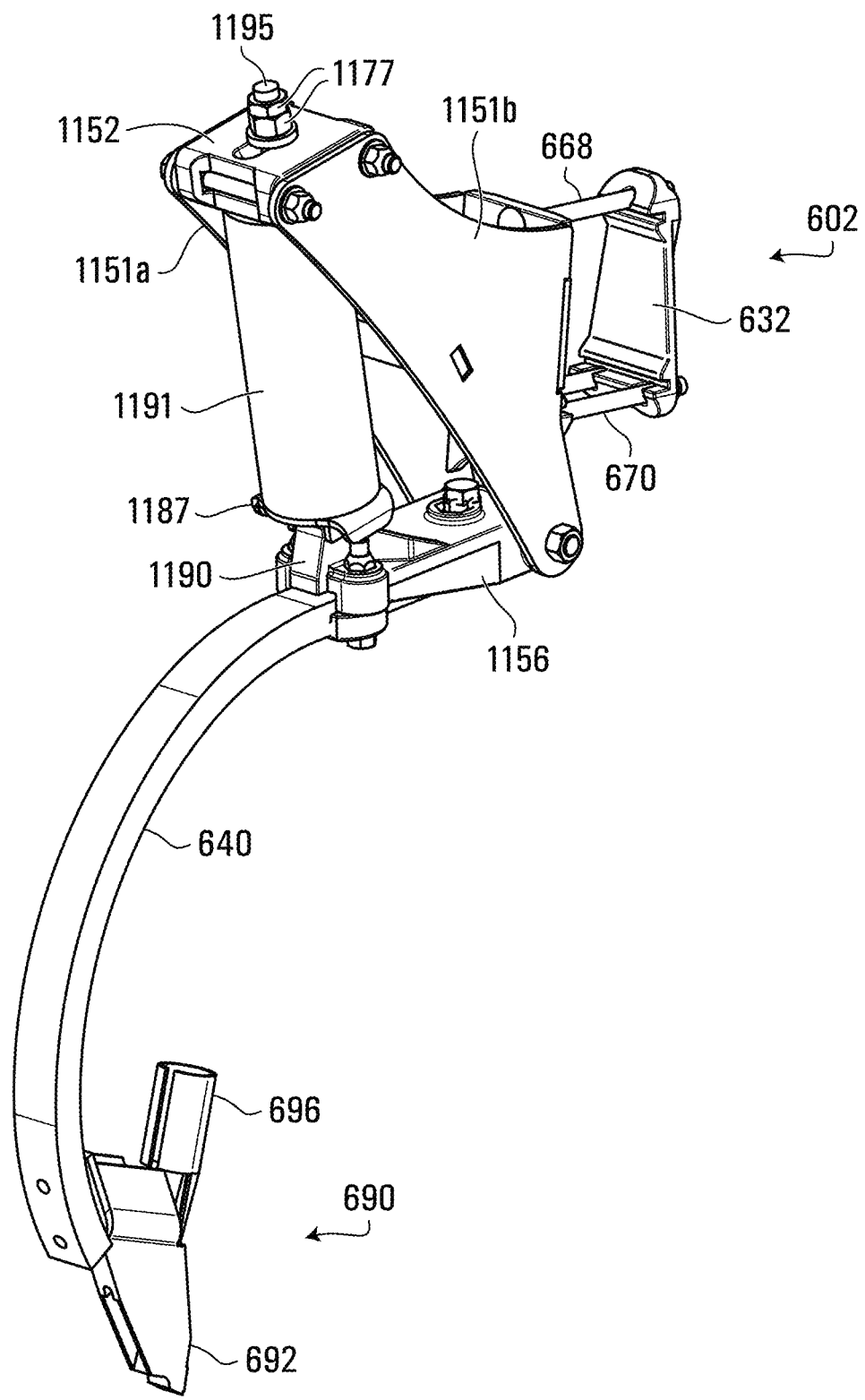
FIG. 4K is a rear perspective view of a ground engager mount and ground engager according to another embodiment.
Figure 4L:
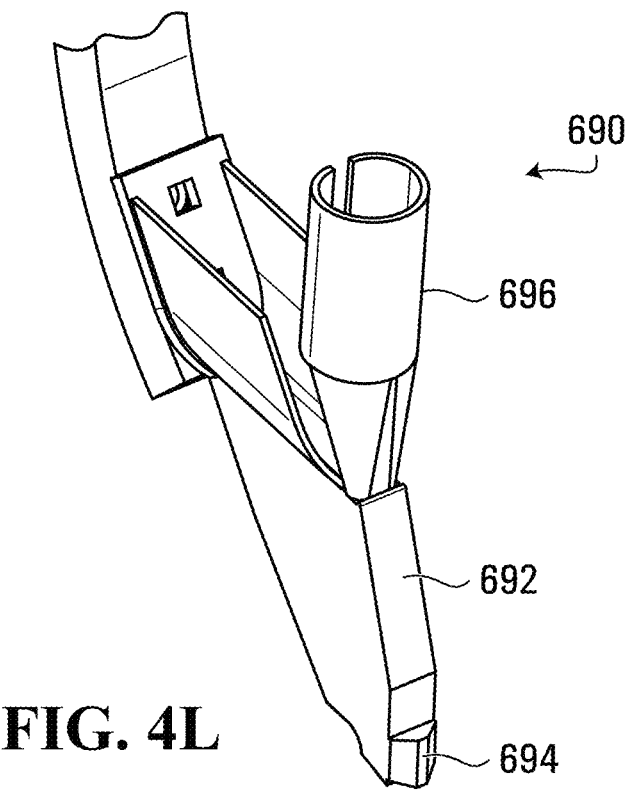
FIGS. 4L and 4M are rear and front perspective views of part of the ground engager of FIG. 4K.
Figure 4M:
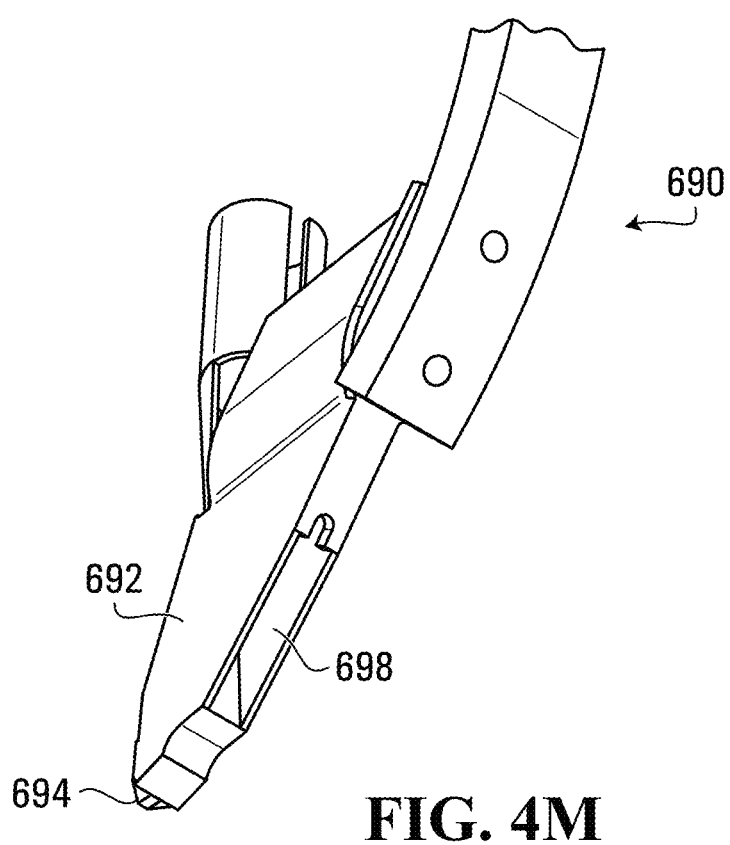

With reference to FIGS. 4K to 4M, in an embodiment, shank member 640 has an opening and seeding tool 690 installed at the lower end for receiving and distributing seeds that forms part of an apparatus for seeding. Opening and seeding tool 690 may include seed boot 692 with an opener and packer (not shown) attached to the seed boot with a tip 694 at the lower end. During operation, the opener engages the ground surface 106 (FIG. 1), penetrating and diverting the soil to open up a row for seed and fertilizer placement. Seed may be delivered to seed delivery tube 696, from a seed source such as a seed cart connected via tubing, and seed is deposited to the newly opened seed row through an opening 698 at the lower rear end of opener 692.

Seeding tool 690 may also include a packer (not shown) to close and pack the soil in the seed row after the seed is deposited. Seeding tool 690 may also receive a supply of fertilizer, which is distributed proximal to the seed to supply nutrients for early seed growth.

Implement 100 may also be provided with a force trip/release mechanism associated with each ground engager 600 and its respective ground engager mounting assembly 602. The force release mechanism may be integrated as part of rear support unit 630. By way of example only, and with particular reference to FIGS. 4G to 4J, a spring trip device 1143 may be provided which may function to provide a trip mechanism for a single shank member 640. Each spring trip device 1143 for each shank member 640 may provide a trip mechanism that normally provides constant vertical positioning of the respective shank member 640 to which it is interconnected relative to the frame 108. A pre-set force may be exerted by each spring trip device 1143 on pivotable support plate 1156 fixedly connected to shank member 640. Until a force acting against the pre-loading force provided by spring trip device 1143, exceeds the pre-load force imparted by spring trip device 1143, then spring 1191 of spring trip device 1143 will not compress. This pre-load force may then assist in maintaining reasonably consistent depth engagement of the respective shank member 640 inter-connected to the frame 108 by struts 1151a, 1151b. However, if shank member 640 of impacts with a very strong, impenetrable item or material in the ground (e.g. a large rock), the force Fg imparted by such impact on shank member 640 may exceed a maximum allowable threshold force which corresponds with a force on the spring 1191 greater than the pre-load force Fs. If the force Fg imparted on such shank member 640 does exceed the threshold level associated with the pre-load force Fs, then the spring trip device 1143 will "trip" by virtue of its spring 1191 undergoing compression. This compression of the spring 1191 and the corresponding force causing such compression, permits pivoting of shank member 640 on bracket 1156 to relieve the force on shank member 640 and on the frame 108 to which to which it is interconnected. This will then relieve the contact forces being imparted by the ground (e.g. the rock) on the shank member 640 as the shank member 640 will pivot away from the full engagement position.

With reference to FIG. 4I, at the distal end of support struts 1151a, 1151b and secured there between, may be a rotator cuff unit 1193 that may include a support bracket 1152 and a rotatable block 1186. Spring trip device 1143 that may be mounted between support struts 1151a, 1151b (FIG. 4G) by bolts 1173 that pass-through slots in support struts 1151a, 1151b and slots in bracket 1152. Support bracket 1152 may have an inwardly directed generally hemi-spherical surface 1152a which may engage with block 1186 that may have a corresponding semi-hemispherical surface 1186a. Block 1186 is operable to pivot within a range of angular movement on and relative to bracket 1152 on respective facing sliding surfaces 1152a, 1186a. One end of spring 1191 may be supported for compression by an annular groove of block 1186.

Bracket 1152 and block 1186 may have axially aligned openings through which an end portion of rod 1195 may be received through. Rod 1195 may be supported by bracket 1152 and block 1186 at one end of rod 1195 and the opening in bracket 1152 may be configured to allow rod 1195 to pivot with block 1186 and to move axially relative to bracket 1152 and block 1186 when spring 1191 is compressed. Jam nuts 1177 may be provided at this outward end of rod 1195 and engage with a top surface of bracket 1152. Jam nuts 1177 and washer 1179 hold and lock the entire assembly of spring trip device 1143 together and are positioned the top end of the assembly.

With particular reference to FIGS. 4H and 4J, spring trip device 1143 may include a bottom pivot mount device 1190 and a base support plate 1187. Bottom pivot mount device 1190 may be positioned on the upper surface of pivotable support plate 1156 and includes a top transverse cylindrical opening for receiving a pin 1192 (FIG. 4J) therethrough that also connects through the aligned transverse openings 1194a with bottom flange extensions 1194 of spring 1191.

Adjusting the position of jam nuts 1177 on rod 1195 can select the amount of compression of spring 1191 and thus the desired pre-load force of spring 1191. The greater the compression of spring 1191, then the greater the force. When spring 1191 is compressed by adjusting jam nuts inwards, the rod 1195 will move upwards in bracket 1152. This will shorten the distance between bracket 1152 and base support plate 1187, thus raising support plate 1156 and shank member 640 attached thereto to a relatively small extent. This allows all ground engagers 600 to be levelled for a consistent depth.

Spring device 1143 may be operable during normal operation, to provide a generally downward force and to bias the shank member 640 into a position whereby it engages with and penetrates the ground material beneath surface 106. However, spring device 1143 may be configured and adapted such that if shank members 640 engage with a substantially impenetrable material (e.g. a large granite rock), then to avoid having the force of such impact transmitted throughout the rest of that frame section of which those mounts form a part, and beyond the rest of frame 108, (potentially causing structural damage to the frame and/or ground engagers 600) spring device 1143 will release the biasing force exerted by spring 1191 by shifting of the spring 1191 and allow the shank member 640 attached thereto to pivot substantially freely away from the impenetrable material.

Once the spring trip device 1143 has been tripped, there is a downwards force that is still exerted on shank member 640 (e.g. the weight of chisel.). This will then enable the shank member 640 to be returned to an operational position with a relatively easy amount of additional force. Spring trip devices 1143 and their respective ground engagers may be configured such that the spring trip device 1143 will automatically re-set itself once the shank member 640 has cleared the obstacle in the ground.

The three-point mounting connection described above operates to prevent any slop or play within ground engager mount 602 due to bolts 668/670 becoming loosened or disengaged. This reduction or removal of any slop or play in the connection of the ground engager mount 602 to the structural support member, may beneficially enhance the operation of spring trip device 1143 and the ground engager.

Wheeled Support Units

Referring again to FIG. 2, in various embodiments, agricultural implement 100 may include rear support units which is some embodiments may comprise ski supports or roller compactors. However, as illustrated in FIG. 2, the rear support units may more typically comprise rear wheeled support units 920, 922, 924, 926, 928, 930, 932, 934 each including at least one freely rotatable support wheel 197 that may be mounted for rotation about a generally horizontally oriented wheel axle which provides for a generally horizontal axis of rotation for the one or more wheels to allow the wheel(s) to relatively easily move across ground surface 106. Front wheeled supports 900, 902, 904, 906, 908, 910, 912 and 914 may also have wheels 197a-h respectively for rotation about generally horizontal wheel axes of rotation.

Rear wheeled support units (also referred to as rearward frame support units) 920, 922, 924, 926, 928, 930, 932, 934 may each be configured such that the wheels are not also rotatable about a generally vertical steering axis (e.g. they may be rigid caster assemblies). In some other embodiments, rear wheeled support units 926 and 928 of central frame section 130 may be configured to be able to rotate to some extent (possibly as much as 360 degrees) about a generally vertical steering axis, however in such embodiments where rear wheeled support units 926, 928 are rotatable about a generally vertical steering axis they may be steerable by a separate, active steering mechanism.

In central frame section 130, swivel caster assemblies that are freely rotatable in an unrestricted manner about a generally vertical steering axis, may be provided for the most inward, front wheeled support units 912 and 914 (also referred to as forward central wheeled support units) of central frame section 130. For these swivel caster assemblies there may be a horizontal offset distance between the horizontal axis of rotation of the wheel and the corresponding vertical steering axis of rotation (also known as the rake angle). Additionally, or alternatively, swivel caster assemblies may be provided for front wheeled support units 912, 914 in which there is a "caster angle" that provides an angular displacement of the steering axis from a vertical axis such that the axis of rotation of the steering axis is angled downwardly to intersect the ground surface in front of the contact location of the wheel 197 on the ground surface 106 when the implement is moving forwards.

For outward frame sections 132-142, swivel caster assemblies may be also provided for the outward frame sections, front wheeled units 900-910 (also referred to as forward outward wheeled support units), in which there is a caster angle that provides an angular displacement of the steering axis from a vertical axis such that the axis of rotation of the steering axis is angled downwardly to intersect the ground surface 106 in front of the contact location of the wheel 197 on the ground surface 106 when the implement is moving in a forward direction. In both types of swivel caster assemblies, so long as the intersection location of the wheel/tire on the ground surface is behind where the axis of rotation of the steering axis intersects the ground, during forward movement of implement 100, the wheels will always rotate to be oriented in the same direction.

C-shaped cross sections of longitudinal members 770-784 may facilitate the rear wheeled support units 920, 922, 924, 926, 928, 930, 932, 934 being mounted to the open members through aligned openings in the upper and lower horizontal flanges of these members. Front wheeled supports 900, 902, 904, 906, 908, 910, 912 and 914 may be connected to longitudinal members 770, 772, 774, 776, 778, 780, 782 and 784, generally at the forward ends of the longitudinal members. In various embodiments, the front wheeled supports 900-914 and rear wheeled support units 920-934 may act as surface following supports and may keep the frame 108 at a selected relative height from the surface 106. Both front wheeled support units 900, 902, 904, 906, 908, 910, 912, 914 and rear wheeled support units 920, 922, 924, 926, 928, 930, 932, 934 may be variable height wheeled support units. For example, each of the wheeled support units in one or both of the groups of rear and front wheel support units may be associated with and interconnected to various hydraulic cylinders interconnected with frame members of frame 108 and respective wheels of the wheeled support units. The hydraulic cylinders may be controlled by a hydraulic fluid control system to permit the height of the frame 108 relative to the front and rear wheels 197, and thus relative to ground surface 106, to be adjusted.

By way of example, a two-way acting hydraulic cylinder may be interposed between open member 778 and the axle/hub of rear wheeled unit 928 (FIG. 1A). The hydraulic cylinder may have an upper end interconnected to a bracket that is secured to a tubular support for a support leg of rear wheeled unit 928. The hydraulic cylinder may have an extendible piston rod and the end of that piston rod may be connected to the axle/hub of rear wheeled unit 928. The operation of hydraulic cylinder may be controlled by an actuator and/or controller, which may control valves in a hydraulic fluid circuit to control the flow of pressurized hydraulic fluid to and from hydraulic cylinder. By extending the piston rod, the distance between wheel 197 and the open member 778 may be increased, and by retracting piston rod, the distance between wheel 197 and the open member 778 may be decreased. Secured to opposed sides of web portion of open member 778 may be a pair of opposed pulley devices. One or more cables (not shown) may be secured around an arcuate guide which may be fixedly mounted to axle/hub associated with one or more wheels of rear wheeled unit 928. The cable may extend around the arcuate guide of axle/hub of the rear wheeled unit 928 upwards on both sides to transversely opposed rearward pulley devices and then follow curved paths around pulley devices on opposite sides of the web of open member 778 and extend forwardly to a pair of corresponding opposed forward pulley devices 875a, 875b associated with front wheeled support 914 (see FIG. 9A), as described further below. Thus, the operation of this hydraulic cylinder and the length of its piston rod that is extended, can control the height of the frame 108 where rear wheeled unit 928 is connected thereto relative to the ground surface 106. The configuration of the apparatus including the total length of the cable can be selected to ensure that the entire frame 108 can be configured at a desired horizontal orientation and moved vertically upwards and downwards while at that selected horizontal orientation. By providing functionally interconnected hydraulic cylinder arrangements associated for each of rear wheeled support units 920, 922, 924, 926, 928, 930, 932, 934 and their respective front wheeled support units 900, 902, 904, 906, 908, 910, 912, 914, the entire vertical height of frame 108 about the ground surface 106 can be controlled and varied by the operation of hydraulic cylinders that are controlled by actuators and/or a controller. An example of such a suitable apparatus that may be employed is illustrated in United States patent publication no. US 2018/0368307 published on Dec. 27, 2018, referenced above.

To provide for suitable steering of agricultural implement 100, front wheeled supports 900, 902, 904, 906, 908, 910, 912 and 914 may have their respective wheels 197a-h may be configured as swivel caster assemblies as referenced above.

As will be explained in further detail below, the transversely outward, front wheeled supports 900-910 may include a restricted rotation caster wheel operable to rotate about the steering axis only in one rotational direction from the straight-ahead position, and only to a limited angular extent in that rotational direction. This limitation of the angular rotation about the steering axis, can inhibit or prevent movement of agricultural implement 100 into a skewed or skidding orientation. Inwardly positioned wheeled supports 912, 914 may be operable to freely rotate about a steering axis a full 360 degrees in either rotational direction.

Figure 9A:
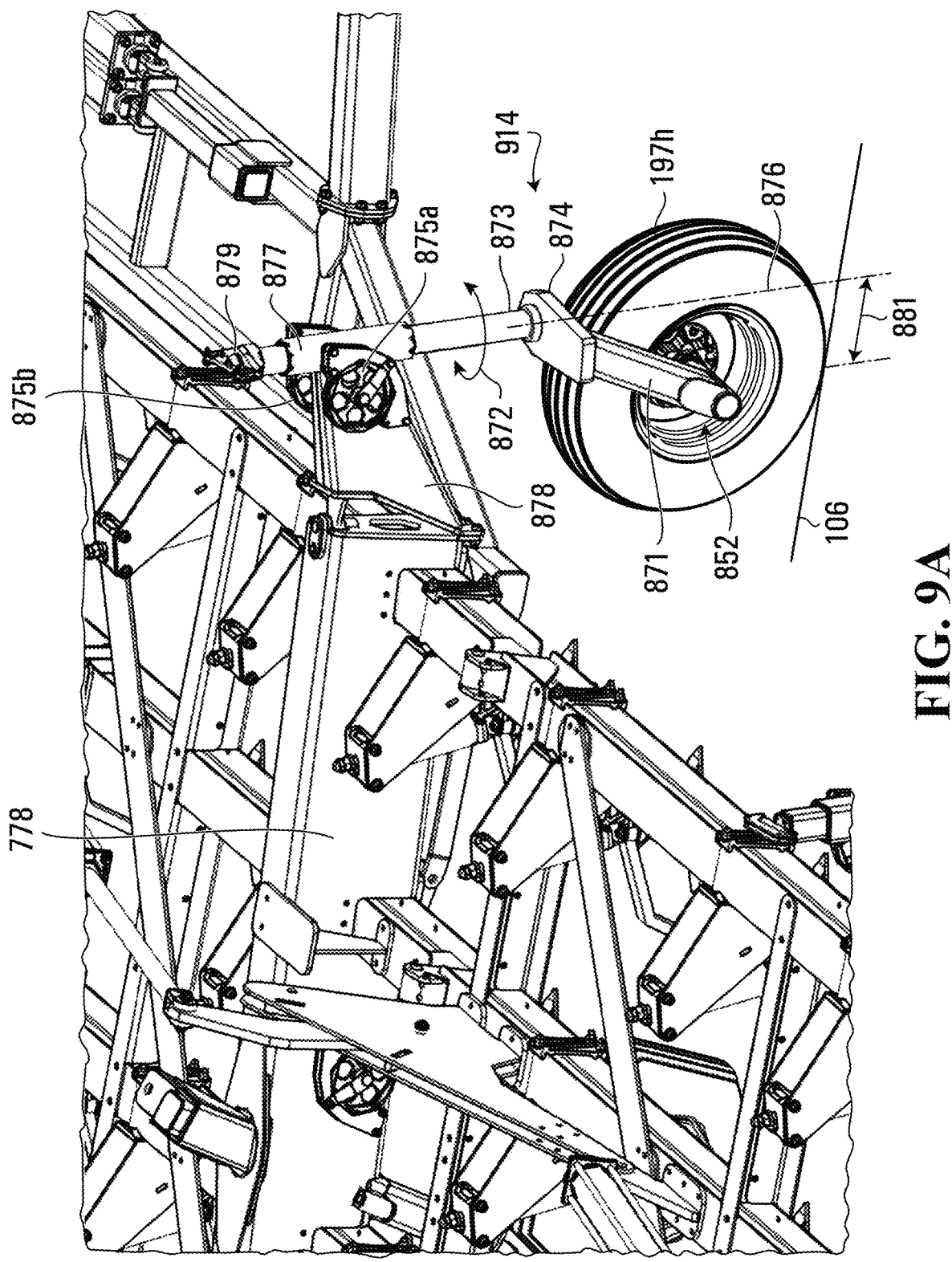
FIG. 9A is an enlarged front perspective view of FIG. 8, showing a front wheeled support unit.
Figure 9B:
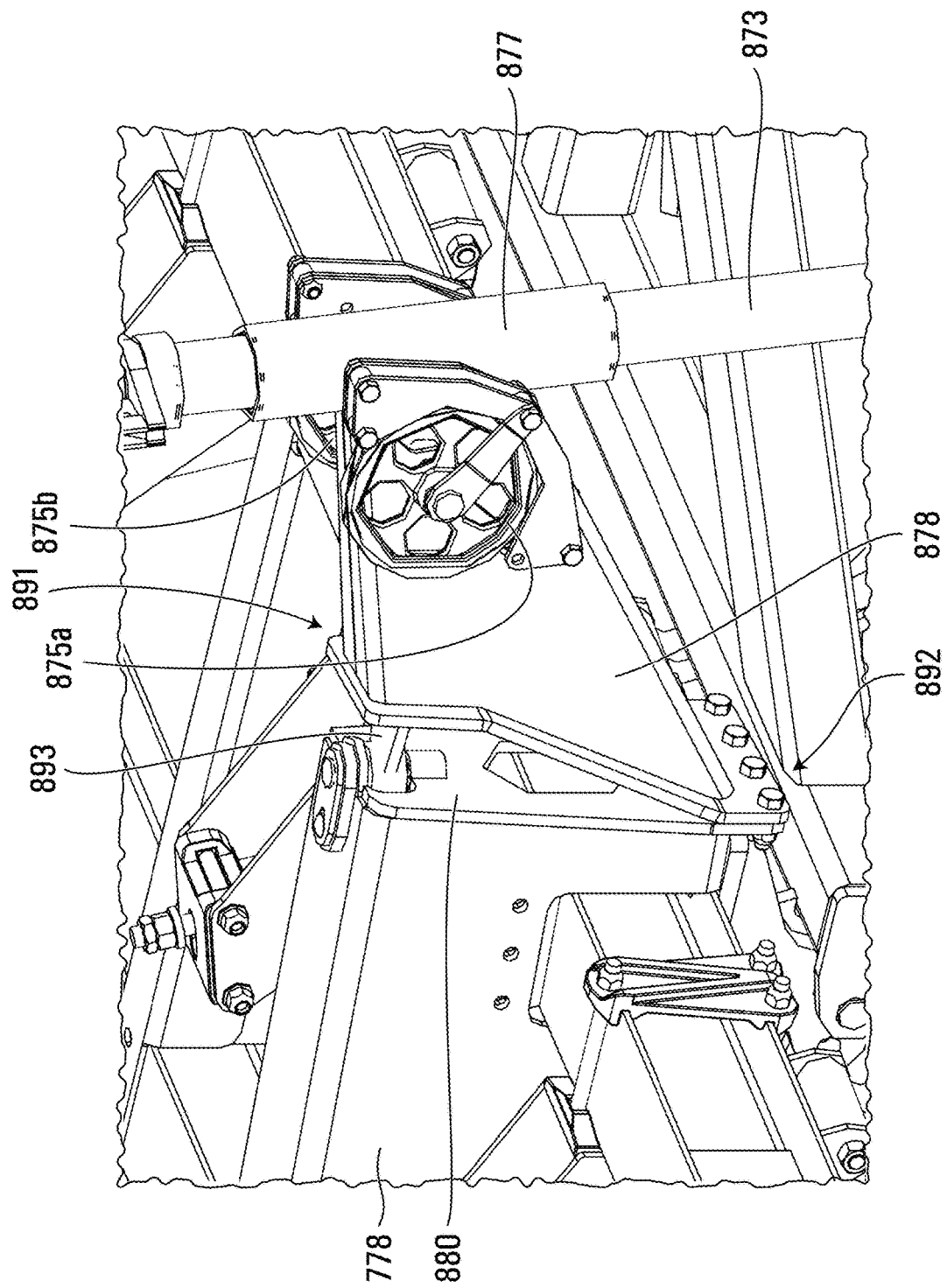
FIG. 9B is an enlarged front perspective view of the front wheeled support unit of FIG. 9A.

With reference to FIGS. 9A and 9B, a representative front wheeled swivel caster support unit 914 (which may be configured in the same manner as central frame section's front wheeled support unit 912) that can be employed on central frame section 130 is illustrated. Front wheeled support unit 914 may include a single caster wheel 197h supported at one lower end of a leg member 871 which may be attached to an axle/hub mechanism 852 in such a known manner as to allow for free rotation of the wheel about a generally horizontal wheel rotation axis of the axle/hub 852. In other embodiments, where for example loading may be of a magnitude to require it, front wheeled support units 912, 914 might possibly include two, side by side, swivel caster wheel system.

Leg member 871 may be generally rectangular in cross section and tubular and may be fixedly connected at a top end portion to an outer end of a horizontal pivot arm 874. The inner end of pivot arm 874 may be fixedly secured to a cylindrical freely rotatable support post 873 (rotatable about its own longitudinal-generally vertical axis). Post 873 may be received within cylindrical tubular support 877 and configured for axial movement relative to a supporting hollow cylindrical tubular support 877. Post 873 along with pivot arm 874 may also be freely rotatable 360 degrees in each rotational direction, about a longitudinal steering axis of tubular support 877, as indicated by arrows 872 in FIG. 9A. Leg member 871 may be angled backwards and downwardly from the longitudinal steering axis of support post 873, as shown in FIG. 9A. In this way, the horizontal axis of axle/hub 852 may be positioned behind the front ground surface intersection location of the generally vertical steering axis 876 when the implement 100 is moving forward, thus providing a caster effect of front wheeled support 914. In some example embodiments, the vertical steering axis 876 of front wheeled support unit 914 associated with support post 873 and tubular support 877 may be tilted so the upper end region is titled backwards, in the range of 6 to 10 degrees from the vertical direction axis Z (also known as the rake angle). As depicted in FIG. 9A, steering axis 876 intersects with ground surface 106 ahead of the contact location of the tire of wheel 197h with surface 106. The distance between these contact points is known as the trail distance and is indicated at 881 in FIG. 9A.

Tubular support 877 may have an end cap 879 affixed to the upper end and may be mounted to a forward end portion of a mounting block (mount) 878. End cap 879 may permit post 873 to rotate in relation end cap 879, while end cap 879 retains its rotational position relative to frame 108. In some embodiments a cable (not shown in FIG. 9A or 9B) may extend over end cap 879 and pass-through cable guides 875a, 875b on opposite transverse sides of tubular support 877 the rearward ends of which may be fixedly secured for example to rear wheel unit hubs as referenced above.

As noted above, the operation of a hydraulic cylinder interconnected to the axle/hub of rear wheeled unit 928 can control the height of the frame 108 where rear wheeled unit 928 is connected thereto relative to the ground surface 106. The configuration of the apparatus including the total length of the cable can be selected to ensure that frame 108 at that location can be positioned at a desired horizontal orientation and lowered upwards and downwards while at that selected orientation.

Furthermore, by adjusting the length of the cable that extends between cable guides 875a, 875b over end cap 879 with a cable adjustment mechanism the relative vertical position of post 873 relative to tubular support 877 (and front region of frame 108) can be adjusted and set to a desired vertical position.

A cable adjustment mechanism as disclosed in United States patent publication no. US 2018/0368307 published on Dec. 27, 2018 referenced above may be employed to facilitate adjustment of the length of the cable that passes between pulley devices 875a, 875b over end cap 879. An increase in that length of the cable will cause the front wheel 197h to be moved closer to front region of frame 108, thus lowering the front region of the frame and causing the front row of ground engagers 600 to penetrate into the ground more. A decrease in the length of the cable will cause the front wheel 197h to be moved further away from front of the frame 108, thus raising the front region frame 108 relative to the wheel and the ground surface 106 and causing the front row of ground engagers 600 to penetrate into the ground to a lesser extent. Thus, adjustment of the cable can facilitate adjustment of the front/back pitch of the frame and the ground engagers attached thereto. This may be useful for levelling the frame and ground engagers attached thereto, at least in some embodiments. It may also be used to make fine adjustments to the depth at which seeds may be deposited into the ground for a seeding tool 690.

In other embodiments (such as for central wheel support units used in a combination tillage/seeder apparatus), the vertical height setting of front wheel 197h relative to the frame 108 on front wheeled support units 912, 914 may be adjusted by one or more hydraulic cylinders inter-connected between the end cap and the frame and controlled by a hydraulic fluid control system. The hydraulic piston(s) may be operable to raise and lower post 873 relative to frame 108, to permit the height of the frame 108 relative to that front wheel 197h to be adjusted. In some embodiments, such as for a chisel plow apparatus with ground engagers, which may engage the ground surface with a greater force than a seeder apparatus, may include an apparatus to adjust the pitch of the ground engagers in the front row, which may engage the ground surface to a greater extent than the subsequent rows of ground engagers, relative to the ground engagers in the rearward rows. However, in embodiments of an agricultural implement 100 that are used just for seeding, there may be no specific need for pitch control/correction because the ground forces exerted on both front and rear rows of ground engagers will be much lower and very similar in magnitude.

Turning to FIG. 9B, mount 878 may have a rear portion fixedly connected to support plate 880, which in turn may be connected to an end of open member 778, such as by welding. Mount 878 may be attached to plate 880 through four transversely spaced lower connection locations 892 and a single upper connection 891. Upper connection 891 may include a pivotable linkage 893 which functions to assist in ensuring that the caster wheel 197h remains substantially vertical even when main frame 108 and its members such as transverse member 778 are twisting during operation.

Inwardly positioned, central section wheeled support units 912, 914 may be mounted to main inner open longitudinal members 776 and 778 respectively to support central section 130 of frame 108. Front wheeled supports 912, 914 may act in conjunction with rear wheel supports 926, 928 to substantially provide support on the ground surface 106 (FIG. 1) for central frame section 130, and also for left and right inner frame sections 132 and 134, left-center and right-center frame sections 136 and 138 and left and right outer frame sections 140 and 142 of frame 108 when those sections on either side of central section 130 have been pivoted to an elevated transport mode. Wheeled supports 912, 914 of frame 108 may be of a known swivel caster wheel configuration that are mounted to longitudinal frame members 776, 778 respectively to allow for substantially 360-degree free revolving rotation about a generally vertical steering axis of their respective wheels 197g, 197h, to allow the agricultural implement to be maneuvered in relatively tight turns when in a transport configuration.

One Way Swivel Caster Wheels

Figure 10A:
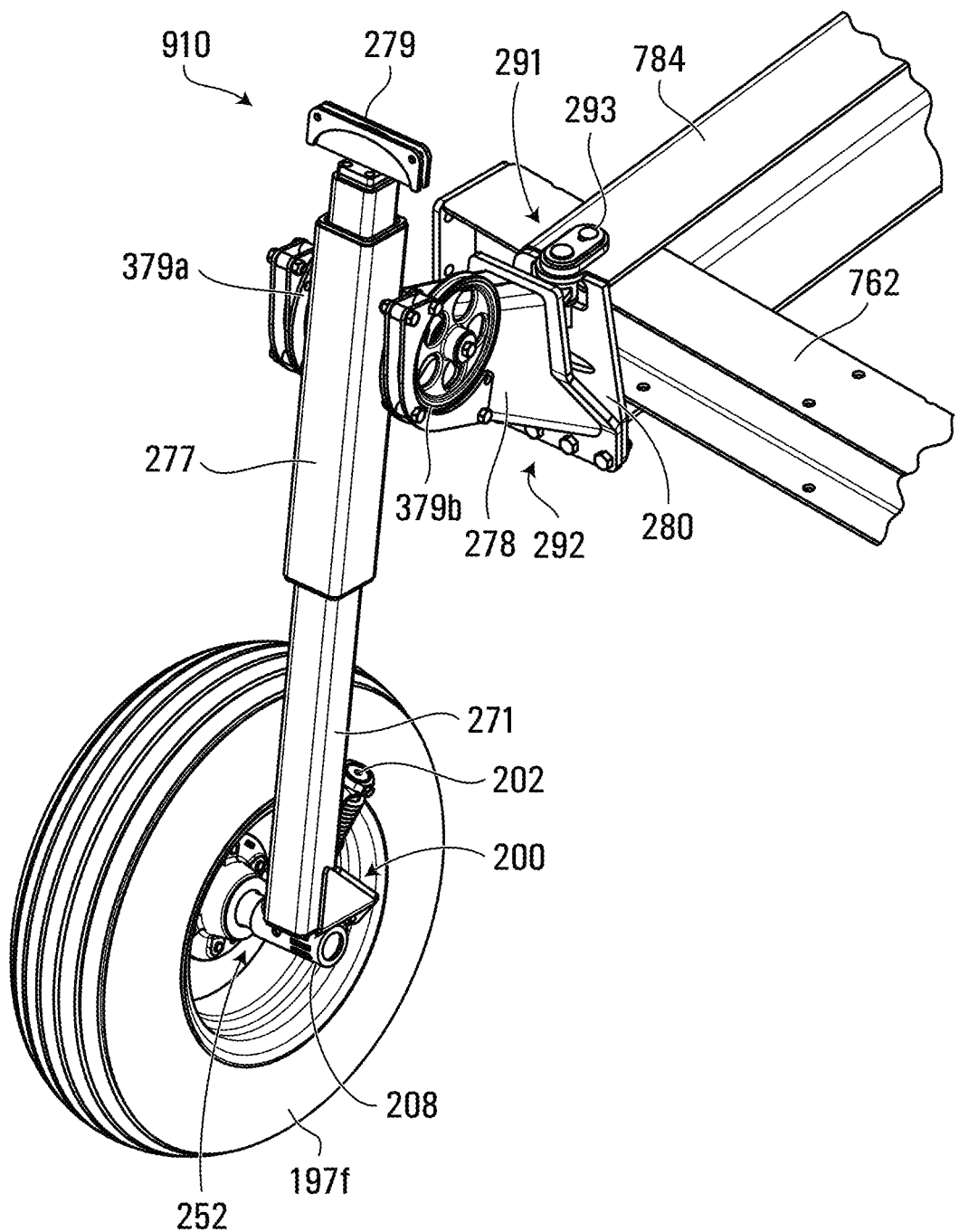
FIGS. 10A and 10B are front and rear perspective views of another front wheeled support unit of the farm implement of FIG. 1.
Figure 10B:
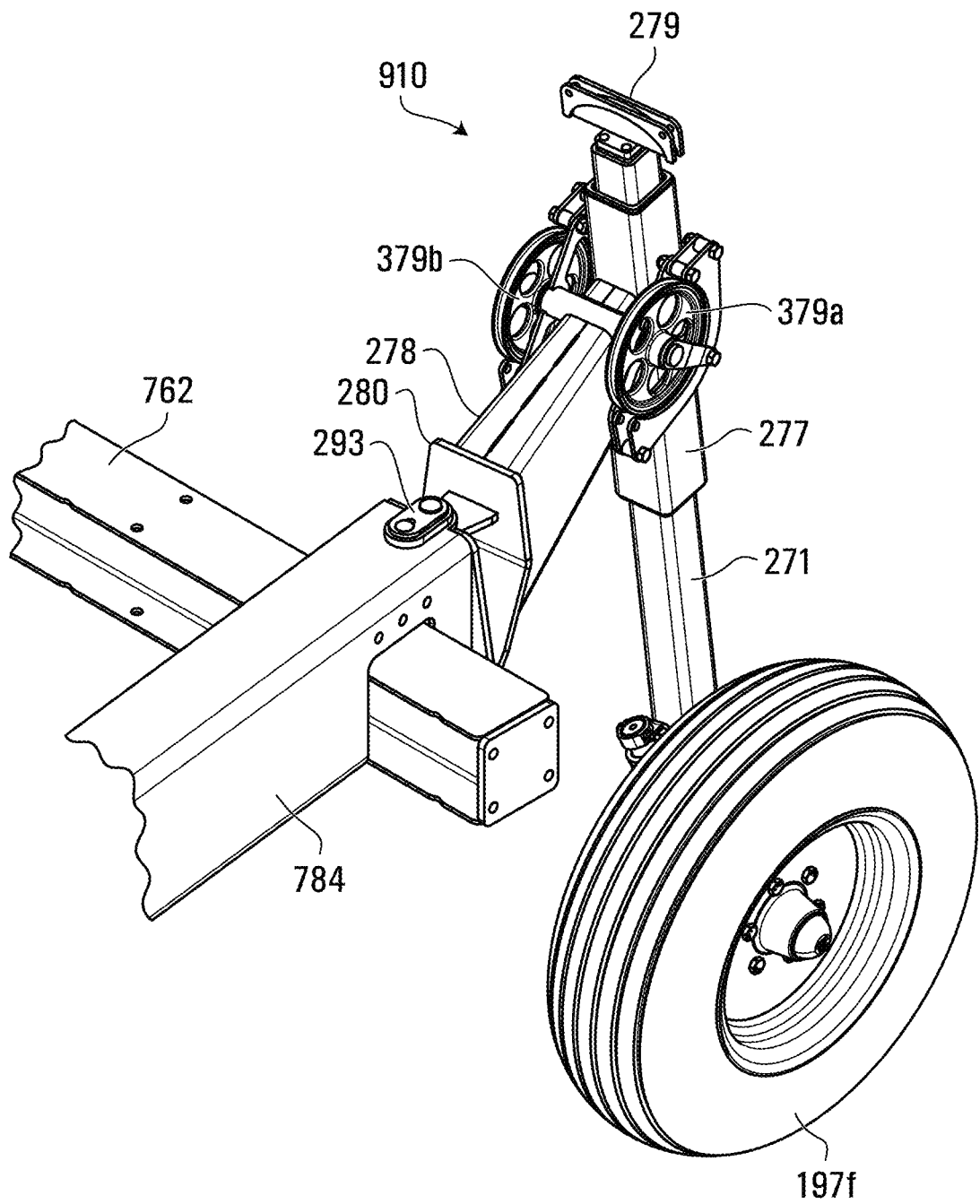
Figure 10C:
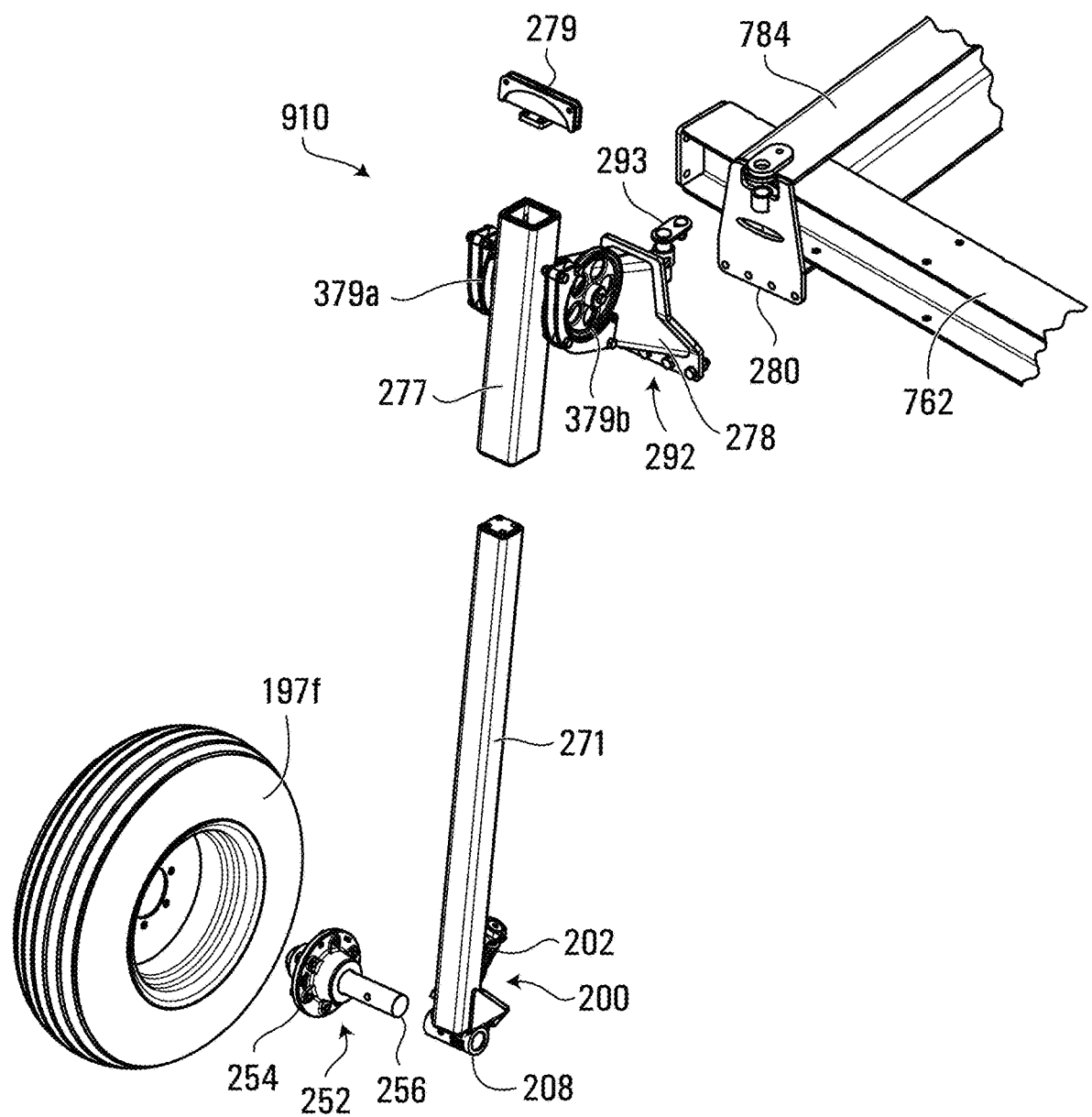
FIGS. 10C and 10D are front and rear exploded perspective views of the front wheeled support unit of FIGS. 10A and 10B.
Figure 10D:
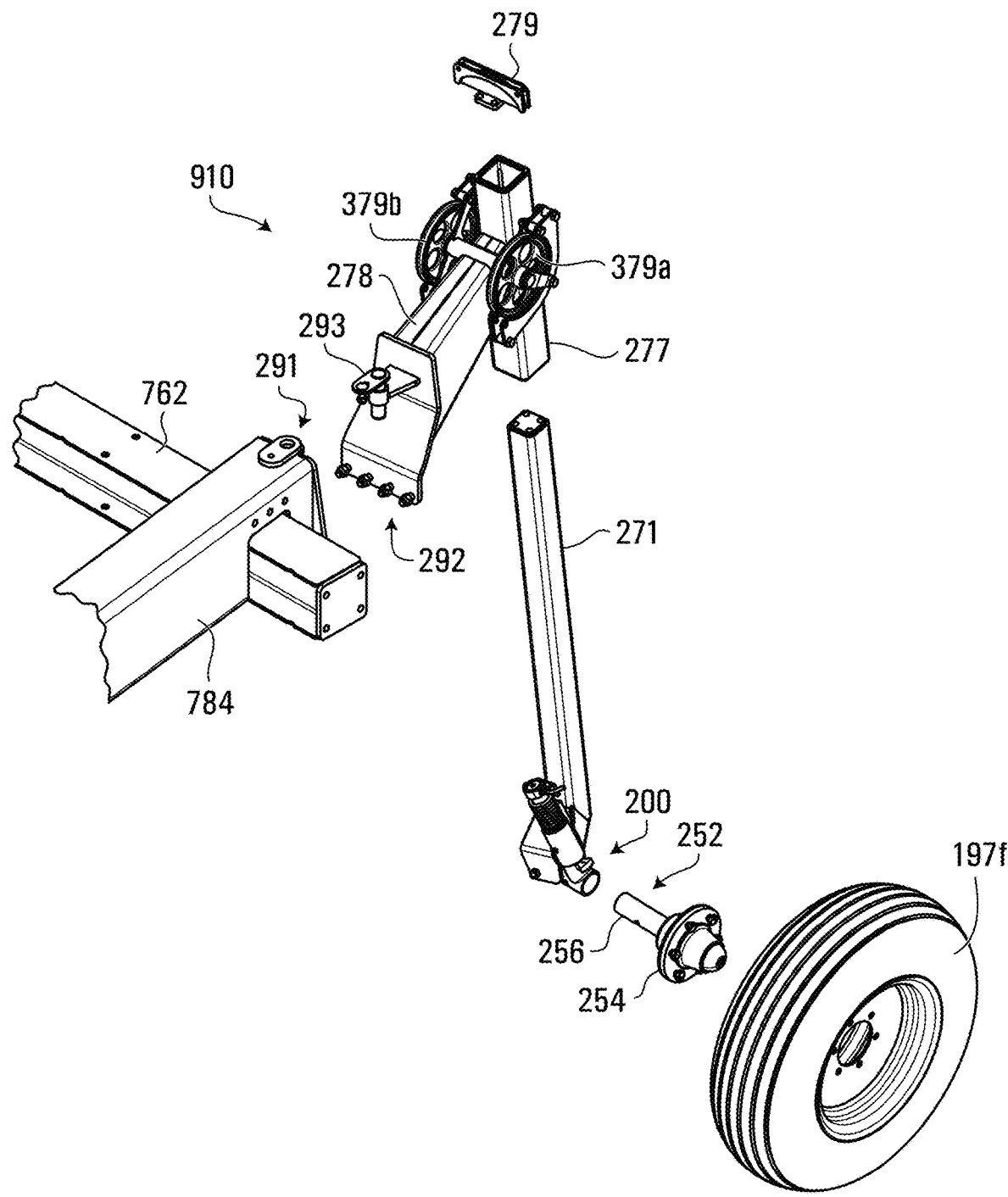
Figure 11A:
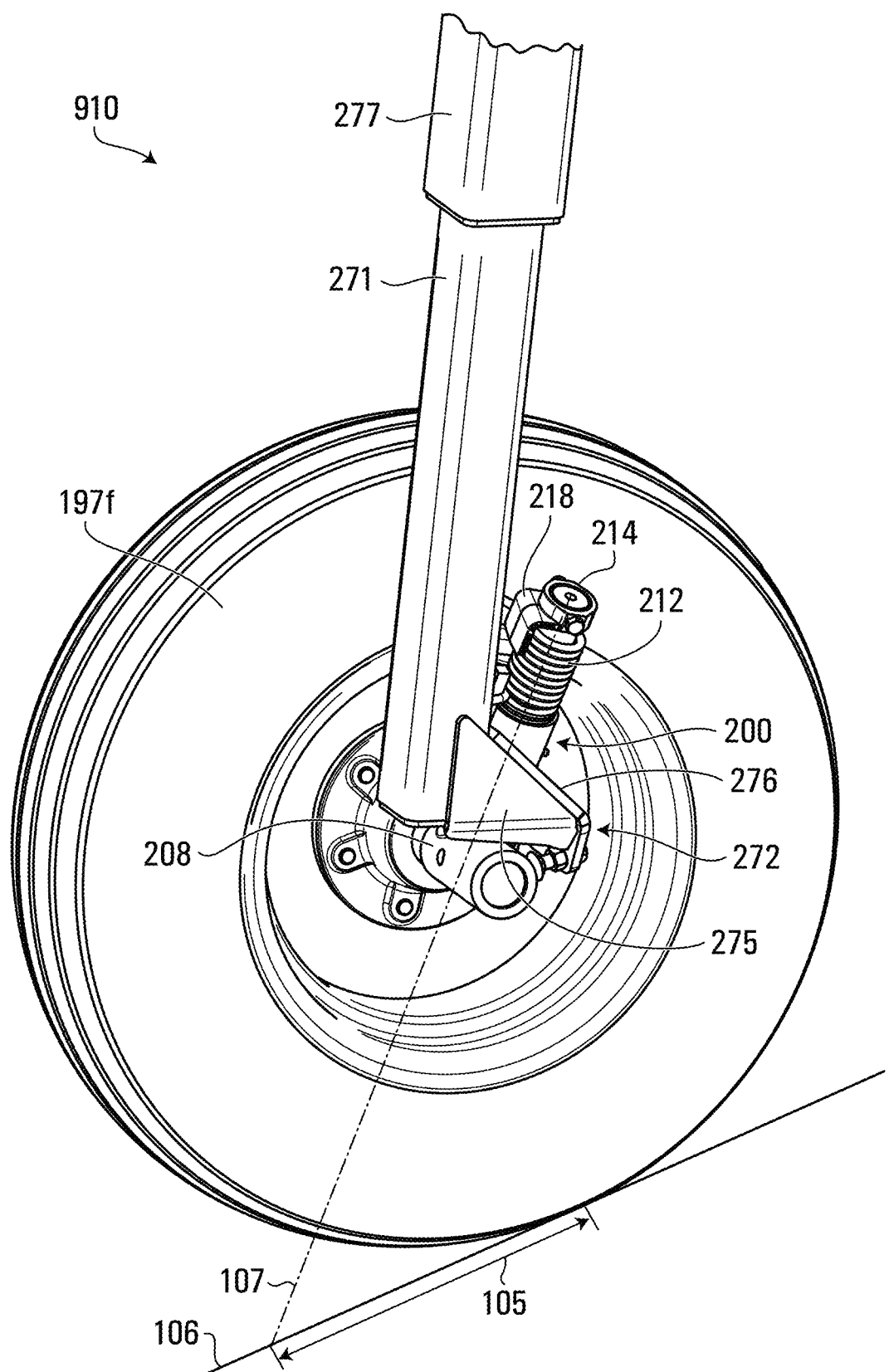
FIGS. 11A and 11B are enlarged front and rear perspective views of the king pin assembly of the front wheeled support unit of FIGS. 10A and 10B.

Referring to FIGS. 10A-10D, a representative example for front wheeled support units 900-910 is shown. Front wheeled supports 900-910 provide limited rotation of their respective wheels 197 about their respective steering axes, as described hereinafter. Front wheeled supports 900-910 as shown are swivel caster assemblies For example, in some embodiments, there may be a horizontal offset distance between the horizontal position of the horizontal axis of rotation and the horizontal position of the vertical axis of rotation. In some embodiments, such as is illustrated in FIGS. 10A-10D, there is a "caster angle" that provides an angular displacement of the steering axis from a vertical axis such that the axis of rotation of the steering axis is angled downwards and forward to intersect with the ground surface 106 in front of the contact location of the tire/wheel 197f on the ground. As shown in FIG. 11A, the vertical steering axis 107 of front wheeled support unit 910 may be tilted so the upper end region is titled backwards, in the range of 5 to 10 degrees and preferably 8 degrees from the vertical direction axis Z (also known as the rake angle). So long as the contact location of the tire on the ground is behind where the axis of rotation of the steering axis 107 intersects with the ground surface 106 (FIG. 11A), the wheel will always rotate/caster to be oriented generally in the same direction during forward movement of implement 100. As depicted in FIG. 11A, steering axis 107 intersects with ground surface 106 ahead of the contact location of the tire of wheel 197f with surface 106. The distance between these contact points is known as the trail distance and is indicated at 105 in FIG. 11A.

Figure 12:
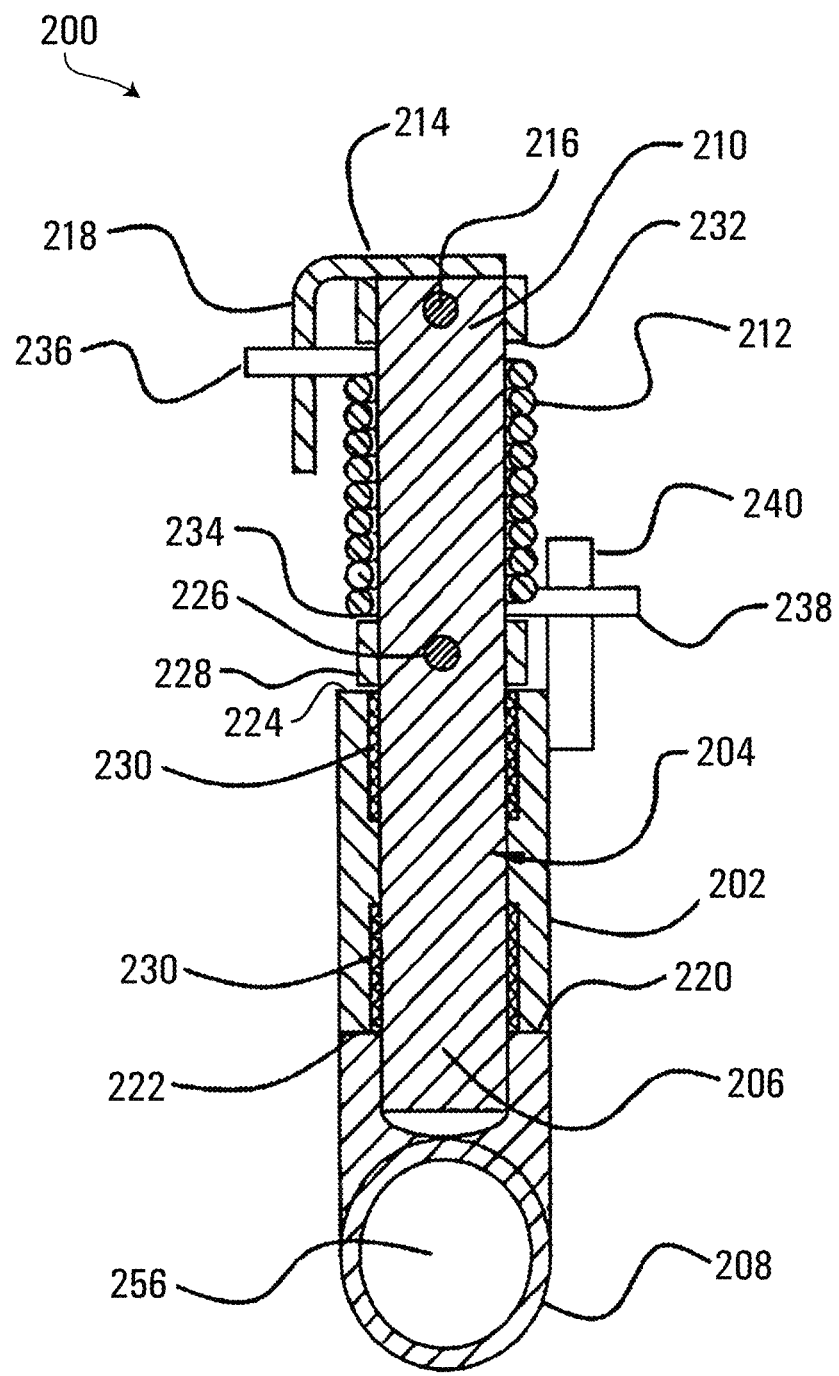
FIG. 12 is a cross-sectional view as seen from the line A-A in FIG. 11B.

A representative example right side, front wheeled support 910 is illustrated which may be the same as right side, front wheeled supports 906 and 908. Front-wheeled support 910 may include a wheel hub assembly including a single caster wheel 197f supported by an axle/hub assembly 252 in such a manner as to allow for free rotation of the wheel about the horizontal axis of the axle/hub assembly 252. Axle/hub assembly 252 may include a hub 254 (FIG. 10C) to which wheel 197f is affixed and a spindle 256 which is received in a tubular housing 208 of a king pin assembly 200 (FIGS. 10D and 12).

King pin assembly 200 may be affixed to a lower end of support post 271 which may be tubular and generally rectangular in cross section and is received at a top end portion inside hollow rectangular tubular support 277. Support 277 may be mounted to a forward end portion of a mount 878. Support 277 may have a trunnion device 279 affixed to the upper end and may be mounted to a forward end portion of a mount 278.

Similar to mount 878 above, a cable (not shown in FIG. 10A or 10B) may extend over trunnion device 279 and pass-through cable guides 379a, 379b on opposite transverse sides of tubular support 277. By adjusting the length of the cable that extends between cable guides 379a, 379b over trunnion device 279 with a cable adjustment device (not shown) the relative vertical position of post 271 relative to tubular support 277 (and frame 108) can be adjusted and set to a desired vertical position.

Like the arrangement referenced above, the operation of a hydraulic cylinder interconnected to the axle/hub of rear wheeled unit 934 can control the height of the frame 108 where rear wheeled unit 934 is connected thereto relative to the ground surface 106. The configuration of the apparatus including the total length of the cable can be selected to ensure that frame 108 at that location can be positioned at a desired horizontal orientation and lowered upwards and downwards while at that selected orientation.

Furthermore, by adjusting the length of the cable that extends between cable guides 379a, 379b over trunnion device 279, with a cable adjustment mechanism the relative vertical position of post 271 relative to tubular support 277 (and front region of frame 108 in that vicinity) can be adjusted and set to a desired vertical position.

A cable adjustment mechanism as disclosed in United States patent publication no. US 2018/0368307 published on Dec. 27, 2018 referenced above may be employed to facilitate adjustment of the length of the cable that passes between pulley devices 379a, 379b over trunnion device 279. An increase in that length of the cable will cause the front wheel 197f to be moved closer to front region of frame 108, thus lowering the front region of the frame and causing the front row of ground engagers to penetrate into the ground more. A decrease in the length of the cable will cause the front wheel 197f to be moved further away from front of the frame 108, thus raising the front region frame 108 relative to the wheel and the ground surface 106 and causing the front row of ground engagers 600 to penetrate into the ground to a lesser extent. Thus, adjustment of the cable can facilitate adjustment of the front/back pitch of the frame and the ground engagers attached thereto. This may be useful for levelling the frame and ground engagers attached thereto, at least in some embodiments. It may also be used to make fine adjustments to the depth at which seeds may be deposited into the ground for a seeding tool 690.

Also, similar to mount 878 described above, mount 278 may have a rear portion connected to support plate 280, which is in turn connected to an end of open member 784, such as by welding. Mount 278 may be attached to plate 280 through four transversely spaced lower connection locations 292 and a single upper connection location 291 (FIGS. 10C and 10D). Upper connection 291 may include a pivotable linkage 293 which functions to assist in ensuring that the caster wheel 197f remains substantially vertical even when main frame 108 and its members such as open members 762 and 784 are twisting during operation.

With reference to FIGS. 11A-11E, king pin assembly 200 is depicted in greater detail. Turning first to FIG. 11A, king pin assembly 200 is operable to allow caster wheel 197f to rotate in one direction only about its main steering axis of rotation 107, and is positioned such that the main steering axis of rotation 107 associated with king pin assembly 200 projects downwardly in front of the contact location of the tire with ground surface 106 (i.e. the steering axis is angled clockwise from the vertical longitudinal axis of post 271 as shown in FIG. 11A). The steering axis of rotation 107 associated with king pin assembly 200 may also project downwardly (and optionally also outwardly) to intersect the ground surface 106 in front of the contact location of the tire with ground surface 106. The steering axis 106 and wheel geometry may be configured such that the wheel leans heavily to a horizontal position (i.e. the wheel rim leaning/facing down at a steep angle) during tight turns.

Figure 11B:
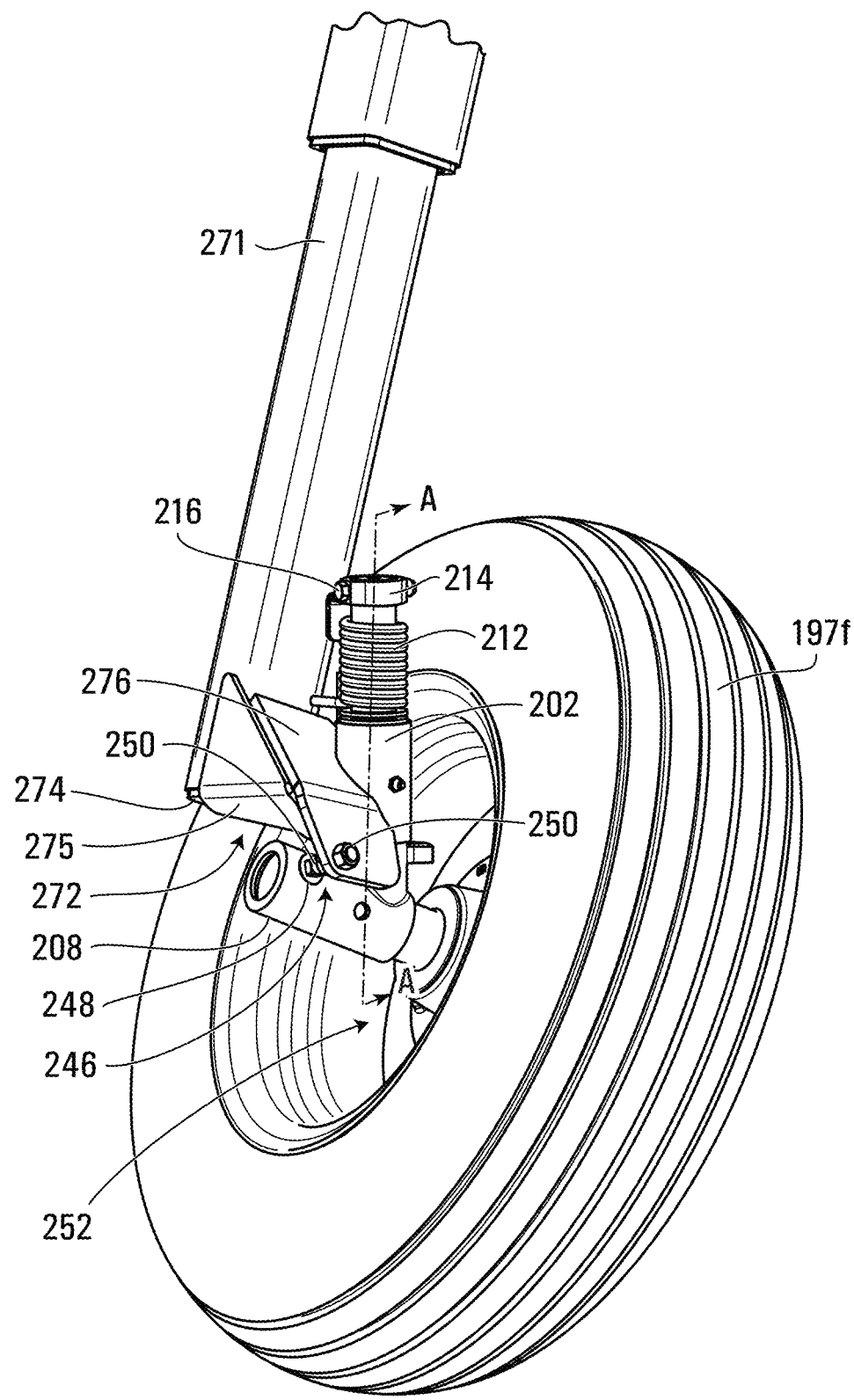
Figure 11C:
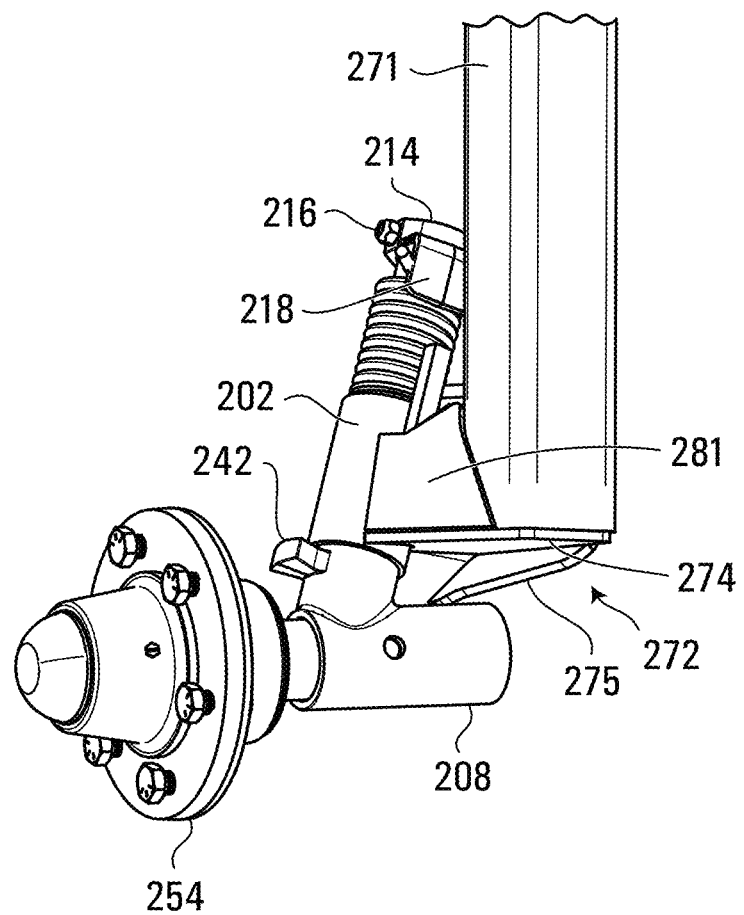
FIG. 11C is an enlarged view of the king pin assembly of FIGS. 11A and 11B with some components omitted for clarity.

King pin assembly 200 is affixed to front support post 271 through a king pin mounting assembly 272, which may include a base plate 274 and flanges, 275, 276 and 281. Base plate 274 may have a cut-out on the outer edge for accommodating the lower end of king pin assembly 202 therethrough (FIG. 11C). Flange 275 may be affixed to the lower vertical inner side of support post 271, extending vertically downwards and underneath support post 271 (FIG. 11B. The rear edge of flange 275 may also be affixed to the inner edge of flange 276. Flange 276 extends in an angled rearwards direction with the rear face affixed to the rear edge of base plate 274, whilst the front and outer edges are affixed to support post 271 and king pin bushing housing 202 respectively. The bottom edge of flange 281 is affixed to the upper surface of base plate 274, whilst the outer and inner edges are affixed to king pin bushing housing 202 and support post 271 respectively (FIG. 11C).

The connections described above between base plate 274, flanges, 275, 276, 281 and king pin assembly 200 may be made by a suitable method such as welding. Through the above-described arrangement, base plate 274 and flanges, 275, 276, 281 cooperate to form a secure structure for affixing king pin assembly 200 to the lower end of support post 271.

With reference to FIG. 12, at the lower end of king pin assembly 200 is king pin bushing housing 202 which receives for rotation therein a king pin member 204. The king pin member 204 is in the form of a shaft 206 of circular cross section which has integrally formed therewith at its lower end a spindle mounting portion in the form of a tubular housing 208 for receiving spindle 256 of axle/hub assembly 252 on which wheel 197*f* is rotatably mounted. The components of the base plate 274, flanges, 275, 276, 281 and king pin assembly 200 may be made of suitably strong and material such as a suitable steel and/or iron. King pin member 204 may made from an austempered ductile casting of iron.

The upper end portion 210 of the king pin shaft 206 extends above the housing 202, and may optionally include a biasing device which may be the form of a torsional coil spring 212, which encircles the upper end portion 210. The biasing device is operable to bias the king pin member 204 in a rotational direction towards a zero angular position in which the wheel 197*f* is in a straight-ahead longitudinal direction relative to frame 108. A cap 214 is affixed to the upper end portion 210 by way of a bolt 216 which passes through the shaft 206 and the cap 214 so that the cap 214 turns with the king pin shaft 206. The cap 214, has a downwardly projecting tab 218. The tubular housing 208 which forms the lower portion of the king pin member 206 is affixed to the king pin shaft 206 and provides an upper shoulder 220 which bears against a lower end surface 222 of the king pin bushing housing 202. Affixed to the king pin shaft 206 above an upper end surface (224) of the king pin bushing housing 202, by way of a bolt 226, is a collar 228. Thus, vertical movement of the king pin shaft 206 is restricted, but the shaft 206 is journaled for free turning within the bearing members 230 contained within the king pin bushing housing 202 (FIG. 12).

As noted above, king pin assembly 200 may optionally include a biasing device such as coil spring 212, which may be contained between a lower end surface 232 of the cap 214 and an upper end surface 234 of the collar 228. Opposite ends 236 and 238 of the spring project radially from the spring, the upper end 236 engaging the tab 218 of the cap 214 and the lower end 238 engaging an upward projecting stop member 240 which is affixed to the bushing housing 202. Thus, while the spring 212 may be pre-wound to bias the king pin towards the zero angular position and against rotation as the wheel 197*f* turns to a caster position, the spring experiences a winding effect which reacts in its contact with the tab 218 to increase the bias force on king pin shaft 204 to return the wheel 197*f* of front wheel 197*f* to the zero-angle straight-ahead orientation.

FIG. 11D shows king pin member 204 and hub 254 in the zero angle, straight-ahead position. In order to limit the extent of the rotation of the king pin member 204 and thus the amount of rotation of wheel 197*f* of front wheel unit 910, in a clockwise rotational direction (as viewed in FIG. 2), the lower portion of the king pin member 204 is provided with a radially projecting stop member 242 affixed thereto. Edge 244 of flange 276 provides a stop engaging surface against which the stop member 242 engages when the wheel has reached its maximum permissible caster turn in a clockwise direction (as viewed in FIG. 2), which is depicted in FIG. 11E. In order to limit the turn of the wheel back to the zero angle position, and ensure an accurate return to, and not rotate past, the straight-ahead position, there is provided in association with flange 276, a stop device 246 which engages a portion of the king pin member 204 formed by or on tubular housing 208 (FIG. 11B). Stop device 246 may include a bolt 248 which passes through an opening in flange 276, and a pair of nuts 250 threaded onto the bolt 248, one on either side of flange 276. Thus, by adjusting the position of the nuts 250, the head of the bolt 248 can be moved toward or away from the housing 208. When the king pin member is being rotated back to the straight ahead (zero angle) orientation, an end portion of bolt 248 will engage with and block tubular housing 208 from continuing to rotate past the zero position, thereby establishing the zero position of king pin member 204 when it has returned substantially to the straight-ahead position of wheel 197*f* (FIG. 11C).

Figure 11G:
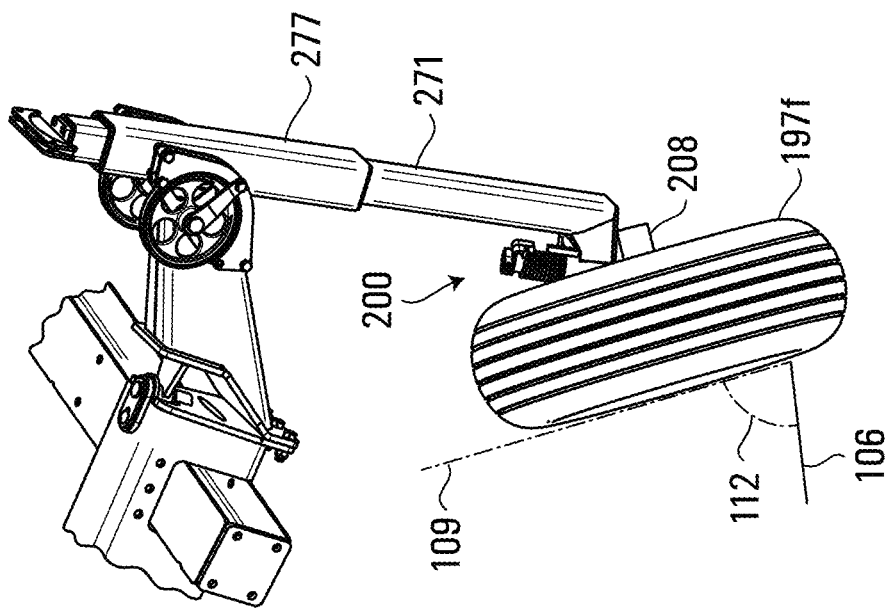
FIGS. 11F and 11G are perspective views of front wheeled support of FIG. 11A during rotation.
Figure 11F:
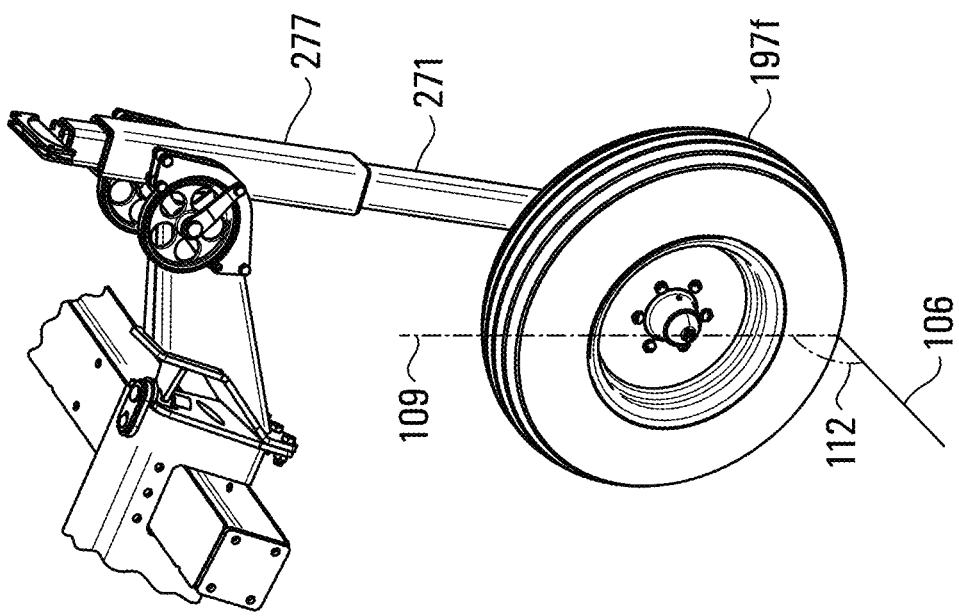

FIGS. 11F and 11G illustrate the rotation of wheel 197*f* from the zero angle straight ahead position to a rotated position. As wheel 197*f* rotates from the zero-angle straight ahead position depicted in FIG. 11F to the rotated position depicted in FIG. 11G, wheel 197*f* may move from a zero-camber orientation to a positive camber orientation. In the zero-angle position in FIG. 11F, wheel is oriented such that its vertical axis 109 is substantially perpendicular to ground surface 106 (i.e. a zero camber orientation where angle 112 is about 90 degrees). As wheel 197*f* rotates in a clockwise rotational direction (as viewed in FIG. 2), it may also lean such that angle 112 between vertical axis 109 and surface 106 is less than 90 degrees (i.e. a positive camber orientation where angle 112 is less that 90 degrees). Angle 112 will continue to decrease with continuing clockwise rotation of wheel 197*f*, such that the wheel leans heavily to a horizontal position during turns. When wheel 197*f* has reached its maximum permissible caster turn in a clockwise direction (i.e. when stop member 242 engages edge 244 of flange 276 as shown in FIG. 11E) angle 112 may be in the range of 5 to 30 degrees.

Through the above-described arrangement, wheels 197*d-f* of front wheeled supports 906, 908, 910 are operable to rotate from the straight-ahead position through rotation of kingpin member 204 within king pin bushing housing 202. Rotation of wheels 197*d-f* is only permitted in the direction indicated by arrows 980 in FIG. 13, up to a maximum angle, $\theta$, of in the range of 0 to 90 degrees and preferably a maximum angle in the range of 35 to 75 and most preferably at or about 55 degrees. In should be noted that as described above, arrows 980 indicate rotation of the respective wheel in the clockwise direction, but also partially in a downwards direction (i.e. towards surface 106) such that the wheel leans heavily to a horizontal position during turns as depicted in FIGS. 11F and 11G. As described above, further rotation is restricted by contact of stop member 242 with edge 244 of flange 276 (FIG. 11E). In the case of front wheeled supports 906, 908, 910 rotation is restricted in the direction indicated by arrows 982 in FIG. 13 by contact of stop means 246 with tubular housing 208 (FIG. 11B).

Front wheeled supports 900, 902, 904 are constructed in a similar manner but some components may be separate left-hand components as opposed to the right-right hand components of front wheeled supports 906, 908, 910. As such, front wheeled supports 900, 902, 904 are configured such that that rotation is only permitted in the opposite direction as indicated by arrows 984 in FIG. 13 in comparison to front wheeled supports 906, 908, 910, up to a maximum angle, $\theta$, of in the range of 0 to −90 degrees and preferably a maximum angle in the range of −35 to −75 and most preferably at or about −55 degrees. Rotation is restricted in the direction indicated by arrows 986 in FIG. 13 by contact of a stop means with the tubular housing in a similar manner to as described for front wheeled supports 906, 908, 910 described above. Further, similar to as described above for front wheeled supports 906, 908, 910, as front as wheeled supports 900, 902, 904 rotate they may move from a zero-camber orientation to a positive camber orientation. However, due to the construction of front as wheeled supports 900, 902, 904 from left hand-components wheels 197a-c may camber in a opposite direction to wheels 197d-f.

In some embodiments, caster assemblies for wheels 197d-f may be configured to provide for different maximum angles θ for each of these wheels, with the angle increasing from a smallest angle for inward wheel 197d to the largest angle for outward wheel 197f. Similarly, caster assemblies for wheels 197a-c may also be configured to provide for different maximum angles θ for each of these wheels in the opposite direction to wheels 197d-f, with the angle increasing from a smallest angle for inward wheel 197c to the largest angle for outward wheel 197a.

Drift Inhibiting System

As agricultural implement 100 travels in a straight forwards path across the surface 106 it is desirable that it keeps a generally square orientation relative to propulsion unit 102, as depicted in FIG. 1 (i.e. maintain the open longitudinal members of the frame 108 generally parallel to the direction of travel 104 in FIG. 1). However, in some situations, side drift (in the Y-direction shown in FIG. 1) may occur that results in agricultural implement 100 moving into a skewed or skidding configuration, such that it is no longer in this generally square orientation. A skewed or skidding orientation is undesirable as it may cause agricultural implement 100 to not pass over substantially the same area as propulsion unit 102, causing areas of ground surface 106 to be left unengaged. This is a problem when treating on side slopes as the weight of agricultural implement 100 acting in a downhill direction may contribute to side drift. A precise and consistent level of engagement with the surface 106 may be desirable in order to achieve a constant seed depth which in turn may result in healthy crops and high yields for crops grown in the soil defining the surface 106. Precise and consistent levels of engagement may also reduce wear and tear on machines.

Agricultural implement 100 will typically have a significant overall mass and the gravitational force acting thereon is supported on the ground surface by the components that are in contact with the ground surface 106. In general, a relatively small proportion of the overall mass of the agricultural implement 100 will be supported by the ground engagers 600 that contact the ground surface 106. Most the mass of agricultural implement 100 will be carried by front wheeled units 900-910 and rear wheeled units 920-934, Typically, ground engagers 600 themselves will not provide a significant degree of force resistance to side drifting of agricultural implement 100 when agricultural implement 100 is on a side slope, which subjects it to a side drift force. Rather, the rear wheeled units 920-934, as well as those front wheeled units 900-910 and which are configured to not be able to rotate into a rotational position whereby they are oriented generally in the direction of side drifting movement, will provide most of the force resistance to side drifting movement (e.g. frictional resistance). It should be noted that since the front two rows 522, 524 of ground engagers 600 are located longitudinally close to the front wheeled support units 900-910 (as well as the two front rows 122, 124 of transverse structural support members of frame 108. Therefore, front wheeled support units 900-910 will support a significant proportion of the overall mass of agricultural implement 100. Thus, front wheeled units 900-910 which are configured to not be able to rotate into a rotational position whereby they are oriented generally in the direction of side drifting movement, are capable of generating significant additional resistance to side drifting.

Side drift typically occurs when agricultural implement 100 is travelling across uneven or sloped ground. For example, the weight of frame 108 due to gravity acting in a downhill direction on a slide slope may result in a gravitational drift force acing upon implement 100 that causes agricultural implement 100 to drift/slide in a downhill direction relative to propulsion unit 102. The angle of the slope, speed of the implement 100 and the grip/resistance forces between ground surface 106 and the implement 100 may contribute towards the amount of side drift. The grip/resistance forces acting against the gravitational forces, that arise between ground surface 106 and implement 100 is determined from a number of factors such as the specific characteristics of the wheels 197 and associated tires of front wheeled support units 900-910 and of rear wheeled support units 920-934, the weight of implement 100 and the composition and moisture content of the material beneath ground surface 106.

Figure 13:
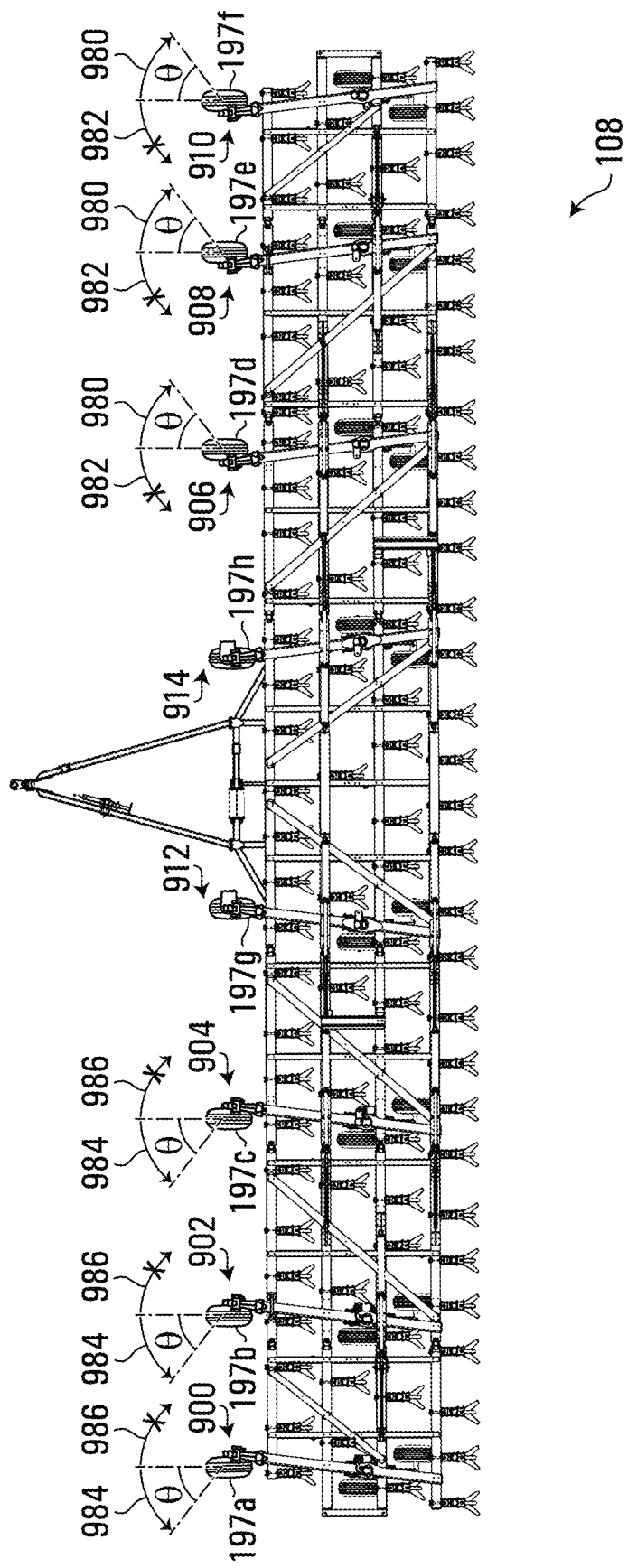
FIG. 13 is another top plan view of the farm implement shown in FIG. 1, indicating rotation of the front wheeled support units.

Rear wheeled support units 920-934 can act to resist side-drifting because they are typically each not rotatable about a steering axis. Front wheeled supports 900-904 and 906-910 are configured in a manner that can resist side-drift through the restricted rotation of their wheels about their steering axes, as outlined above and as generally illustrated in FIG. 13. A number of representative examples are outlined below and illustrated in FIGS. 14-21. Other scenarios are possible where front-wheeled supports 900-910 would operate in a similar manner to substantially minimize or prevent side drift of agricultural implement 100.

Right Turn on Level Ground

Figure 14:
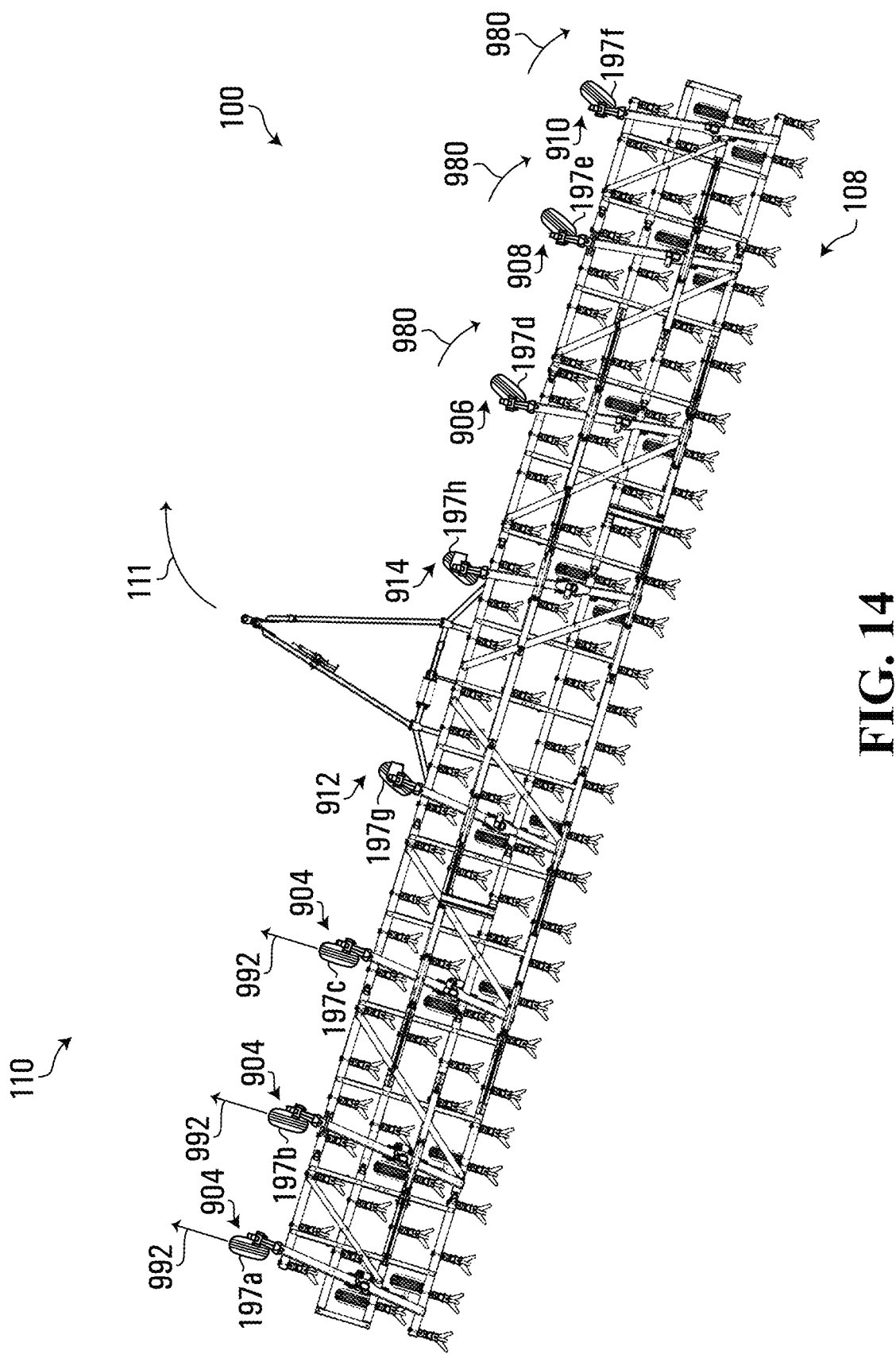
FIGS. 14-21 are top plan views of the farm implement shown in FIG. 1 showing the angular positions of the wheeled supports during several different modes of operation.

FIG. 14 illustrates an example of agricultural implement 100 travelling across a ground surface 110 that is substantially flat and level. In this scenario, there is no significant impact from side drift forces acting on agricultural implement 100. The operator of propulsion unit 102 (not pictured) may execute a turn in the direction indicated by arrow 111, for example when reaching the end of the area to be prepared or to avoid an obstacle.

As described above, front wheeled supports 900-910 include a king pin assembly 200 where the axis of rotation 107 projects in front of the contact patch of the tire (FIG. 11A). As such, when agricultural implement 100 turns in the direction 111, the wheels on the inboard side of the turn, wheels 197d-f of wheeled supports 906, 908, 910 may rotate in the direction of the turn, up to a maximum angle θ such as 70 degrees, as indicated by arrows 980 in FIG. 14. Additionally, front wheeled supports 912 and 914, which are able to rotate 360 degrees may also rotate in the direction 111 of the turn, but are not restricted in their degree of rotation.

Due to contact of a stop device with the tubular housing as described above, the wheels on the outboard side of the turn, in this case wheels 197a-c of wheeled supports 900, 902, 904 are not permitted to rotate in the direction 111 past the position indicated by arrows 992 and will remain in the straight-ahead position as shown in FIG. 14. As such, as agricultural implement 100 executes the turn, wheels 197a-c are to some extent dragged across the ground surface 110. This dragging effect may increase as the degree of the turn increases. However, this configuration of wheels 197a-c will not impede the operation of agricultural implement 100.

Left Turn on Level Ground

Figure 15:
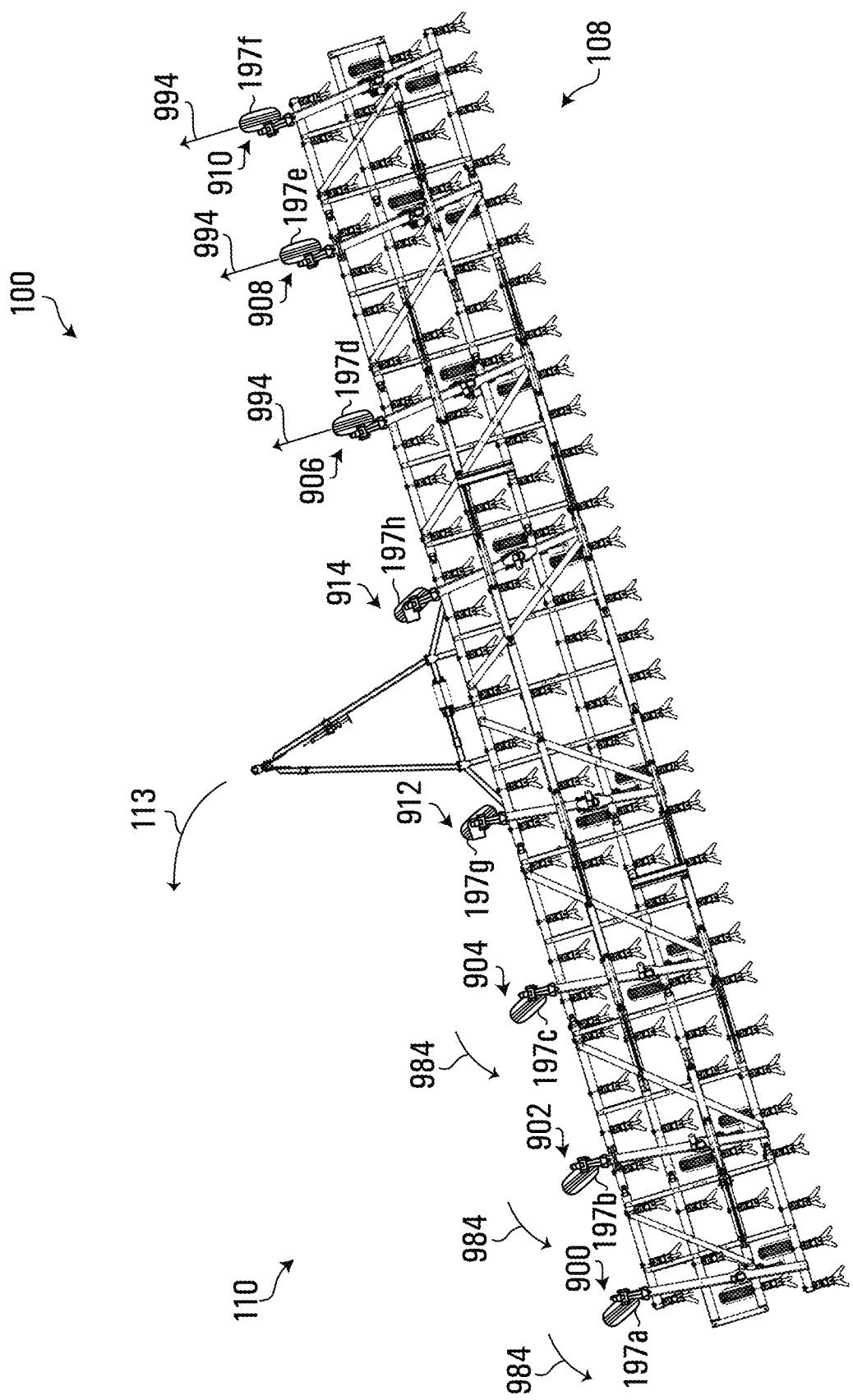

FIG. 15 illustrates an example of agricultural implement 100 travelling across ground surface 110 and executing a turn in the direction indicated by arrow 113. In this scenario, there is no significant impact from side drift forces acting on agricultural implement 100. The wheels on the inboard side of the turn, in this case wheels 197a-c of wheeled supports 900, 902, 904 may rotate in the direction of the turn, as indicated by arrows 984 in FIG. 15. At the same time, the wheels on the outboard side of the turn, in this case wheels 197d-f of wheeled supports 906, 908, 910 will remain in the straight-ahead position indicated by arrows 994 and may drag across ground surface 110. However, this configuration of wheels 197d-f will not impede the operation of agricultural implement 100.

Travelling Straight-Ahead on Ground Sloped Downwards to the Right

Figure 16:
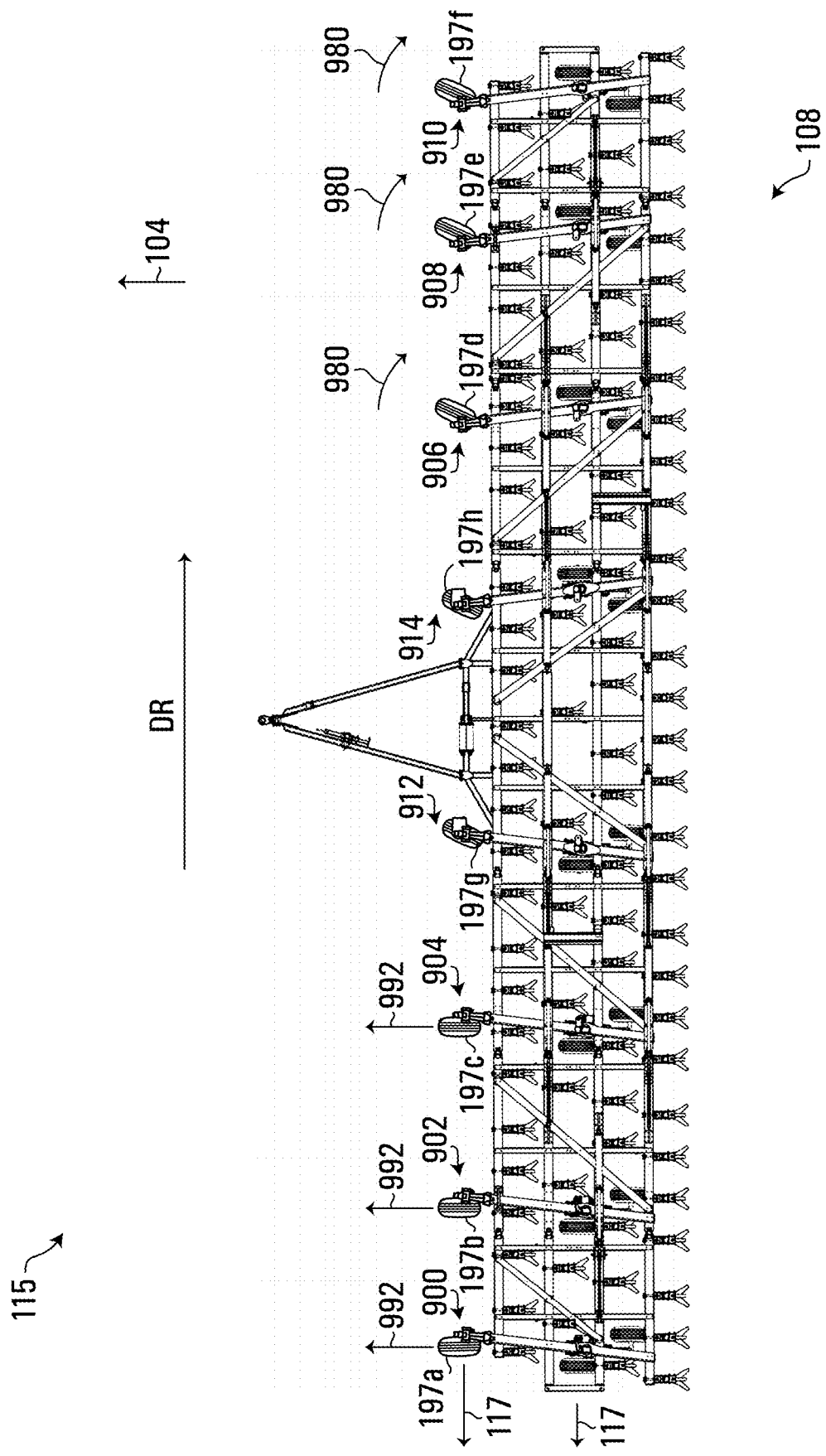

FIG. 16 illustrates an example of agricultural implement 100 travelling in a direction of travel denoted by arrow 104 across a ground surface 115 that is sloped downwards in the direction DR. As farm implement 100 travels in the direction 104, the weight of frame 108 and the implement 100 as a whole due to gravity, will act the direction DR, resulting in a drift force acting in the same direction that will urge implement 100 to drift in the direction DR. However, as this happens wheels 197d-f of wheeled supports 906, 908, 910 may rotate in the downhill direction (as indicated by arrows 980).

If wheels 197a-c were also free to rotate in the downhill direction, agricultural implement 100 may drift in the downhill direction, moving into a skewed or skidding configuration. However, the wheels on the uphill side, in this case wheels 197a-c of wheeled supports 900, 902, 904 will remain in the straight-ahead position indicated by arrows 992. Through this arrangement, the wheels of rear wheeled support units 920-934 and the wheels 197a-c of front wheeled support units 900, 902 and 904, will drag across ground surface in response to drifting movement of agricultural implement 100 in the direction DR, creating forces acting generally in the direction indicated by arrows 117 in FIG. 16 that will oppose the drift force. This will reduce or substantially eliminate side drift in the downhill direction. Therefore, the alignment of agricultural implement with propulsion unit 102 is maintained whilst moving across surface 115.

Travelling Straight-Ahead on Ground Sloped Downwards to the Left

Figure 17:
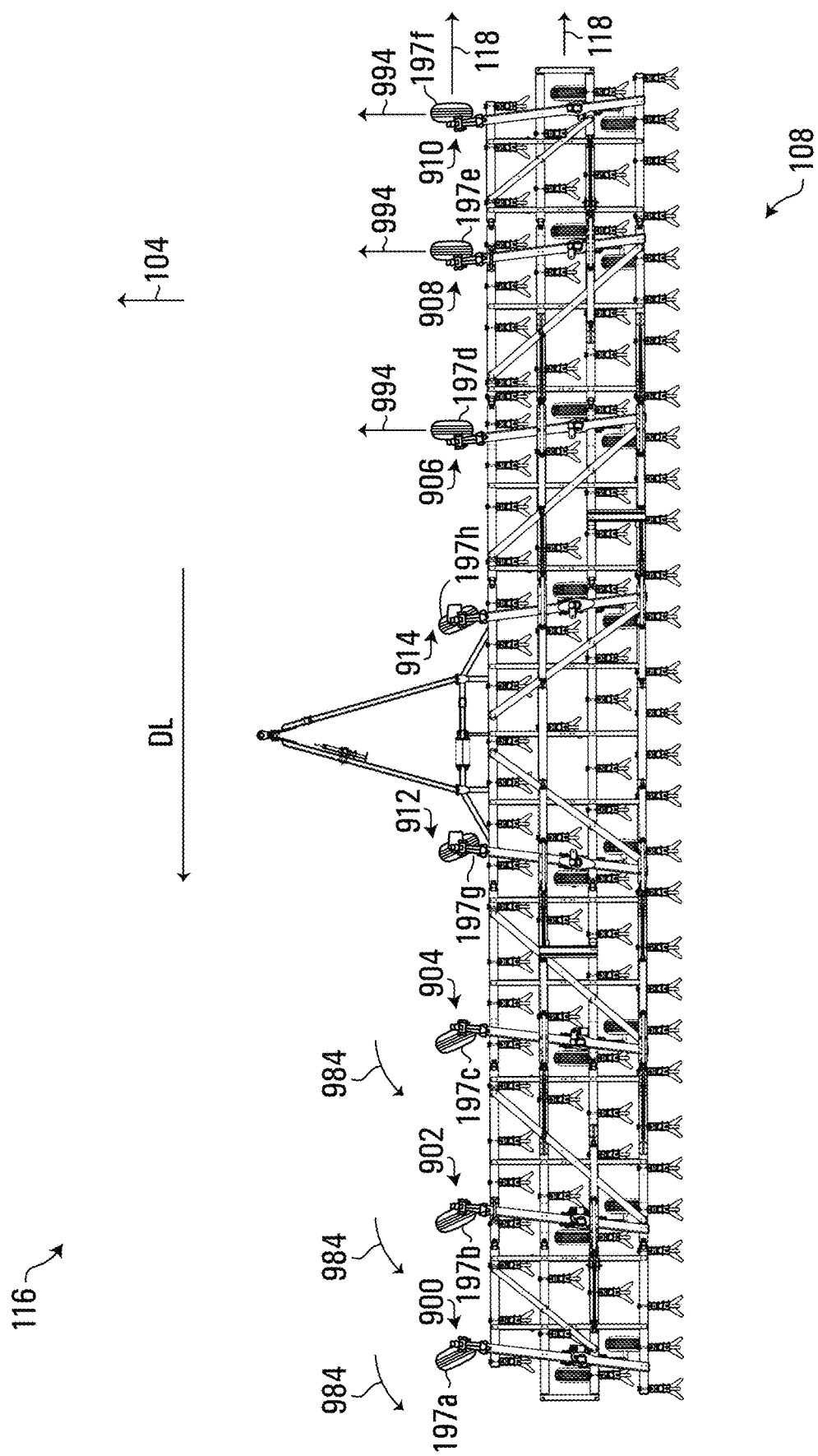

Similarly, FIG. 17 illustrates an example of agricultural implement 100 travelling in a direction of travel denoted by arrow 104 across a ground surface 116 that is sloped downwards in the direction DL. As farm implement 100 travels in the direction 104, the weight of frame 108 and agricultural implement 100 as a whole, due to gravity will act the direction DL, resulting in a drift force acting in the same direction that will urge implement 100 to drift in the direction DL. Wheels 197a-c of wheeled supports 900, 902, 904 may rotate in the downhill direction (as indicated by arrows 984), whilst the wheels on the uphill side, in this case wheels 197d-f of wheeled supports 906, 908, 910 will remain in the straight-ahead position indicated by arrows 994. Through this arrangement, the wheels of rear wheeled support units 920-934 and wheels 197d-f will drag across surface 116 in response to movement of agricultural implement 100 in the direction DL, creating forces acting generally in the directions indicated by arrows 118 in FIG. 17 that will oppose the drift force, thus reducing or substantially eliminating side drift in the downhill direction.

Right Turn Downhill on Ground Sloped Downwards to the Right

Figure 18:
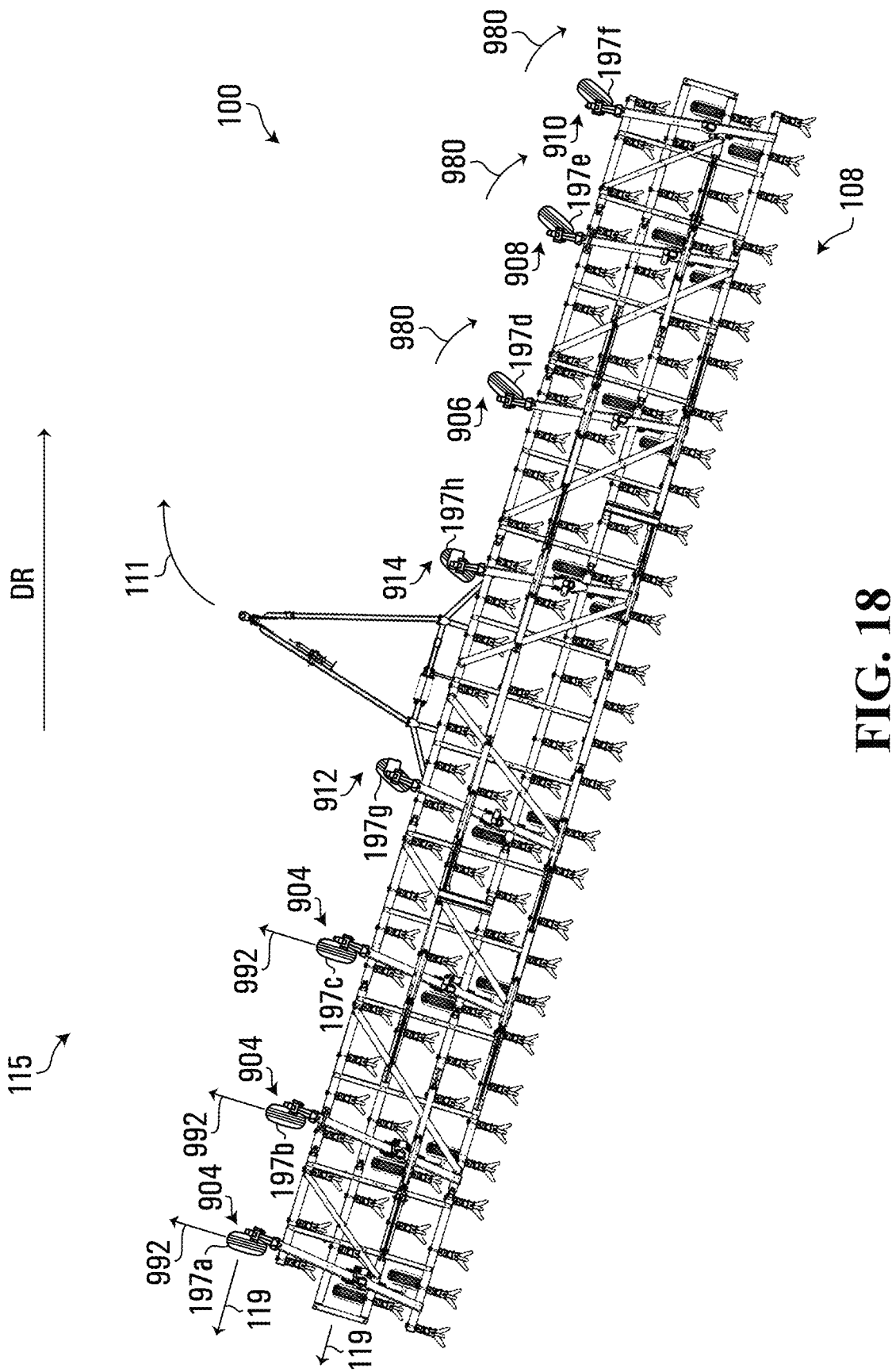

FIG. 18 illustrates an example of agricultural implement 100 travelling across a ground surface 115 that is sloped downwards in the direction DR whilst executing a turn in the direction indicated by arrow 111. As farm implement 100 travels in the direction 111, the weight of frame 108 and agricultural implement 100 as a whole due to gravity will act the direction DR, resulting in a drift force acting in the same direction that will urge implement 100 to drift in the direction DR. In similar manner to as described above, the wheels on the inboard side of the turn, in this case wheels 197d-f of front wheeled supports 906, 908, 910 may rotate in the direction of the turn, as indicated by arrows 980. At the same time, the wheels on the outboard side of the turn, in this case wheels 197a-c of front wheeled supports 900, 902, 904 will remain in the straight-ahead position indicated by arrows 992, and in combination with the wheels of rear wheeled support units 920-934 create forces acting generally in the directions indicated by arrows 119 in FIG. 18 that will oppose the drift force, thereby resisting side drift in the direction DR similar as described above.

Left Turn Downhill on Ground Sloped Downwards to the Left

Figure 19:
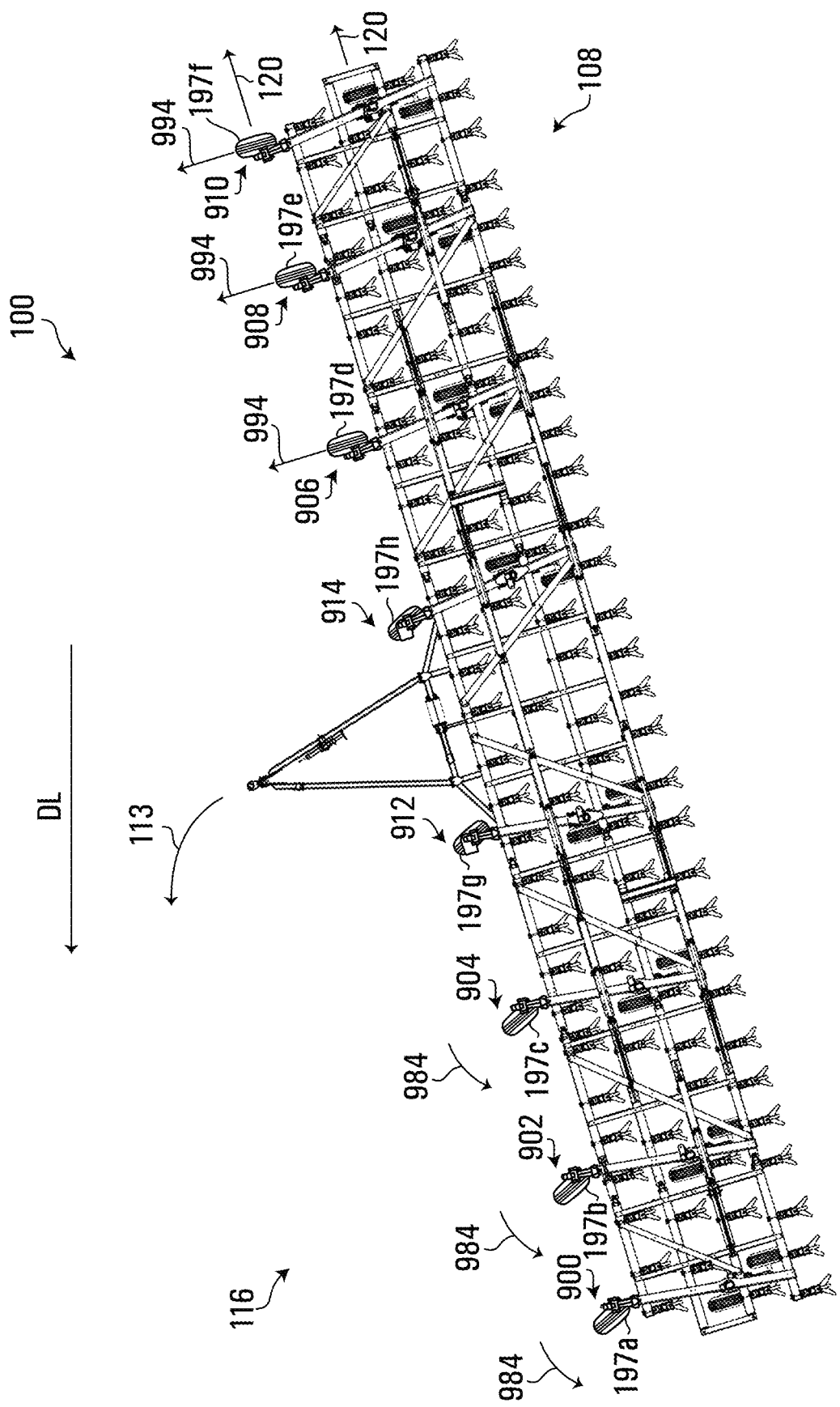

FIG. 19 illustrates an example of agricultural implement 100 travelling across a ground surface 116 that is sloped downwards in the direction DL whilst executing a turn in the direction indicated by arrow 113. As farm implement 100 travels in the direction 113, the weight of frame 108 and agricultural implement 100 as a whole due to gravity will act the direction DL, resulting in a drift force acting in the same direction that will urge implement 100 to drift in the direction DL. The front wheels on the inboard side of the turn, in this case wheels 197a-c of front wheeled supports 900, 902, 904 may rotate in the direction of the turn, as indicated by arrows 984. At the same time, the wheels on the outboard side of the turn, in this case wheels 197d-f of front wheeled supports 906, 908, 910 will remain in the straight-ahead position indicated by arrows 994, in combination with the wheels of rear wheeled support units 920-934, creates forces acting generally in the directions indicated by arrows 120 in FIG. 19 that will oppose the drift force, thereby resisting side drift in the direction DL similar to as described above.

Right Turn Uphill on Ground Sloped Downwards to the Left

Figure 20:
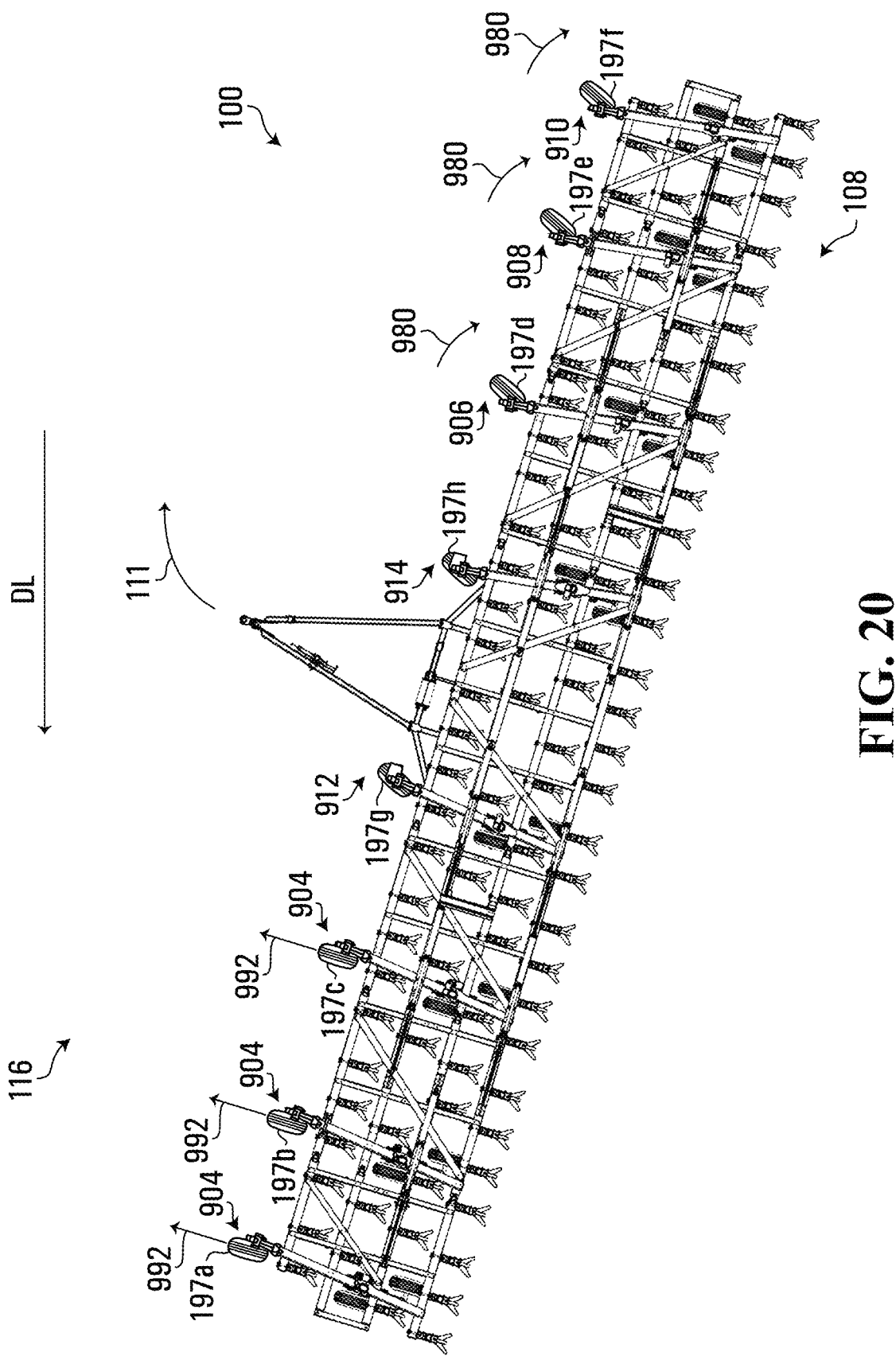

FIG. 20 illustrates an example of agricultural implement 100 travelling across a ground surface 116 that is sloped downwards in the direction DL whilst executing a turn in the direction indicated by arrow 111. As farm implement 100 travels in the direction 111, the weight of frame 108 and agricultural implement 100 as a whole, due to gravity will act the direction DL, resulting in a drift force acting in the same direction that will urge implement 100 to drift in the direction DL. The wheels on the inboard side of the turn, in this case wheels 197d-f of front wheeled supports 906, 908, 910 may rotate in the direction of the turn, as indicated by arrows 980. At the same time, the wheels on the outboard side of the turn, in this case wheels 197a-c of front supports 900, 902, 904 will remain in the straight-ahead position indicated by arrows 992. In this example, side drift of implement 100 is opposed at least in part by implement 100 turning in the opposite direction to the drift force. However, the wheels 197a-c of front wheeled support units 900-904 and the wheels of rear wheeled support units 920-934 may also contribute to resisting the drift force in the downhill direction.

Left Turn Uphill on Ground Sloped Downwards to the Right

Figure 21:
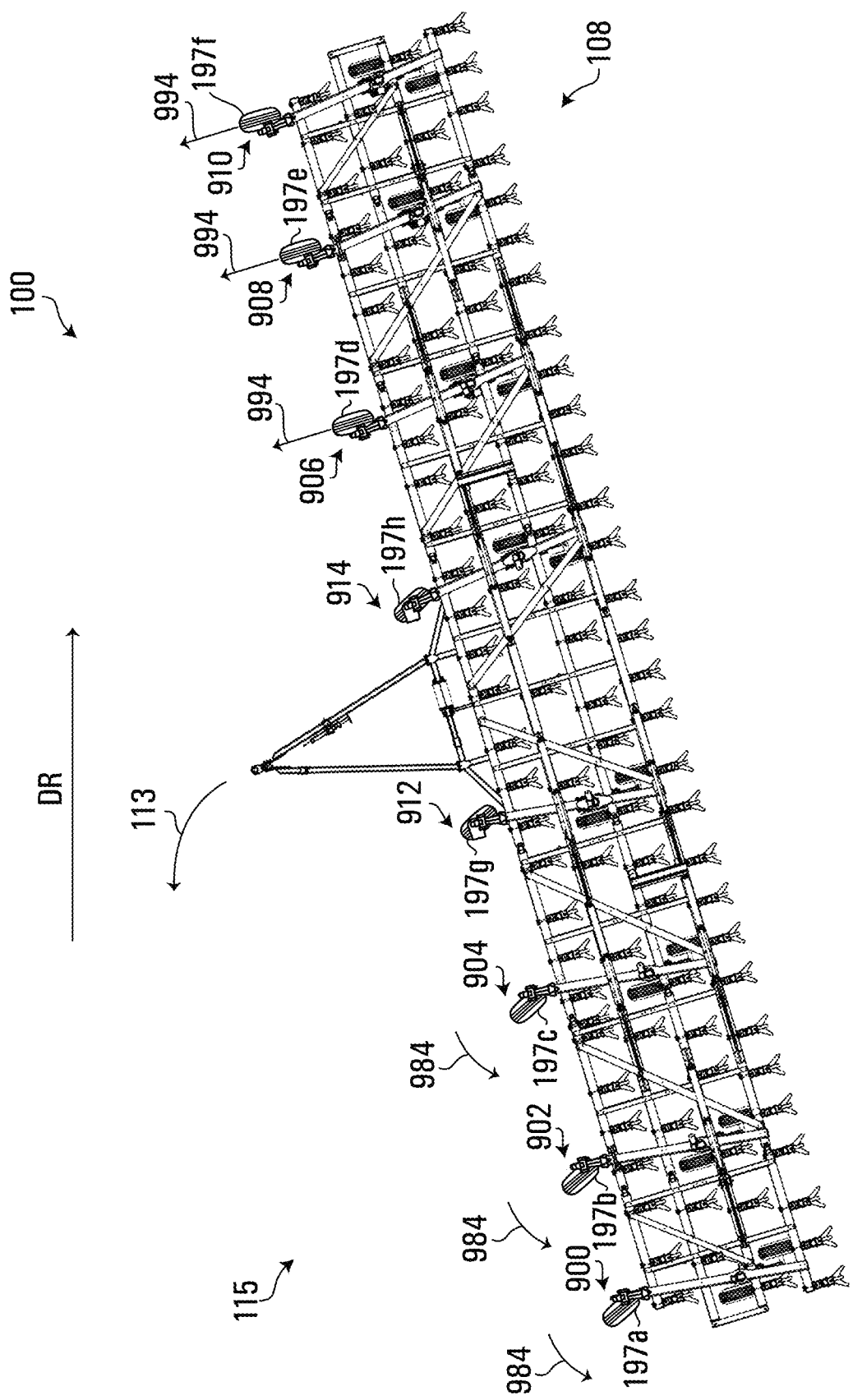

FIG. 21 illustrates an example of agricultural implement 100 travelling across a ground surface 115 that is sloped downwards in the direction DR whilst executing a turn in the direction indicated by arrow 113. As farm implement 100 travels in the direction 113, the weight of frame 108 and implement 100 as a whole, due to gravity will act the direction DR, resulting in a drift force acting in the same direction that will urge implement 100 to drift in the direction DR. In a similar manner to as described above, the wheels on the inboard side of the turn, in this case wheels 197*a-c* of wheeled supports 902, 904, 906 may rotate in the direction of the turn, as indicated by arrows 984. The wheels on the outboard side of the turn, in this case wheels 197*d-f* of wheeled supports 906, 908, 910 will remain in the straight-ahead position indicated by arrows 994. In this example, side drift of implement 100 is opposed by implement 100 turning in the opposite direction to the drift force. However, the wheels 197*d-f* of front wheeled support units 906-910 and the wheels of rear wheeled support units 920-934 may also contribute to resisting the drift force in the downhill direction.

Variations on the foregoing are contemplated. By way of example only, in alternate embodiments, there may be a central frame section 130 with only a single frame section (with a single restricted rotation swivel caster) on opposite transverse sides. This would still provide an anti-skid function as described above.

While specific embodiments of the invention have been described and illustrated, such embodiments should be considered illustrative of the invention only and not as limiting the invention as construed in accordance with the accompanying claims.

The above-described embodiments are intended to be illustrative only and in no way limiting. The described embodiments of carrying out the invention are susceptible to many modifications of form, arrangement of parts, details and order of operation. Other variations are possible.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. An agricultural implement comprising:
an elongated open channel member comprising an elongated generally horizontal upper flange, an elongated generally horizontal lower flange, and an elongated generally vertical web interconnecting the upper flange and the lower flange, said upper flange having an upper indentation at an edge region of said upper flange and a lower indentation at an edge region of said lower flange;
a connecting assembly comprising:
a first vertical connector plate positioned against a first vertical side of said open channel member, said first connector plate comprising an upper channel configured to receive an edge region of said upper flange and a lower channel configured to receive an edge region of said lower flange, said upper channel comprising therein an upper raised surface area configured to be received within said upper indentation on the upper flange of the open channel member and said lower channel comprising a lower raised surface area configured to be received within said lower indentation of said lower flange;
a second vertical connector plate, horizontally spaced from the first connector plate and positioned against a second vertical side of said open channel member, said second vertical side being opposite to said first vertical side;
at least one clamping member operable to clamp said open channel member between said first and second vertical connector plates with said edge region of said upper flange received within said upper channel of said first vertical connector plate and said edge region of said lower flange received within said lower channel of said first vertical connector plate, and with said upper raised surface area received within said upper indentation on the upper flange of said open channel member and said lower raised surface area received within said lower indentation of said lower flange;
wherein when subjected to external forces during operation of said agricultural implement, said open channel member is operable to twist about a longitudinal axis such that said upper and lower flanges will move about said upper and lower raised surface areas.

2. An agricultural implement as claimed in claim 1 wherein the connecting assembly is also operable for connecting a ground engager to the open channel member.

3. An agricultural implement as claimed in claim 2 wherein the agricultural implement further comprises a ground engager interconnected to said connecting assembly.

4. An agricultural implement as claimed in claim 3 wherein said first vertical connector plate is part of a mounting unit and wherein said ground engager is interconnected to said mounting unit.

5. An agricultural implement assembly as claimed in claim 1, wherein the upper and lower raised surface areas are aligned with each other about a common vertical axis.

6. An agricultural implement assembly as claimed in claim 1, wherein the upper and lower raised surface areas are each shaped in generally semi-circular horizontal cross-sectional profiles.

7. An agricultural implement assembly as claimed in claim 1 wherein the upper and lower raised surface areas comprise protrusions extending outwards from an elongated vertical channel wall in each of said upper and lower channels.

8. An agricultural implement as claimed in claim 1, wherein said upper channel further comprises a generally horizontal lower side wall interconnected to a generally vertical base wall and said lower channel further comprises a generally upper horizontal side wall interconnected to a generally vertical base wall; and wherein said upper raised surface area is positioned on said base wall of said upper channel and in operation contacts an edge surface of said upper flange, and wherein said lower raised surface area is positioned on said base wall of said lower channel and in operation contacts an edge surface of said lower flange.

9. An agricultural implement as claimed in claim 8 wherein said upper raised surface area is positioned at a horizontal mid point of said base wall of said upper channel; and said lower raised surface area is positioned at a horizontal mid point of said base wall of said lower channel.

10. An agricultural implement as claimed in claim 9, wherein from opposed sides of said upper raised surface area, said base wall of said upper channel is tapered away at an angle from said edge region of said upper flange of said open channel member; and wherein from opposed sides of said lower raised surface area, said base wall of said lower channel is tapered away at said angle from said edge region of said lower flange of said open channel member.

11. An agricultural implement as claimed in claim 10, wherein said angle is about 1.0 degrees.

12. An agricultural implement as claimed in claim 1, wherein said second vertical connector plate further comprises an upper channel configured to receive an opposed edge region of said upper flange and a lower channel configured to receive an opposed edge region of said lower flange.

13. An agricultural implement as claimed in claim 1 wherein said open channel member is an H-section beam member.

14. An agricultural implement comprising:
an elongated open channel member comprising an elongated generally horizontal upper flange, an elongated generally horizontal lower flange, and an elongated generally vertical web interconnecting the upper flange and the lower flange;
a connecting assembly comprising:
a first vertical connector plate positioned against a first vertical side of said open channel member, said first connector plate comprising an elongated upper channel configured to receive an edge region of said upper flange and an elongated lower channel configured to receive an edge region of said lower flange;
a second vertical connector plate, horizontally spaced from the first connector plate and positioned against a second vertical side of said open channel member, said second vertical side being opposite to said first vertical side;
a clamping assembly operable to clamp said open channel member between said first and second vertical connector plates with said edge region on the upper flange of the open channel member received within the upper channel and said edge region on the lower flange of the open channel member received within the lower channel;
wherein said clamping assembly comprises:
a first clamping member extending horizontally between said first vertical plate and said second vertical plate positioned over and proximate an upper surface of said upper flange;
a second clamping member extending horizontally between said first vertical plate and said second vertical plate positioned over and proximate a lower surface of said lower flange;
a third clamping member extending horizontally between said first vertical plate and said second vertical plate positioned either (i) over and proximate a lower surface of said lower flange or (ii) over and proximate an upper surface of said upper flange.

15. An agricultural implement as claimed in claim 14 wherein said third clamping member extends horizontally between said first vertical plate and said second vertical plate positioned proximate a lower surface of said lower flange, said third clamping member being transversely spaced and horizontally aligned with said second clamping member.

16. An agricultural implement as claimed in claim 15, wherein said first clamping member extends horizontally between said first vertical plate and said second vertical plate positioned in contact with said upper surface of said upper flange.

17. An agricultural implement as claimed in claim 16, wherein said second clamping member extends horizontally between said first vertical plate and said second vertical plate positioned in contact with said lower surface of said lower flange.

18. An agricultural implement as claimed in claim 14, wherein said third clamping member extends horizontally between said first vertical plate and said second vertical plate positioned in contact with said lower surface of said lower flange.

19. An agricultural implement as claimed in claim 14, wherein said first, second and third clamping members each comprise a nut and bolt.

20. An agricultural implement as claimed in claim 19, wherein each of said first vertical plate member and said second vertical plate members comprises a bolt opening for each of said bolts of said first, second and third clamping members.

21. An agricultural implement as claimed in claim 20 wherein each bolt opening is open to one of said upper and lower channels of the first vertical plate member.

22. An agricultural implement as claimed in claim 14 wherein said first, second and third clamping members are arranged in a generally triangular pattern.

23. An agricultural implement as claimed in claim 22 wherein said generally triangular pattern is an isosceles triangle pattern.

24. An agricultural implement as claimed in claim 14 wherein said first, second and third clamping members are arranged such that said second and third clamping members extend horizontally between said first vertical plate and said second vertical plate positioned over and proximate a lower surface of said lower flange in a transversely spaced relationship to each other, and wherein said first clamping member is positioned at an intermediate transverse position relative to said second and third clamping members.

25. An agricultural implement as claimed in claim 14, wherein said second vertical connector plate further comprises an upper channel configured to receive an opposed edge region of said upper flange and a lower channel configured to receive an opposed edge region of said lower flange.

26. An agricultural implement as claimed in claim 14 wherein said open channel member is an H-section beam member.

27. An agricultural implement as claimed in claim 14 wherein when subjected to external forces during operation of said agricultural implement, said open channel member is operable to twist about a longitudinal axis.

28. An agricultural implement as claimed in claim 14 wherein:
said upper flange comprises an upper indentation at an edge region of said upper flange and said lower flange comprises a lower indentation at an edge region of said lower flange;
said upper channel comprises therein an upper raised surface area configured to be received within said upper indentation on the upper flange of the open channel member and said lower channel comprises a lower raised surface area configured to be received within said lower indentation of said lower flange;
said first, second and third clamping members operable to clamp said open channel member between said first and second vertical connector plates with said edge region of said upper flange received within said upper channel of said first vertical connector plate and said edge region of said lower flange received within said lower channel of said first vertical connector plate, and with said upper raised surface area received within said upper indentation on the upper flange of the open channel member and said lower raised surface area received within said lower indentation of said lower flange;

wherein when subjected to external forces during operation of said agricultural implement, said open channel member is operable to twist about a longitudinal axis such that said upper and lower flanges will move about said upper and lower raised surface areas.

29. An agricultural implement assembly as claimed in claim 28, wherein the upper and lower raised surface areas are aligned with each other about a common vertical axis.

30. An agricultural implement assembly as claimed in claim 29, wherein the upper and lower raised surface areas are each shaped in generally semi-circular horizontal cross-sectional profiles.

31. An agricultural implement as claimed in claim 28, wherein said upper channel further comprises a generally horizontal lower side wall interconnected to a generally vertical base wall and said lower channel further comprises a generally upper horizontal side wall interconnected to a generally vertical base wall; and wherein said upper raised surface area is positioned on said base wall of said upper channel and in operation contacts an edge surface of said upper flange, and wherein said lower raised surface area is positioned on said base wall of said lower channel and in operation contacts an edge surface of said lower flange.

32. An agricultural implement as claimed in claim 31, wherein from opposed sides of said upper raised surface area, said base wall of said upper channel is tapered away at an angle from said edge region of said upper flange of said open channel member; and wherein from opposed sides of said lower raised surface area, said base wall of said lower channel is tapered away at said angle from said edge region of said lower flange of said open channel member.

33. An agricultural implement as claimed in claim 32, wherein said angle is about 1.0 degrees.

34. An agricultural implement as claimed in claim 14 wherein the connecting assembly is also operable for connecting a ground engager to the open channel member.

35. An agricultural implement as claimed in claim 34 wherein the agricultural implement further comprises a ground engager interconnected to said connecting assembly.

36. An agricultural implement as claimed in claim 14 wherein said first vertical connector plate is part of a mounting unit and wherein said ground engager is interconnected to said mounting unit.

37. An agricultural implement comprising:
an open channel member comprising a generally horizontal upper flange plate, a generally horizontal lower flange plate, and a generally vertical web plate interconnecting the upper flange plate and the lower flange plate;
a mounting assembly comprising:
a front mounting plate;
a rear mounting plate;
a first upper bolt connection;
a second lower bolt connection;
wherein at least one of the first bolt connection and the second bolt connection comprises a single bolt and the first bolt connection or second bolt connection that does not comprise a single bolt comprises two bolts.

38. The agricultural implement assembly of claim 37, wherein the single bolt is vertically spaced at the horizontal mid point of the two bolts.

39. An agricultural implement comprising:
an elongated longitudinally extending support member comprising a first generally vertical side surface, said first generally vertical side surface comprising an indentation at an outward facing region of said first generally vertical side surface, said elongated support member comprising a second generally vertical side surface horizontally spaced from said first generally vertical side surface;
a connecting assembly comprising:
a first generally vertical connector plate positioned against said first generally vertical side of said support member, said first generally vertical connector plate comprising an outwardly facing raised surface area configured to be received within said indentation at an outward facing region of said first generally vertical side surface of the support member;
a second generally vertical connector plate, horizontally spaced from the first generally vertical connector plate and positioned against said second generally vertical side of said support member;
at least one clamping member operable to clamp said support member between said first and second generally vertical connector plates with said raised surface area received within said upper indentation
wherein when subjected to external forces during operation of said agricultural implement, said support member is operable to twist about a longitudinal axis such that said support member will move about said raised surface area.

40. An agricultural implement as claimed in claim 39, wherein:
said indentation is an upper indentation, and wherein said first generally vertical side surface comprises a lower indentation at said outward facing region of said first generally vertical side surface, said lower indentation being positioned vertically below and aligned with said upper indentation;
said outwardly facing raised surface area is an upper raised surface area, and wherein said first generally vertical connector plate comprises an outwardly facing lower raised surface area configured to be received within said lower indentation at said outward facing region of said first generally vertical side surface of the support member;
said at least one clamping member is operable to clamp said support member between said first and second generally vertical connector plates with said raised upper surface area received within said upper indentation, and said raised lower surface area received within said lower indentation;
such that when subjected to external forces during operation of said agricultural implement, said support member is operable to twist about a longitudinal axis such that said support member will move about said upper and lower raised surface areas.

41. An agricultural implement comprising:
an elongated longitudinally extending support member comprising a first generally vertical side surface, said first generally vertical side surface comprising an indentation at an outward facing region of said first generally vertical side surface, said elongated support member comprising a second generally vertical side surface horizontally spaced from said first generally vertical side surface;
a connecting assembly comprising:
a first generally vertical connector plate positioned against said first generally vertical side of said support member,
a second generally vertical connector plate, horizontally spaced from the first generally vertical connector plate and positioned against said second generally vertical side of said support member;

a clamping assembly operable to clamp said support member between said first and second generally vertical connector plates, wherein said clamping assembly comprises:
- a first clamping member extending horizontally between said first generally vertical plate and said second generally vertical plate positioned over and proximate an upper surface region of said support member;
- a second clamping member extending horizontally between said first generally vertical plate and said second generally vertical plate positioned over and proximate a lower surface region of said support member;
- a third clamping member extending horizontally between said first generally vertical plate and said second generally vertical plate positioned either (i) over and proximate said lower surface region of said support member or (ii) over and proximate said upper surface region of said support member.

42. An agricultural implement as claimed in claim 41, wherein:

wherein said first generally vertical side surface comprises an upper indentation at said outward facing region of said first generally vertical side surface, and wherein said first generally vertical side surface comprises a lower indentation at said outward facing region of said first generally vertical side surface, said lower indentation being positioned vertically below and aligned with said upper indentation;

said first generally vertical connector plate comprises an outwardly facing upper raised surface area configured to be received within said upper indentation at said outward facing region of said first generally vertical side surface of the support member, and wherein said first generally vertical connector plate comprises an outwardly facing lower raised surface area configured to be received within said lower indentation at said outward facing region of said first generally vertical side surface of the support member;

said at least one clamping assembly is operable to clamp said support member between said first and second generally vertical connector plates with said raised upper surface area received within said upper indentation, and said raised lower surface area received within said lower indentation;

such that when subjected to external forces during operation of said agricultural implement, said support member is operable to twist about a longitudinal axis such that said support member will move about said upper and lower raised surface areas.

* * * * *